United States Patent
Katano et al.

(10) Patent No.: US 9,771,519 B2
(45) Date of Patent: Sep. 26, 2017

(54) LIQUID CRYSTAL DISPLAY ELEMENT AND METHOD FOR MANUFACTURING SAME

(71) Applicants: JNC CORPORATION, Tokyo (JP); JNC PETROCHEMICAL CORPORATION, Tokyo (JP)

(72) Inventors: Yuko Katano, Ichihara (JP); Yukio Hirano, Ichihara (JP); Keisuke Izawa, Ichihara (JP); Fumitaka Kondo, Ichihara (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 3 days.

(21) Appl. No.: 14/439,792

(22) PCT Filed: Oct. 31, 2013

(86) PCT No.: PCT/JP2013/079482
§ 371 (c)(1),
(2) Date: Apr. 30, 2015

(87) PCT Pub. No.: WO2014/069550
PCT Pub. Date: May 8, 2014

(65) Prior Publication Data
US 2015/0275089 A1    Oct. 1, 2015

(30) Foreign Application Priority Data

Oct. 31, 2012 (JP) .................................. 2012-241048
Jan. 29, 2013 (JP) .................................. 2013-014249

(51) Int. Cl.
| | | |
|---|---|---|
| C09K 19/00 | (2006.01) |
| C09K 19/54 | (2006.01) |
| C09K 19/20 | (2006.01) |
| C09K 19/24 | (2006.01) |
| C09K 19/34 | (2006.01) |
| C09K 19/38 | (2006.01) |
| G02F 1/1337 | (2006.01) |
| C09D 179/08 | (2006.01) |
| C08G 73/10 | (2006.01) |
| G02F 1/1343 | (2006.01) |
| C09K 19/12 | (2006.01) |
| C09K 19/18 | (2006.01) |
| C09K 19/30 | (2006.01) |
| C09K 19/32 | (2006.01) |
| C09K 19/16 | (2006.01) |
| G02F 1/1333 | (2006.01) |
| G02F 1/137 | (2006.01) |

(52) U.S. Cl.
CPC ........ *C09K 19/542* (2013.01); *C08G 73/1042* (2013.01); *C08G 73/1067* (2013.01); *C08G 73/1071* (2013.01); *C08G 73/1078* (2013.01); *C08G 73/1096* (2013.01); *C09D 179/08* (2013.01); *C09K 19/2007* (2013.01); *C09K 19/24* (2013.01); *C09K 19/3003* (2013.01); *C09K 19/3066* (2013.01); *C09K 19/3402* (2013.01); *C09K 19/3809* (2013.01); *G02F 1/133723* (2013.01); *G02F 1/133788* (2013.01); *G02F 1/134363* (2013.01); *C09K 2019/122* (2013.01); *C09K 2019/123* (2013.01); *C09K 2019/161* (2013.01); *C09K 2019/181* (2013.01); *C09K 2019/188* (2013.01); *C09K 2019/301* (2013.01); *C09K 2019/3009* (2013.01); *C09K 2019/3016* (2013.01); *C09K 2019/3036* (2013.01); *C09K 2019/3037* (2013.01); *C09K 2019/325* (2013.01); *C09K 2019/3408* (2013.01); *C09K 2019/3422* (2013.01); *C09K 2019/548* (2013.01); *G02F 2001/13712* (2013.01); *G02F 2001/133397* (2013.01); *Y10T 428/1005* (2015.01)

(58) Field of Classification Search
CPC ...... C09K 19/56; C08K 5/5419; C08K 5/353; C08K 5/3417; C08K 5/544; C08G 73/1046; C08G 73/10; C08G 73/1007; C08G 73/106; G02F 1/133788; G02F 1/13378; Y10T 428/10; Y10T 428/1005; Y10T 428/1023
USPC ......... 428/1.1, 1.2, 1.26; 349/123, 130, 131, 349/132; 528/310; 524/104; 525/436
See application file for complete search history.

(56) References Cited

FOREIGN PATENT DOCUMENTS

| | | |
|---|---|---|
| JP | H07-318942 | 12/1995 |
| JP | H10-062767 | 3/1998 |

(Continued)

*Primary Examiner* — Ruiyun Zhang
(74) *Attorney, Agent, or Firm* — Lex IP Meister, PLLC

(57) ABSTRACT

The present invention relates to a liquid crystal display device including a pair of a substrate arranged opposite to each other, an electrode group disposed on one side or both sides of the pair of substrates facing each other, a plurality of active devices connected to the electrode group, a liquid crystal alignment film disposed on each facing side of the pair of substrates, and a liquid crystal layer interposed between the pair of substrates, wherein the liquid crystal alignment film is manufactured by irradiating linearly polarized light to a film obtained from polyamic acid or a derivative thereof having a photoisomerization structure in the main chain or a film being subject to heat-baking so as to provide alignment-controlling capability, and the liquid crystal layer is a liquid crystal composition having negative (−) dielectric anisotropy. By the present invention, a liquid crystal display device having improved image sticking characteristics and good alignment stability is provided.

16 Claims, No Drawings

(56) References Cited

FOREIGN PATENT DOCUMENTS

| JP | H11-202356 | 7/1999 |
| JP | 2003-322869 | 11/2003 |
| JP | 2007-199681 | 8/2007 |
| JP | 2009-173792 | 8/2009 |
| JP | 2010-049230 | 3/2010 |
| JP | 2010-66645 | 3/2010 |
| JP | 2010049230 A * | 3/2010 |

* cited by examiner

LIQUID CRYSTAL DISPLAY ELEMENT AND METHOD FOR MANUFACTURING SAME

TECHNICAL FIELD

The present invention relates to a liquid crystal display device including a photo-alignment film, and a method of manufacturing the same.

TECHNICAL BACKGROUND

A liquid crystal display has been widely supplied to the public for various uses according to development and progress of technology of widening a viewing angle and technology of a motion picture.

Recently, a method of driving liquid crystals has been improved in order to provide a liquid crystal display (LCD) having higher precision and a wide viewing angle. For example, Patent Document No. 1 discloses an IPS (In-Plane Switching) mode liquid crystal display using an electric field parallel to the surface of a glass substrate. In addition, Patent Document No. 2 discloses a liquid crystal display (LCD) having an improved aperture ratio by using FFS (Fringe-Field Switching) technologies obtained by further improving the IPS technology.

Further, a liquid crystal composition, an alignment film material, and the like of the liquid crystal display (LCD) as well as a liquid crystal display device have been improved. For example, the IPS mode or FFS mode device drives liquid crystal molecules on a liquid crystal layer by an electric field parallel to a substrate, but generates a "vertical electric field" in which electric field lines become perpendicularly close to the substrate around the electrode. When a liquid crystal composition having positive (+) dielectric anisotropy is used for these devices, liquid crystal molecules are aligned in an electric field line direction in a state that a voltage is applied thereto and thus in a vertical direction around an electrode, and this may cause display defects. Since these display defects need to be masked in order to use these devices as a liquid crystal display (LCD), there is a problem of not sufficiently increasing an aperture ratio. On the contrary, when a liquid crystal composition having negative (−) dielectric anisotropy is used for the FFS device, a long axis of liquid crystal molecules rotates in a direction perpendicular to an electric field applied thereto and thus is driven to orient parallel to the substrate in a region where a vertical electric field is applied to the liquid crystal molecules. In other words, since the FFS device is prevented from having the display defects in a region where the ⌈vertical electric field⌋ is generated around the electrode, the aperture ratio may be improved (Patent Document Nos. 3 and 4).

On the other hand, for the alignment film material, a photo-alignment method of radiating polarized ultraviolet (UV) light to an alignment film to cause a photodegradation reaction, a photodimerization reaction, or a photoisomerization reaction of the alignment film to apply a pretilt angle and alignment property to liquid crystal molecules, instead of a conventional rubbing method has been suggested (Patent Document Nos. 5 and 6). The photo-alignment method has an advantage of causing highly uniform alignment compared with the rubbing method, doing no damage to the alignment film since the photo-alignment method is a non-contact alignment method, and decreasing display defects of the liquid crystal display device such as those caused by dust, or static electricity.

However, this method of using a photodegradation reaction of an alignment film (hereinafter referred to as a ⌈photodegradation method⌋) has a problem of deteriorating display performance such as leaving degradation products (monomolecule components) of the alignment film and deteriorating image sticking characteristics, thermal stability, electrical stability, and the like (Patent Document No. 7).

PRIOR ART DOCUMENTS

Patent Documents

Japanese Patent Laid-Open Publication No. H10-062767
Japanese Patent Laid-Open Publication No. H11-202356
Japanese Patent Laid-Open Publication No. 2003-322869
Japanese Patent Laid-Open Publication No. 2010-66645
Japanese Patent Laid-Open Publication No. H07-318942
Japanese Patent Laid-Open Publication No. 2009-173792
Japanese Patent Laid-Open Publication No. 2007-199681

OUTLINE OF THE INVENTION

Subject to be Solved by the Invention

The present invention provides a liquid crystal display having improved image sticking characteristics and good alignment stability by using an alignment film including polyamic acid or a derivative thereof having a photoisomerization structure in a main chain and a liquid crystal molecule having negative dielectric anisotropy.

Means for Solving the Subject

The present invention includes the following structure.

[1] A liquid crystal display device including a pair of substrates arranged opposite to each other, an electrode group disposed on one side or both sides of the pair of substrates facing each other, a plurality of active elements connected to the electrode group, and a liquid crystal alignment film disposed on each facing side of the pair of substrates, and a liquid crystal layer interposed between the pair of substrates, wherein the liquid crystal alignment film is manufactured by irradiating linearly polarized light to a film obtained from polyamic acid or a derivative thereof having a photoisomerization structure in the main chain or a film being subject to heat-baking so as to provide alignment-controlling capability, and the liquid crystal layer includes a liquid crystal composition having negative dielectric anisotropy and including at least one liquid crystal compound selected from the group of liquid crystal compounds represented by Chemical Formula 1 as a first component:

[Formula 1]

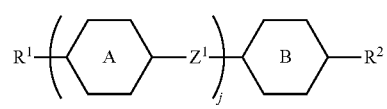

(1)

wherein $R^1$ and $R^2$ are independently alkyl having 1 to 12 carbons, alkoxy having 1 to 12 carbons, alkenyl having 2 to 12 carbons, or alkenyl having 2 to 12 carbons, where arbitrary hydrogen is replaced by fluorine; ring A and ring B are independently 1,4-cyclohexylene, tetrahydropyran-2,5-diyl, 1,3-dioxane-2,5-diyl, 1,4-phenylene, 2-fluoro-1,4-phenylene, 2,5-difluoro-1,4-phenylene, 2,3-difluoro-1,4-phenylene, 2-fluoro-3-chloro-1,4-phenylene, 2,3-difluoro-6-methyl-1,4-phenylene, 2,6-naphthalenediyl, or 7,8-difluorochroman-2,6-diyl, and at least one of ring A and ring B is 2,3-difluoro-1,4-phenylene, 2-fluoro-3-chloro-1,4-phenylene, 2,3-difluoro-6-methyl-1,4-phenylene, or 7,8-difluorochroman-2,6-diyl; $Z^1$ is independently a single bond, —(CH$_2$)$_2$—, —CH$_2$O—, —COO—, or —CF$_2$O—; and j is 1, 2, or 3.

[2] The liquid crystal display device of [1] wherein an electric field applied to a liquid crystal layer has a component parallel to the surface of the substrate.

[3] The liquid crystal display device of [1] or [2] wherein the polyamic acid or the derivative thereof having a photoisomerization structure is polyamic acid or a derivative thereof obtained by reacting at least one of tetracarboxylic dianhydride or diamine having a photoisomerization structure selected from the following Formulae (I) to (VII).

[Formula 2]

   (I)

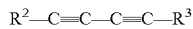   (II)

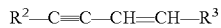   (III)

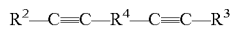   (IV)

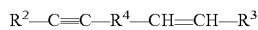   (V)

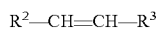   (VI)

   (VII)

In Formulae (I) to (VII), $R^2$ and $R^3$ are independently a monovalent organic group having —NH$_2$ or —CO—O—CO—, and $R^4$ is a divalent organic group including an aromatic ring.

[4] The liquid crystal display device of [3], wherein the tetracarboxylic dianhydride having the photoisomerization structure is at least one selected from the following Formula (PAN-1) and Formula (PAN-2).

[Formula 3]

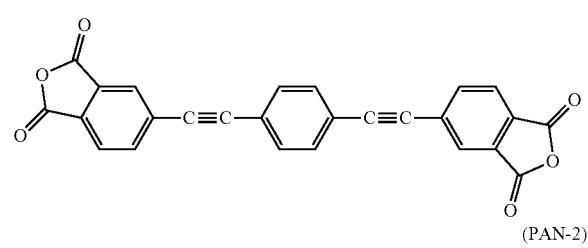

(PAN-1)

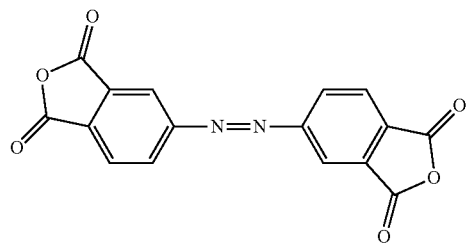

(PAN-2)

[5] The liquid crystal display device of [3], wherein the diamine having the photoisomerization structure is at least one selected from the following Formula (PDI-1) to Formula (PDI-8).

[Formula 4]

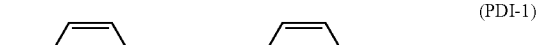
(PDI-1)

(PDI-2)

[Formula 5]

(PDI-3)

(PDI-4)

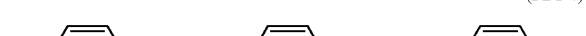
(PDI-5)

[Formula 6]

(PDI-6)

(PDI-7)

(PDI-8)

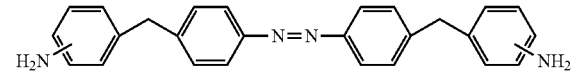

In Formula (PDI-1) to Formula (PDI-8), as for a group of which a bonding position is not fixed to any one of carbon atoms constituting a ring, the bonding position is arbitrary, in Formula (PDI-7), $R^5$ is independently —CH$_3$, —OCH$_3$, —CF$_3$, or —COOCH$_3$, and
b is an integer of 0 to 2.

[6] The liquid crystal display device of [5] wherein the diamine having the photoisomerization structure is at least one selected from the following Formula (PDI-6-1) and Formula (PDI-7-1).

[Formula 7]

(PDI-6-1)

(PDI-7-1)

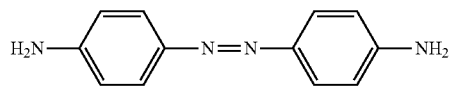

[7] The liquid crystal display device of any one of [3] to [6], which includes at least one of the group of tetracarboxylic dianhydrides represented by the following Formula (AN-I) to Formula (AN-VII), as tetracarboxylic dianhydrides in addition to the tetracarboxylic dianhydride having the photoisomerization structure.

[Formula 8]

(AN-I)

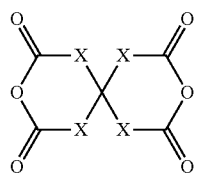

(AN-II)

(AN-III)

(AN-IV)

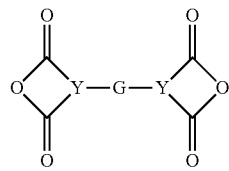

(AN-V)

(AN-VI)

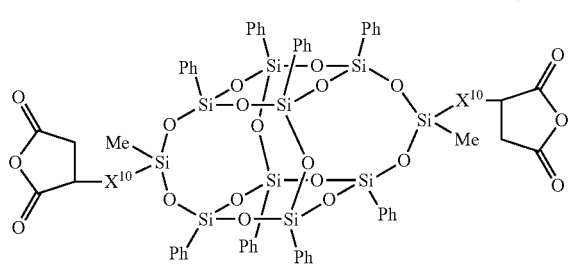

(AN-VII)

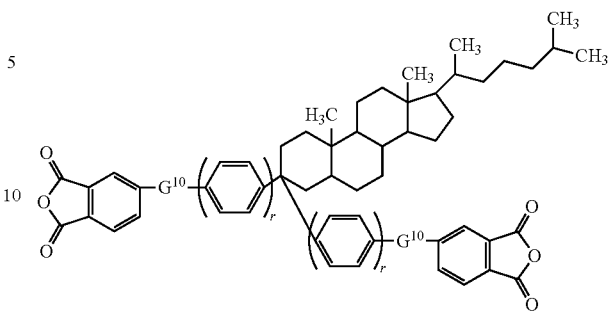

In Formula (AN-I), Formula (AN-IV), and Formula (AN-V), X is independently a single bond or —$CH_2$—;

in Formula (AN-II), G is a single bond, alkylene having 1 to 20 carbons, —CO—, —O—, —S—, —$SO_2$—, —$C(CH_3)_2$—, or —$C(CF_3)_2$—; and in Formula (AN-II) to Formula (AN-IV), Y is independently one selected from the group of the following trivalent groups:

[Formula 9]

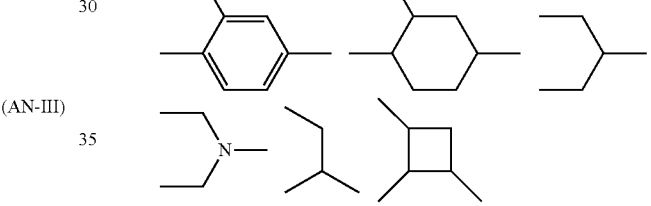

wherein arbitrary hydrogen of the groups may be replaced by methyl, ethyl, or phenyl;

in Formula (AN-III) to Formula (AN-V), ring A is a monocyclic hydrocarbon group having 3 to 10 carbons or a condensed polycyclic hydrocarbon group having 6 to 10 carbons, wherein arbitrary hydrogen of the groups may be replaced by methyl, ethyl, or phenyl, and a bond bound to the ring is bound to arbitrary carbon constituting the ring, or two bonds may be bound to the same carbon;

in Formula (AN-VI), $X^{10}$ is alkylene having 2 to 6 carbons;

Me is methyl;

Ph is phenyl;

in Formula (AN-VII), $G^{10}$ is independently —O—, —COO—, or —OCO—; and r is independently 0 or 1.

[8] The liquid crystal display device of [7], wherein the tetracarboxylic dianhydride in addition to the tetracarboxylic dianhydride having the photoisomerization structure includes at least one selected from the group of the following Formula (AN-1-1), Formula (AN-1-13), Formula (AN-2-1), Formula (AN-3-1), Formula (AN-3-2), Formula (AN-4-5), Formula (AN-4-17), Formula (AN-4-21), Formula (AN-4-28), Formula (AN-4-29), Formula (AN-7-2), Formula (AN-10), and Formula (AN-11-3).

[Formula 10]

(AN1-1)
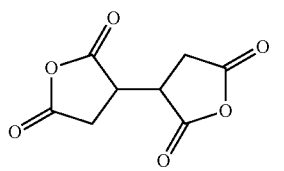

(AN-1-13)
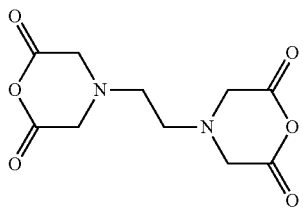

(AN-2-1)
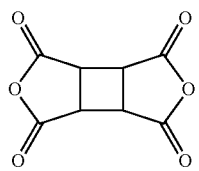

(AN-3-1)
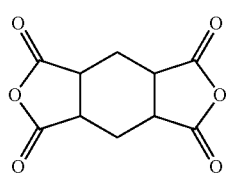

(AN-3-2)
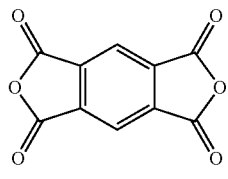

(AN-4-5)
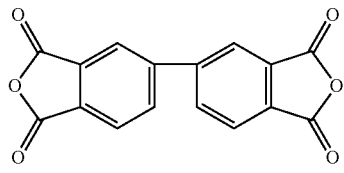

(AN-4-17)
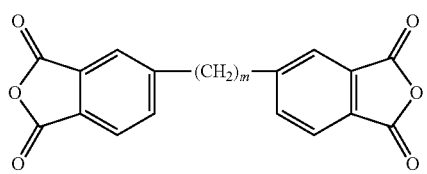

(AN-4-28)
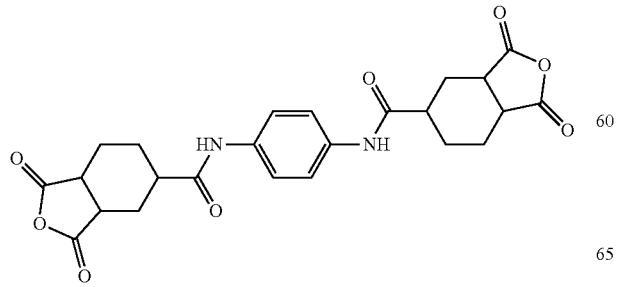

(AN-4-29)
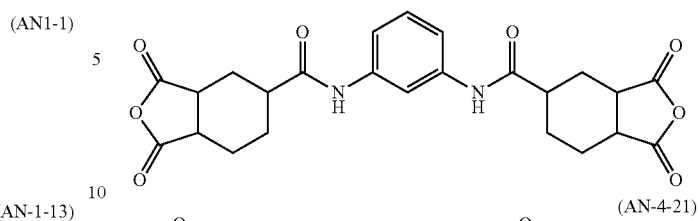

(AN-4-21)
(AN-7-2)
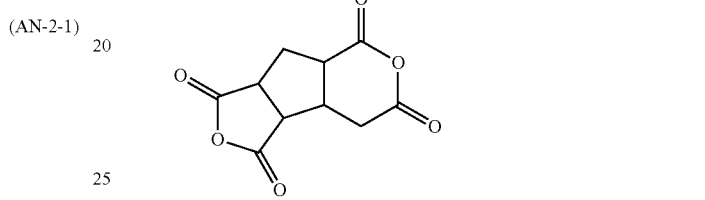

(AN-10)
(AN-11-3)
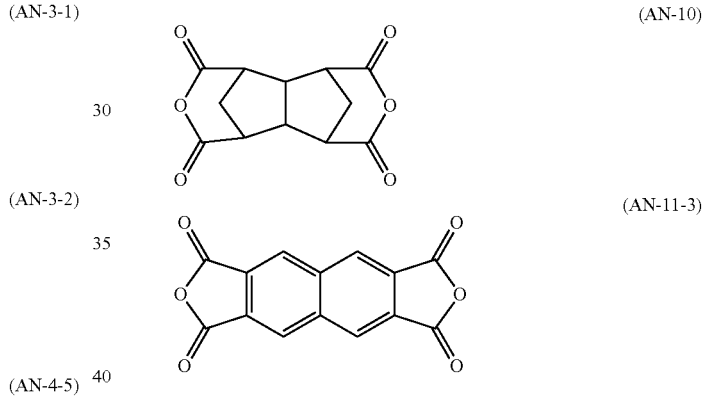

In Formula (AN-4-17), m is an integer of 1 to 12.

[9] The liquid crystal display device of any one of [3] to [8], which includes at least one selected from the group of the following Formula (DI-1) to Formula (DI-15), as a diamine in addition to the diamine having the photoisomerization structure selected from Formula (I) to Formula (VII).

[Formula 11]

(DI-1)
$H_2N\text{−}(CH_2)_{\overline{m}}\text{−}NH_2$ (DI-2)

(DI-3)

(DI-4)

-continued

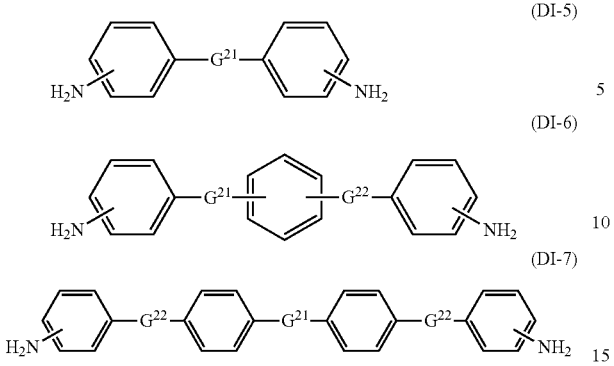

(DI-5)
(DI-6)
(DI-7)

In Formula (DI-1), m is an integer of 1 to 12;

in Formula (DI-3) and Formula (DI-5) to Formula (DI-7), $G^{21}$ is independently a single bond, —NH—, —O—, —S—, —S—S—, —SO$_2$—, —CO—, —CONH—, —CONCH$_3$—, —NHCO—, —C(CH$_3$)$_2$—, —C(CF$_3$)$_2$—, —(CH$_2$)$_{m'}$—, —O—(CH$_2$)$_{m'}$—O—, —N(CH$_3$)—(CH$_2$)$_k$—N(CH$_3$)—, or —S—(CH$_2$)$_m$—S—, m' is independently an integer of 1 to 12, and k is an integer of 1 to 5;

in Formula (DI-6) and Formula (DI-7), $G^{22}$ is independently a single bond, —O—, —S—, —CO—, —C(CH$_3$)$_2$—, —C(CF$_3$)$_2$—, or alkylene having 1 to 10 carbons;

arbitrary —H of a cyclohexane ring and a benzene ring of Formula (DI-2) to Formula (DI-7) may be replaced by —F, —CH$_3$, —OH, —CF$_3$, —CO$_2$H, —CONH$_2$, or benzyl, or that in Formula (DI-4) may be replaced by the following Formula (DI-4-a) to Formula (DI-4-c),

[Formula 12]

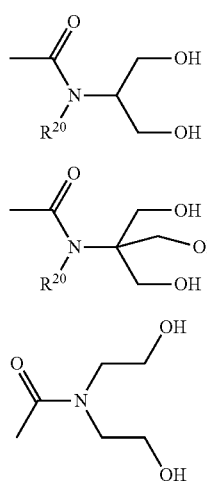

(DI-4-a)
(DI-4-b)
(DI-4-c)

in Formula (DI-4-a) and Formula (DI-4-b), $R^{20}$ is independently —H or —CH$_3$;

in Formula (DI-2)-Formula (DI-7), as for a group of which a bonding position is not fixed to any one of carbon atoms constituting a ring, the bonding position is arbitrary; and a bonding position of NH$_2$ bound to the cyclohexane ring or benzene ring is an arbitrary position except a bonding position of $G^{21}$ or $G^{22}$.

[Formula 13]

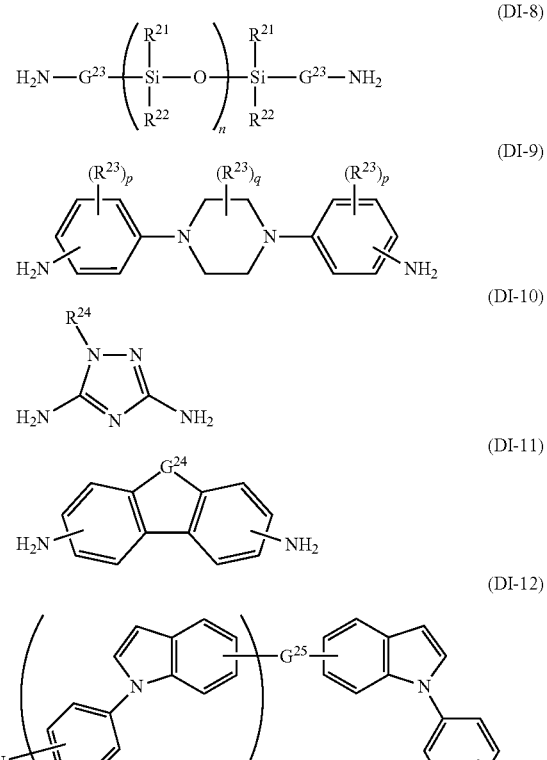

(DI-8)
(DI-9)
(DI-10)
(DI-11)
(DI-12)

In Formula (DI-8), $R^{21}$ and $R^{22}$ are independently alkyl having 1 to 3 carbons or a phenyl;

$G^{23}$ is independently a C1-C6 alkylene, a phenylene, or alkyl-substituted phenylene;

n is an integer of 1-10;

in Formula (DI-9), $R^{23}$ is independently alkyl having 1 to 5 carbons, alkoxy having 1 to 5 carbons, or —Cl;

p is independently an integer of 1 to 3;

q is an integer of 0 to 4;

in Formula (DI-10), $R^{24}$ is —H, alkyl having 1 to 4 carbons, a phenyl, or a benzyl;

in Formula (DI-11), $G^{24}$ is —CH$_2$— or —NH—;

in Formula (DI-12), $G^{25}$ is a single bond, alkylene having 2 to 6 carbons, or 1,4-phenylene;

r is 0 or 1;

in Formula (DI-12), as for a group of which a bonding position is not fixed to any one of carbon atoms constituting a ring, the bonding position is arbitrary; and in Formula (DI-9), Formula (DI-11), and Formula (DI-12), a bonding position of NH$_2$ bound to the benzene ring is arbitrary.

[Formula 14]

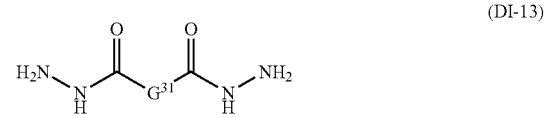

(DI-13)

-continued

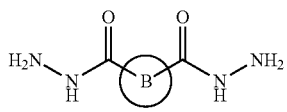
(DI-14)

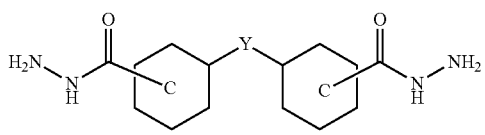
(DI-15)

In Formula (DI-13), $G^{31}$ is a single bond, alkylene having 1 to 20 carbons, —CO—, —O—, —S—, —SO$_2$—, —C(CH$_3$)$_2$—, or —C(CF$_3$)$_2$—;

in Formula (DI-14), ring B may be a cyclohexane ring, a benzene ring, or a naphthalene ring, where arbitrary hydrogen of the rings may be replaced by a methyl, an ethyl, or a phenyl;

in Formula (DI-15), rings C are each independently a cyclohexane ring or a benzene ring, where arbitrary hydrogen of the rings may be replaced by a methyl, an ethyl, or a phenyl; and Y is a single bond, alkylene having 1 to 20 carbons, —CO—, —O—, —S—, —SO$_2$—, —C(CH$_3$)$_2$—, or —C(CF$_3$)$_2$—.

[10] The liquid crystal display device of [9], wherein the diamine in addition to the diamine having the photoisomerization structure selected from Formula (I) to Formula (VII) includes at least one selected from the group of the following Formula (DI-1-3), Formula (DI-1-4), Formula (DI-4-1), Formula (DI-5-1), Formula (DI-5-5), Formula (DI-5-9), Formula (DI-5-12), Formula (DI-5-21), Formula (DI-5-28), Formula (DI-5-30), Formula (DI-5-31), Formula (DI-7-3), Formula (DI-9-1), Formula (DI-13-1), Formula (DI-13-2), Formula (DI-14-1), or Formula (DI-14-2).

[Formula 15]

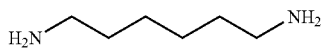
(DI-1-3)

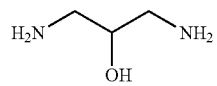
(DI-1-4)

(DI-4-1)

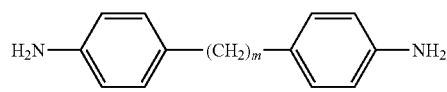
(DI-5-1)

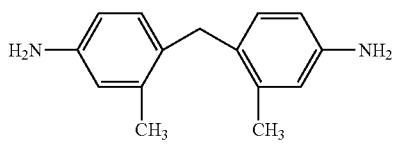
(DI-5-5)

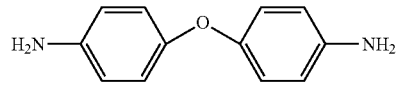
(DI-5-9)

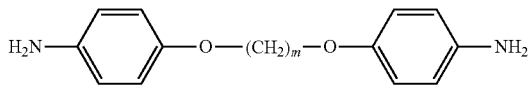
(DI-5-12)

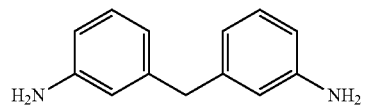
(DI-5-21)

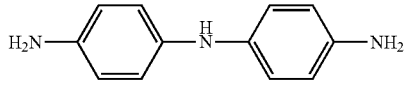
(DI-5-28)

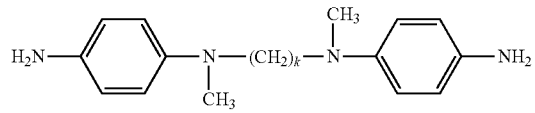
(DI-5-30)

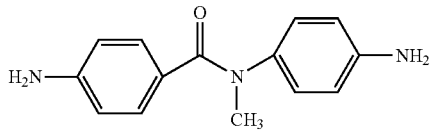
(DI-5-31)

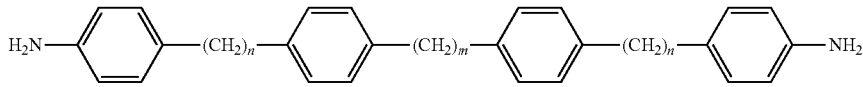
(DI-7-3)

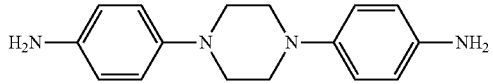
(DI-9-1)

[Formula 16]

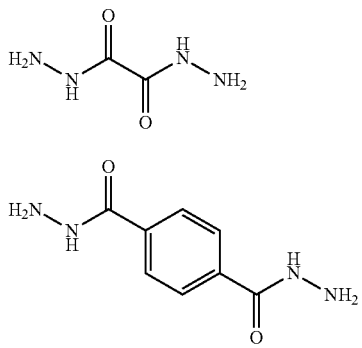
(DI-13-1)

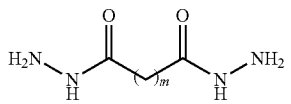
(DI-13-2)

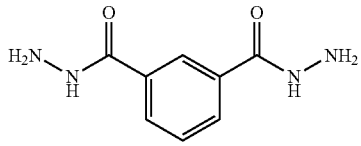
(DI-14-1)

(DI-14-2)

In Formula (DI-5-1), Formula (DI-5-12), Formula (DI-7-3), and Formula (DI-13-2), m is an integer of 1 to 12;
in Formula (DI-5-30), k is an integer of 1 to 5; and
in Formula (DI-7-3), n is 1 or 2.

[11] The liquid crystal display device of any one of [1] to [10], wherein the liquid crystal alignment film is formed by a liquid crystal alignment agent including the polyamic acid or the derivative thereof having a photoisomerization structure in the main chain, and other polymers.

[12] The liquid crystal display device of any one of [1] to [11], wherein the liquid crystal alignment film is formed of a liquid crystal alignment agent further including at least one selected from the group of compounds of an alkenyl-substituted nadimide compound, a compound having a radical-polymerizable unsaturated double bond, an oxazine compound, an oxazoline compound, and an epoxy compound.

[13] The liquid crystal display device of any one of [1] to [12], which is manufactured by applying a liquid crystal alignment agent on a substrate, heat-drying the substrate applied with the liquid crystal alignment agent, and irradiating linearly polarized light to provide alignment capability.

[14] The liquid crystal display device of any one of [1] to [12], which is manufactured by applying a liquid crystal alignment agent on a substrate, heat-drying the substrate applied with the liquid crystal alignment agent, irradiating linearly polarized light to provide alignment capability, and then heat-baking the resultant film.

[15] The liquid crystal display device of any one of [1] to [12], which is manufactured by applying a liquid crystal alignment agent on a substrate, heat-drying the substrate applied with the liquid crystal alignment agent, heat-baking the dried film, and irradiating linearly polarized light to provide alignment capability.

[16] The liquid crystal display device of any one of [1] to [15], wherein the liquid crystal composition having negative dielectric anisotropy includes at least one selected from the group of liquid crystal compounds of Formula (1-1) to Formula (1-32) as a first component.

[Formula 17]

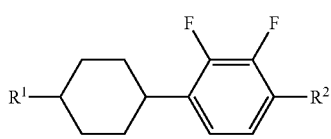
(1-1)

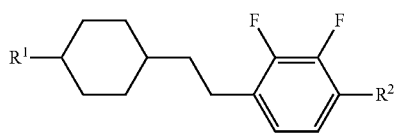
(1-2)

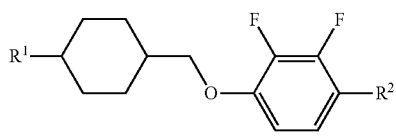
(1-3)

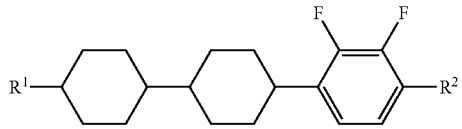
(1-4)

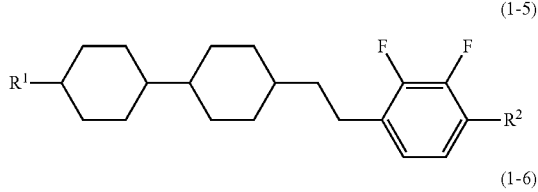
(1-5)

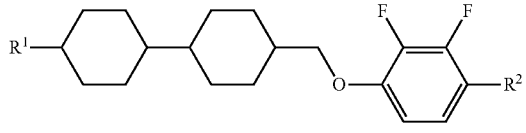
(1-6)

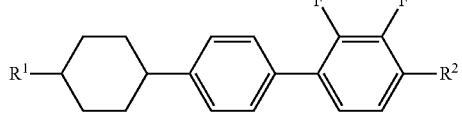
(1-7)

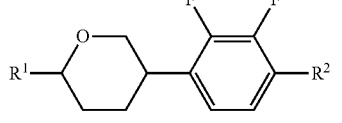
(1-8)

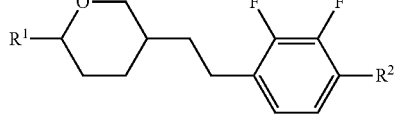
(1-9)

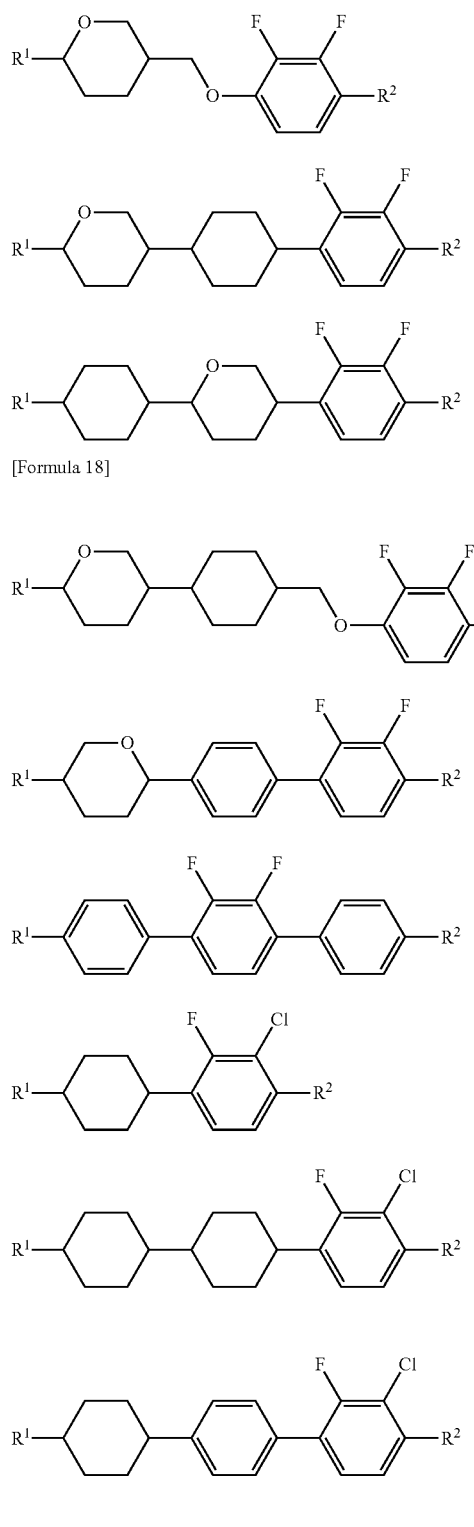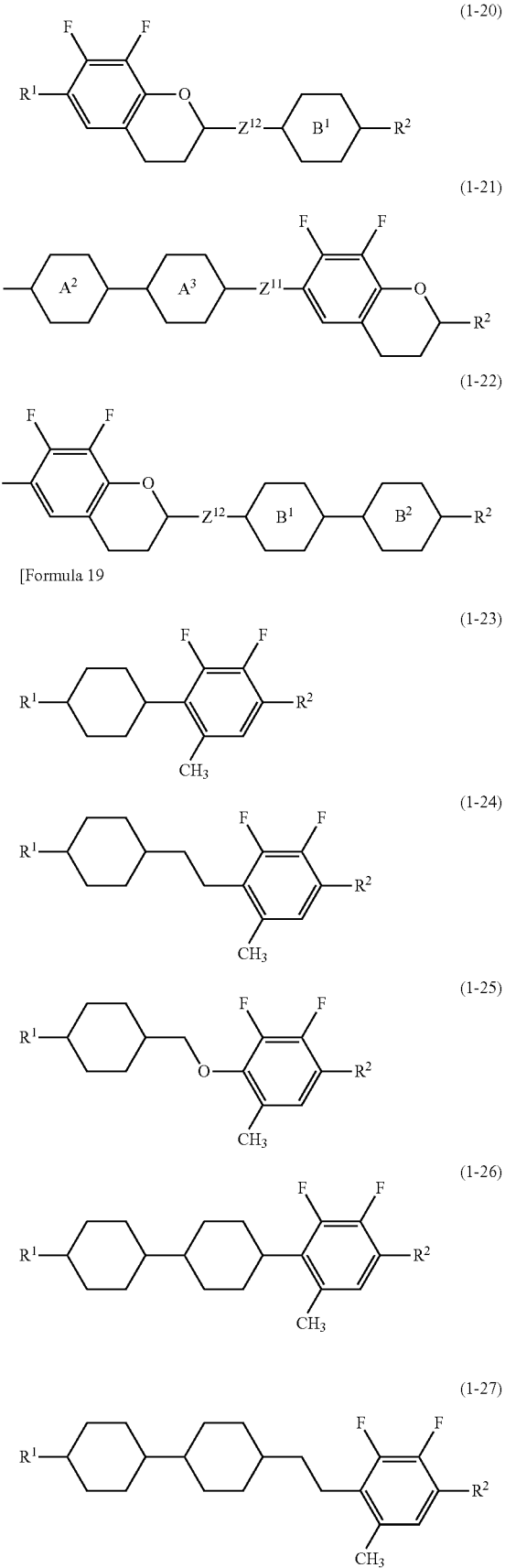

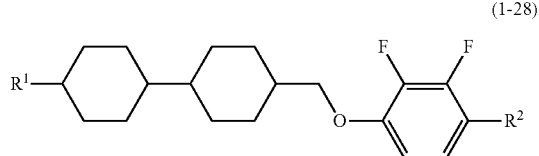
(1-28)

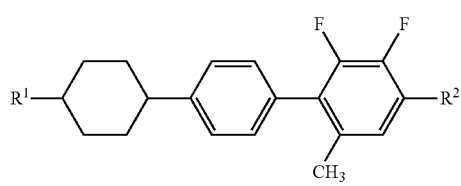
(1-29)

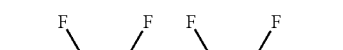
(1-30)

(1-31)

(1-32)

$R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen may be replaced by fluorine; ring $A^1$, ring $A^2$, ring $A^3$, ring $B^1$, and ring $B^2$ are independently 1,4-cyclohexylene or 1,4-phenylene; and $Z^{11}$ and $Z^{12}$ are independently a single bond, —(CH$_2$)$_2$—, —CH$_2$O—, or —COO—.

[17] The liquid crystal display device of [16], wherein the liquid crystal composition having negative dielectric anisotropy includes at least one selected from the group of liquid crystal compounds of Formula (1-1), Formula (1-4), Formula (1-7), and Formula (1-32) as a first component.

[Formula 20]

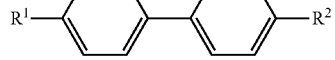
(1-1)

(1-4)

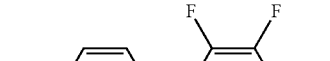
(1-7)

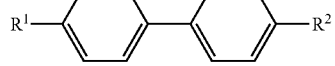
(1-32)

$R^1$ and $R^2$ are independently alkyl having 1 to 12 carbons, alkoxy having 1 to 12 carbons, alkenyl having 2 to 12 carbons, or alkenyl having 2 to 12 carbons, where arbitrary hydrogen is replaced by fluorine.

Means for Solving the Subject

A liquid crystal display device manufactured by the alignment film including the polyamic acid or the derivative thereof having a photoisomerization structure in the main chain and the liquid crystal molecule having negative dielectric anisotropy of the present invention has improved alignment, and good image sticking characteristics.

EMBODIMENT TO CARRY OUT THE INVENTION

A liquid crystal display device of the present invention includes a pair of substrates arranged opposite to each other, an electrode group disposed on one side or both sides of the pair of substrates facing each other, a plurality of active elements connected to the electrode group, a liquid crystal alignment film disposed on each facing side of the pair of substrates, and a liquid crystal layer interposed between the pair of substrates, wherein the alignment film includes polyamic acid or a derivative thereof having a photoisomerization structure in the main chain, and is manufactured by irradiating linearly polarized light to provide alignment-controlling capability, and the liquid crystal layer is a liquid crystal composition having negative dielectric anisotropy.

The electric field applied to a liquid crystal layer has a component parallel to the surface of the substrate.

The liquid crystal composition having negative dielectric anisotropy may be abbreviated as ⌈a negative liquid crystal composition⌋, and the liquid crystal composition having positive dielectric anisotropy may be abbreviated as ⌈a positive liquid crystal composition⌋.

In addition, a liquid crystal alignment film used for a liquid crystal display device of the present invention includes polyamic acid or a derivative thereof having a photoisomerization structure in the main chain that is obtained from a reaction product of at least either one of tetracarboxylic dianhydride or a diamine having a photoisomerization structure as a necessary component in order to introduce the photoisomerization structure into the polymer main chain and a tetracarboxylic dianhydride other than the tetracarboxylic dianhydride, and a diamine other than the diamine. The tetracarboxylic dianhydride other than the tetracarboxylic dianhydride may include, for example, an aliphatic tetracarboxylic dianhydride, an alicyclic tetracarboxylic dianhydride, an aromatic tetracarboxylic dianhydride, and the like. The diamine other than the diamine may include, for example, a non-side chain-type diamine, a side chain-type diamine, and a hydrazide. Such a derivative of the polyamic acid may be, for example, a soluble polyimide, a polyamic acid ester, polyhydrazidic acid, a polyamic acid amide, and polyhydrazidic acid-amidic acid, and more specifically 1) a polyimide where all aminos and carboxyls of polyamic acid carry out a dehydration ring-closure reaction, 2) a partial polyimide where a partial dehydration ring-closure reaction is carried out, 3) a polyamic acid ester where a carboxyl of polyamic acid is converted into an ester, 4) a polyamic acid-polyamide copolymer that is obtained by substituting a part of an acid dianhydride of a tetracarboxylic dianhydride compound with an organic dicarboxylic acid, or 5) a polyamideimide where a part of the whole of the polyamic acid-polyamide copolymer carries out a dehydration ring-closure reaction. The polyamic acid or the derivative thereof may be one kind of compound or two or more kinds of compound.

The alignment film formed of the polyamic acid or the derivative thereof having a photoisomerization structure in the main chain may be abbreviated as 「a photo-alignment film」.

The photo-alignment film used in the liquid crystal display device of the present invention is a photo-alignment film having alignment-controlling capability by radiating linearly polarized light.

When the alignment-controlling capability is applied to the photo-alignment film through radiation, a liquid crystal alignment agent of the present invention is applied to a substrate, preheated and dried on the substrate, and irradiated by linearly polarized ultraviolet (UV) light through a polarizer in a polarization direction to photoisomerize a photosensitive group in the polymer main chain approximately parallel to the polarization direction. The polymer main chain forming a film predominantly includes components in an approximately perpendicular direction with the polarization direction of the radiated ultraviolet (UV) light by the selective photoisomerization of the polymer main chain approximately parallel to the polarization direction. Accordingly, the substrate is heated to dehydrate/ring-close polyamic acid into a polyimide film and then is used to align liquid crystal molecules in a liquid crystal composition inserted into an assembled cell with a long axis in a perpendicular direction with the polarization direction of the radiated ultraviolet (UV) light. The radiation of linearly polarized ultraviolet (UV) light may be performed before the heating for polyimidization or after the polyimidization through the heating.

Terms used in the present invention are as described below. "Arbitrary" when defining a chemical formula means any of not only positions but also numbers. In chemical formulae, a group surrounding a character (for example, A) with a hexagon means a group (ring A) having a ring structure.

Tetracarboxylic dianhydride used for preparing polyamic acid or a derivative thereof of a liquid crystal display of the present invention will be explained below. Hereinafter, the description 「tetracarboxylic dianhydride」 may mean a single tetracarboxylic dianhydride, or a mixture of a plurality of tetracarboxylic dianhydrides.

The polyamic acid or the derivative thereof having a photoisomerization structure of the present invention is obtained by a reaction of at least one of tetracarboxylic dianhydrides or diamines having a photoisomerization structure selected from the following Formula (I) to Formula (VII).

[Formula 21]

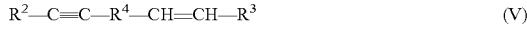

$R^2\text{—}N\text{=}N\text{—}R^3$ (VII)

In Formula (I) to Formula (VII), $R^2$ and $R^3$ are independently a monovalent organic group having —$NH_2$ or —CO—O—CO—, and $R^4$ is a divalent organic group including an aromatic ring.

The photo-alignment film of the present invention uses at least one of tetracarboxylic dianhydrides or diamines having a photoisomerization structure selected from the Formula (I) to Formula (VII) as a material, and thereby may implement good photosensitivity.

Preferable examples of the tetracarboxylic dianhydride materials having photoisomerization structure may be the following Formula (PAN-1) or Formula (PAN-2).

[Formula 22]

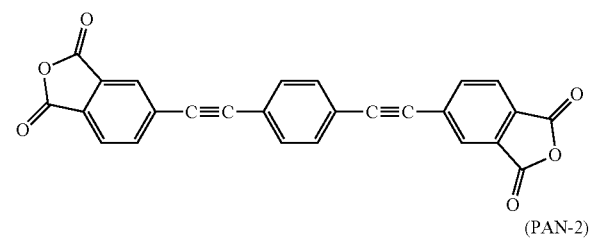

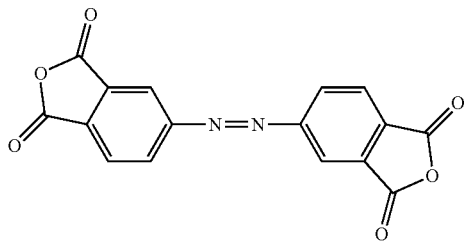

Preferable examples of the diamine having the photoisomerization structure material may be the following Formula (PDI-1) to Formula (PDI-8).

[Formula 23]

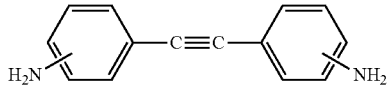

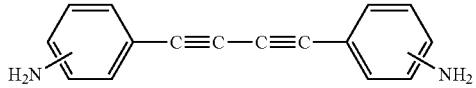

-continued

[Formula 24]

(PDI-3)
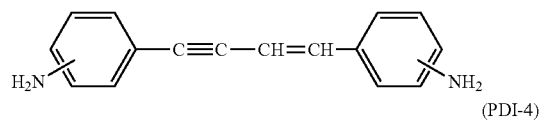

(PDI-4)
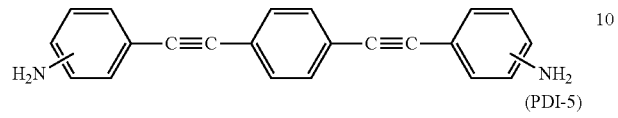

(PDI-5)
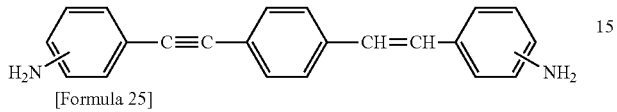

[Formula 25]

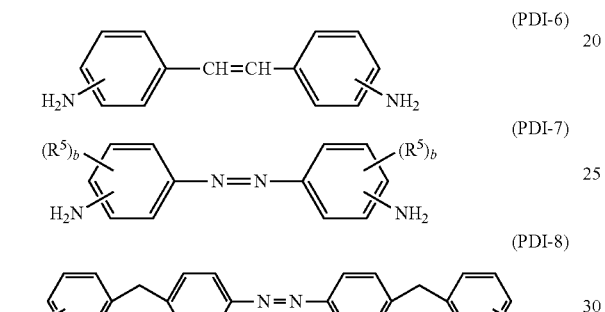

(PDI-6)

(PDI-7)

(PDI-8)

In Formula (PDI-1) to Formula (PDI-8), as for a group of which a bonding position is not fixed to any one of carbon atoms constituting a ring, the bonding position is arbitrary, and in Formula (PDI-7), $R^5$ is independently —CH$_3$, —OCH$_3$, —CF$_3$, or —COOCH$_3$, and b is an integer of 0 to 2.

From a viewpoint of reactivity and photosensitivity, the following Formula (PDI-6-1) or Formula (PDI-7-1) may be more preferable.

[Formula 26]

(PDI-6-1)
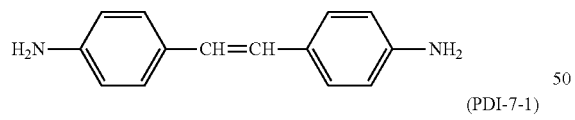

(PDI-7-1)
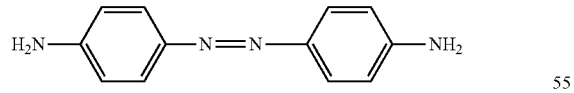

Tetracarboxylic dianhydrides in addition to the tetracarboxylic dianhydride having the photoisomerization structure may be further used, and may be selected from known tetracarboxylic dianhydrides without limitation. These tetracarboxylic dianhydrides may belong to either an aromatic system (including a complex aromatic ring system) in which dicarboxylic dianhydride is directly bound to an aromatic ring or an aliphatic system (including a complex ring system) in which dicarboxylic dianhydride is not directly bound to an aromatic ring.

The tetracarboxylic dianhydrides may be, for example, represented by Formula (AN-I) to Formula (AN-VII) in terms of ease of obtaining a raw material, ease of polymerization, and electrical characteristics of a film.

[Formula 27]

(AN-I)
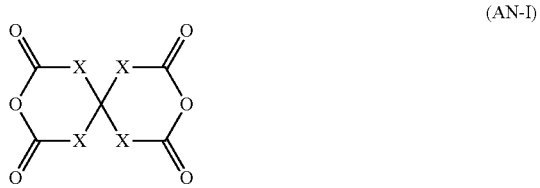

(AN-II)
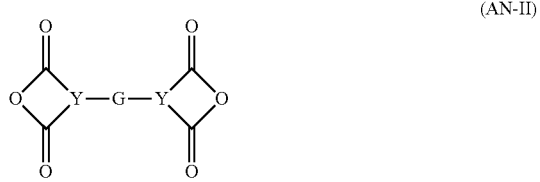

(AN-III)
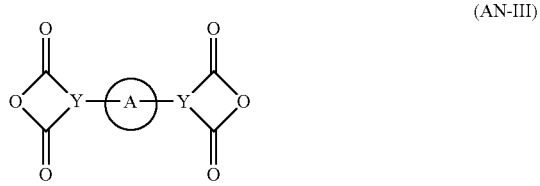

(AN-IV)
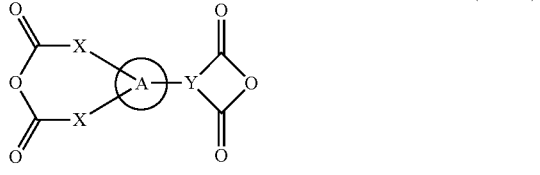

(AN-V)
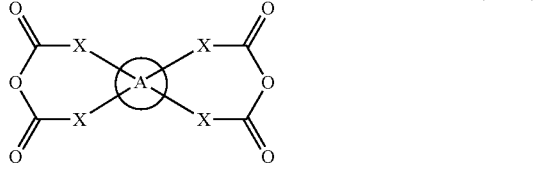

(AN-VI)
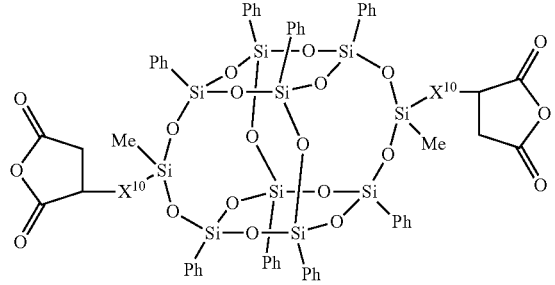

(AN-VII)

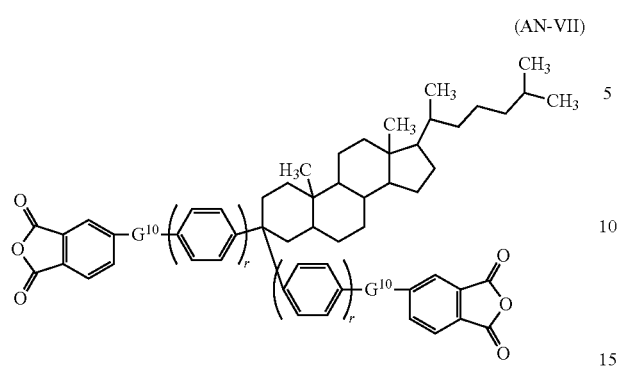

In Formula (AN-I), Formula (AN-IV), and Formula (AN-V), X is independently a single bond or —CH$_2$—;

in Formula (AN-II), G is a single bond, alkylene having 1 to 20 carbons, —CO—, —O—, —S—, —SO$_2$—, —C(CH$_3$)$_2$—, or —C(CF$_3$)$_2$—;

in Formula (AN-II) to Formula (AN-IV), Y is independently one selected from the group of the following trivalent groups,

[Formula 28]

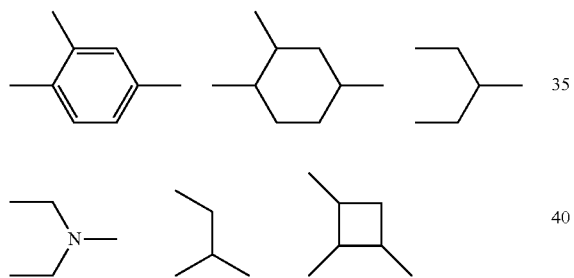

arbitrary hydrogen of the groups may be replaced by methyl, ethyl, or phenyl;

in Formula (AN-III) to Formula (AN-V), ring A is a monocyclic hydrocarbon group having 3 to 10 carbons or a condensed polycyclic hydrocarbon group having 6 to 10 carbons, wherein arbitrary hydrogen of the groups may be replaced by methyl, ethyl, or phenyl, and a bond bound to the ring is bound to arbitrary carbon constituting the ring, or two bonds may be bound to the same carbon;

in Formula (AN-VI), X$^{10}$ is alkylene having 2 to 6 carbons;

Me is methyl;

Ph is phenyl;

in Formula (AN-VII), G$^{10}$ is independently —O—, —COO—, or —OCO—; and, r is independently 0 or 1.

More particularly, a tetracarboxylic dianhydride represented by the following Formula (AN-1) to Formula (AN-16-14) may be exemplified.

[Formula 29]

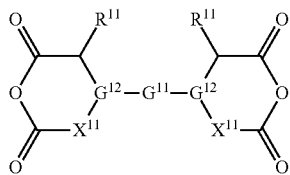
(AN-1)

In Formula (AN-1), G$^{11}$ is a single bond, alkylene having 1 to 12 carbons, 1,4-phenylene, or 1,4-cyclohexylene. X$^{11}$ is independently a single bond or —CH$_2$—. G$^{12}$ is independently one of the following trivalent groups.

[Formula 30]

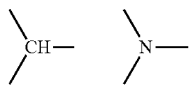

When G$^{12}$ is CH, hydrogen of CH may be replaced by —CH$_3$. When G$^{12}$ i??s N, G$^{11}$ is not a single bond or —CH$_2$—, and X$^{11}$ is not a single bond. R$^{11}$ is —H or —CH$_3$. Examples of the tetracarboxylic dianhydride represented by Formula (AN-1) may be the compounds of the following formulae.

[Formula 31]

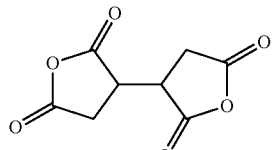
(AN-1-1)

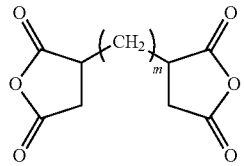
(AN-1-2)

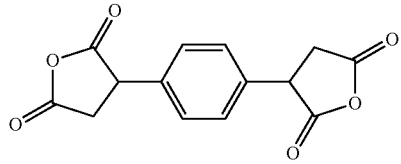
(AN-1-3)

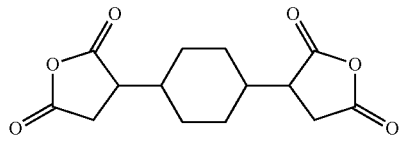
(AN-1-4)

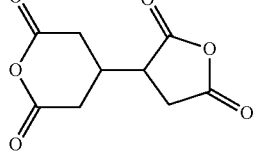
(AN-1-5)

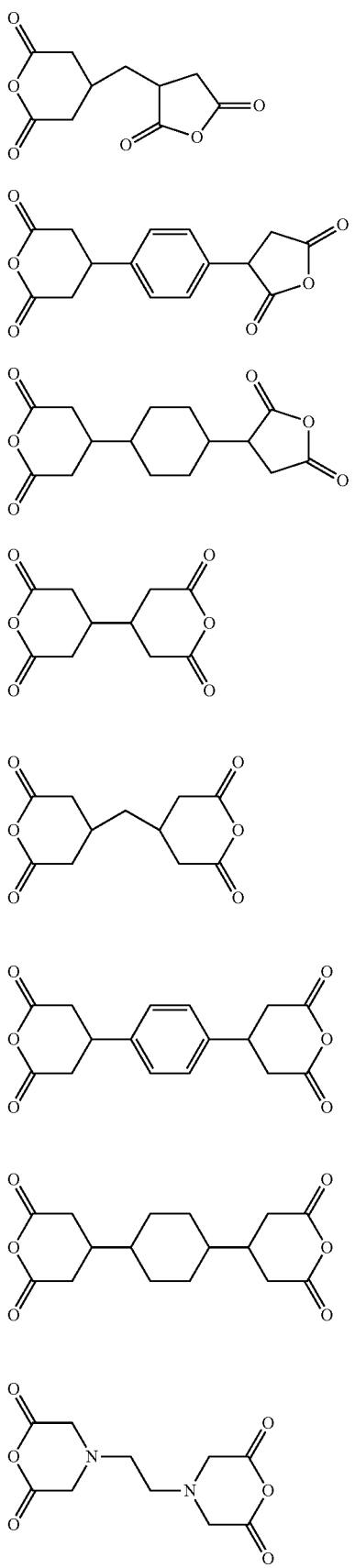
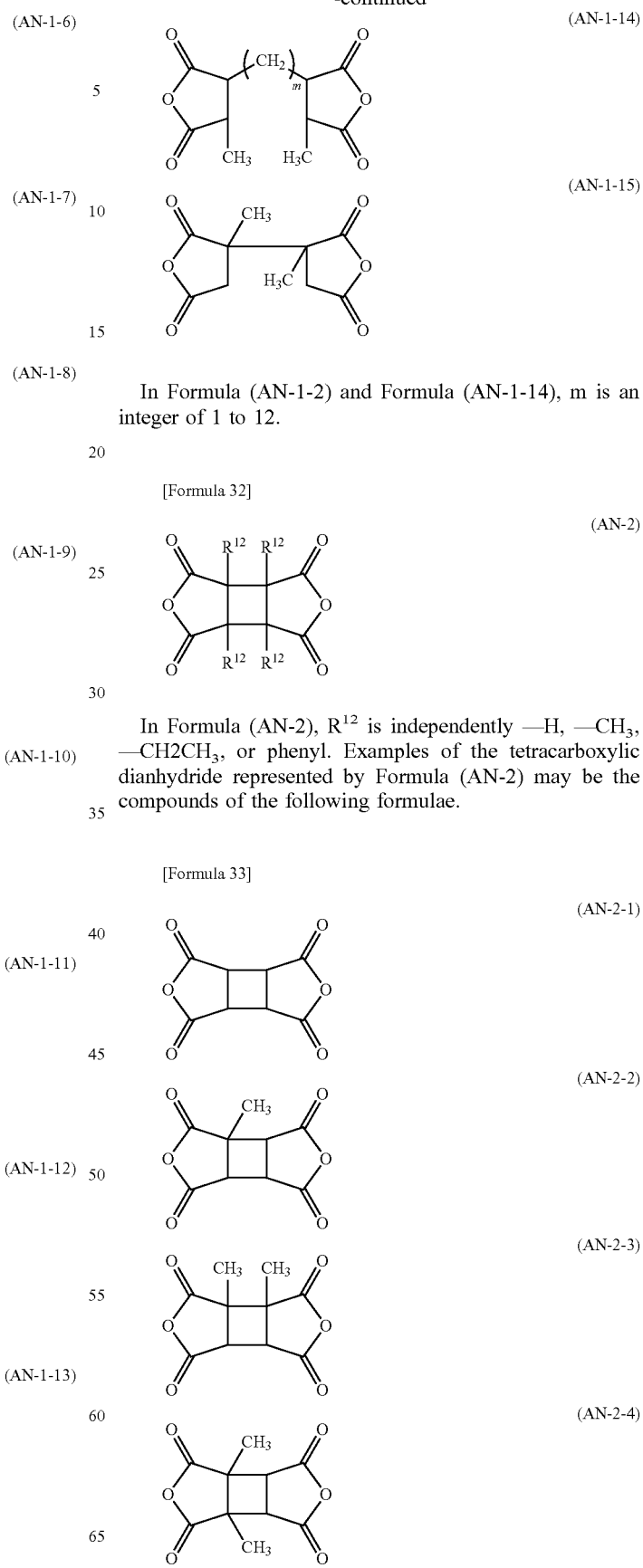
In Formula (AN-1-2) and Formula (AN-1-14), m is an integer of 1 to 12.
[Formula 32]
In Formula (AN-2), $R^{12}$ is independently —H, —CH$_3$, —CH2CH$_3$, or phenyl. Examples of the tetracarboxylic dianhydride represented by Formula (AN-2) may be the compounds of the following formulae.
[Formula 33]

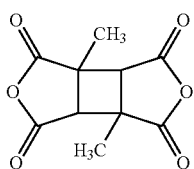
(AN-2-5)

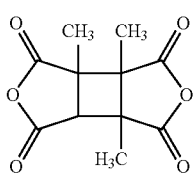
(AN-2-6)

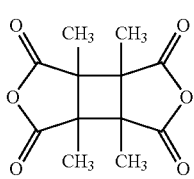
(AN-2-7)

[Formula 34]

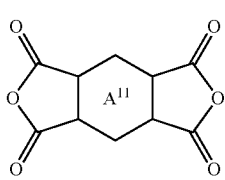
(AN-3)

In Formula (AN-3), ring $A^{11}$ is a cyclohexane ring or a benzene ring. Examples of the tetracarboxylic dianhydride represented by Formula (AN-3) may be the compounds of the following formulae.

[Formula 35]

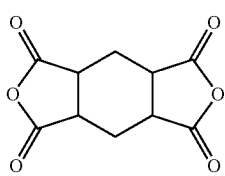
(AN-3-1)

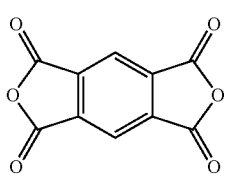
(AN-3-2)

[Formula 36]

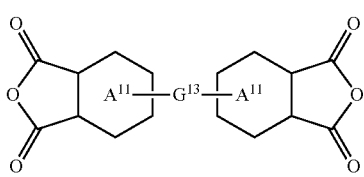
(AN-4)

In Formula (AN-4), $G^{13}$ is a single bond, —$CH_2$—, —$CH_2CH_2$—, —O—, —S—, —$C(CH_3)_2$—, —$SO_2$—, —CO—, —$C(CF_3)_2$—, or a divalent group represented by the following Formula (G13-1).

[Formula 37]

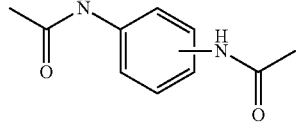
(G13-1)

The phenylene of Formula (G13-1) is preferably 1,4-phenylene and 1,3-phenylene.

The ring $A^{11}$ is independently a cyclohexane ring or a benzene ring. $G^{13}$ may be bound at an arbitrary position of the ring $A^{11}$. Examples of the tetracarboxylic dianhydride represented by Formula (AN-4) may be the compounds of the following formulae.

[Formula 38]

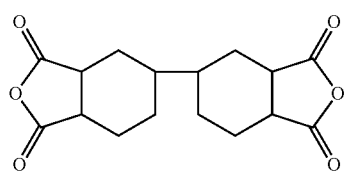
(AN-4-1)

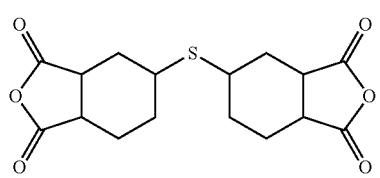
(AN-4-2)

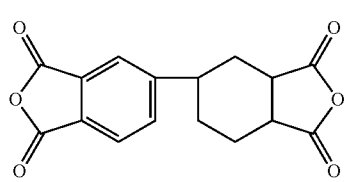
(AN-4-3)

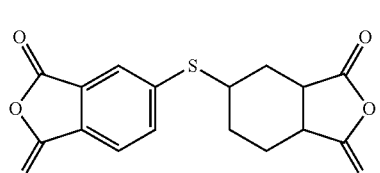
(AN-4-4)

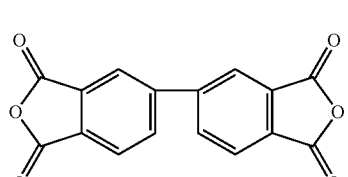
(AN-4-5)

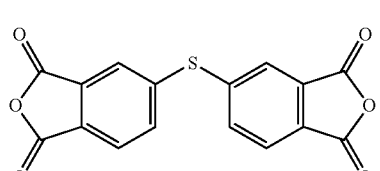
(AN-4-6)

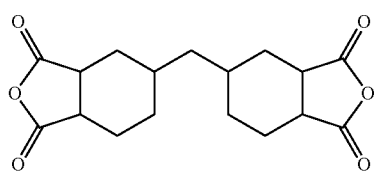
(AN-4-7)
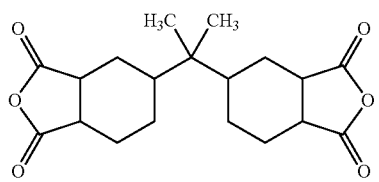
(AN-4-8)
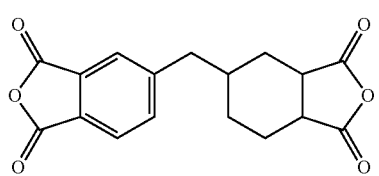
(AN-4-9)
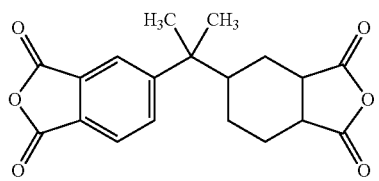
(AN-4-10)
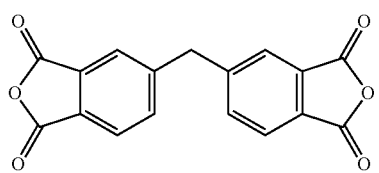
(AN-4-11)
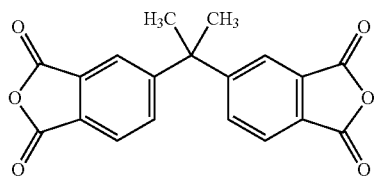
(AN-4-12)
[Formula 39]
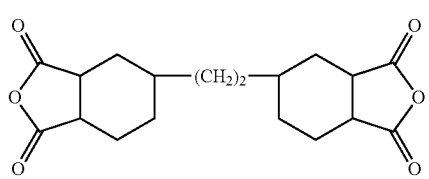
(AN-4-13)
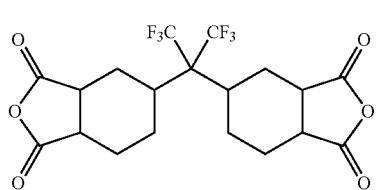
(AN-4-14)
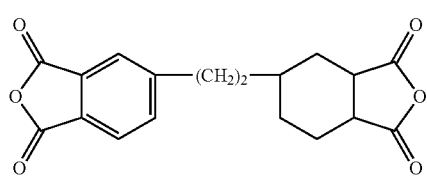
(AN-4-15)
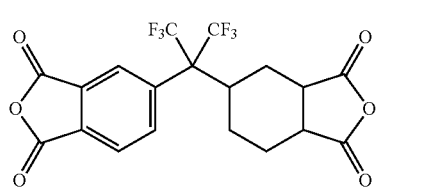
(AN-4-16)
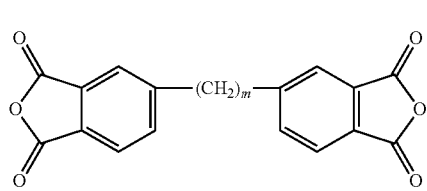
(AN-4-17)
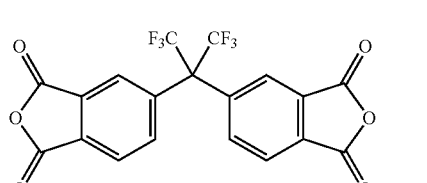
(AN-4-18)
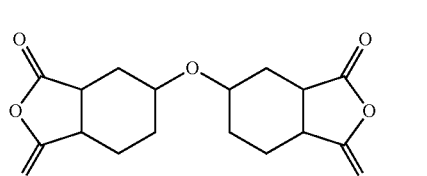
(AN-4-19)
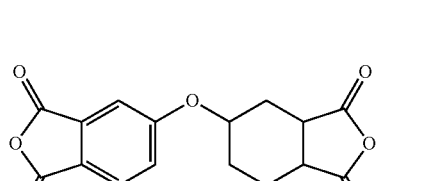
(AN-4-20)
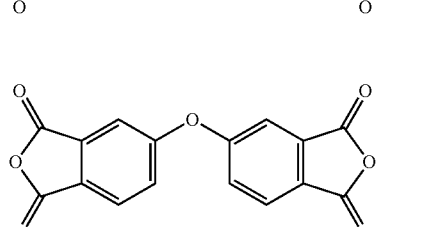
(AN-4-21)
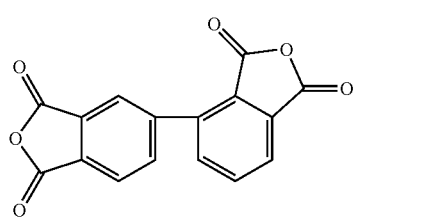
(AN-4-22)

(AN-4-23)

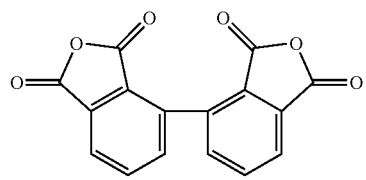

In Formula (AN-4-17), m is an integer of 1 to 12.

[Formula 40]

(AN-4-24)

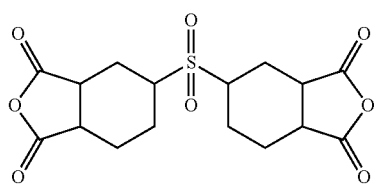

(AN-4-25)

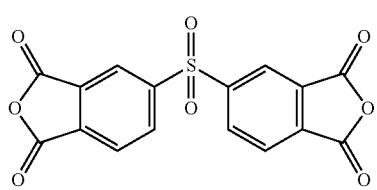

(AN-4-26)

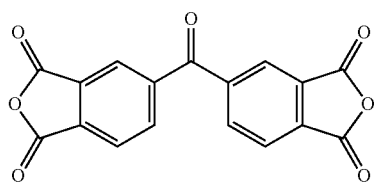

(AN-4-27)

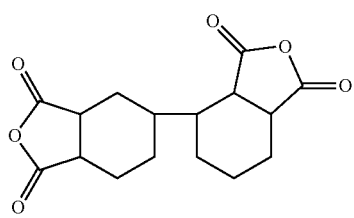

[Formula 41]

(AN-4-28)

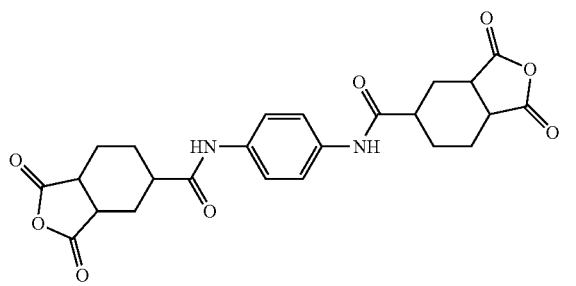

(AN-4-29)

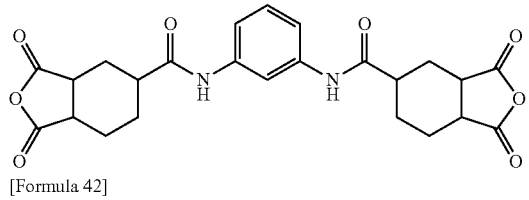

[Formula 42]

(AN-5)

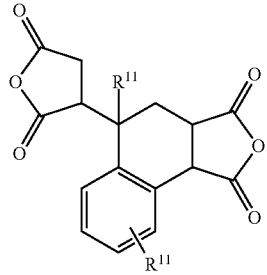

In Formula (AN-5), $R^{11}$ is —H or —CH$_3$. As long as a bonding position is not fixed to any one of carbon atoms constituting a benzene ring, $R^{11}$ may be bound at an arbitrary position of the benzene ring. Examples of the tetracarboxylic dianhydride represented by Formula (AN-5) may be the compounds of the following formulae.

[Formula 43]

(AN-5-1)

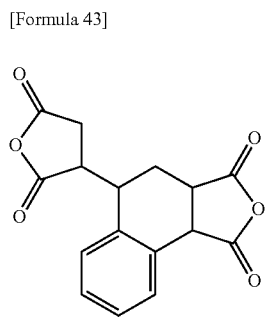

(AN-5-2)

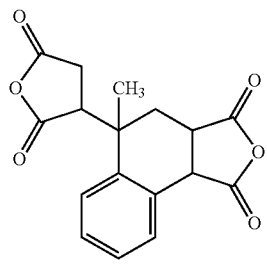

(AN-5-3)

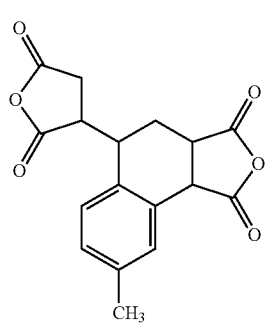

[Formula 44]

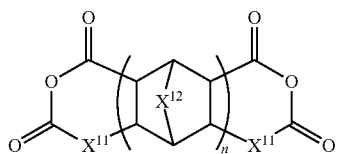

(AN-6)

In Formula (AN-6), $X^{11}$ is independently a single bond or —$CH_2$—. $X^{12}$ is —$CH_2$—, —$CH_2CH_2$—, or —CH=CH—. n is 1 or 2. Examples of the tetracarboxylic dianhydride represented by Formula (AN-6) may be the compounds of the following formulae.

[Formula 45]

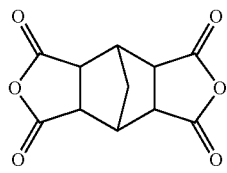

(AN-6-1)

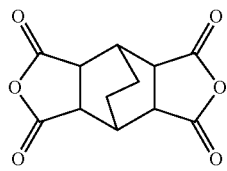

(AN-6-2)

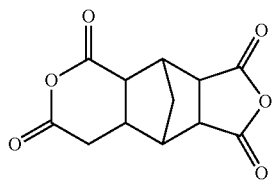

(AN-6-3)

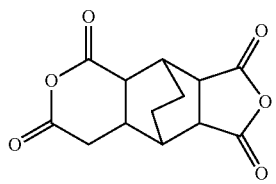

(AN-6-4)

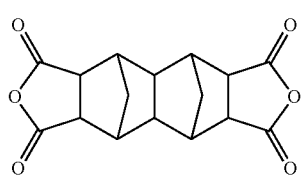

(AN-6-5)

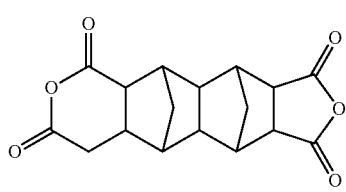

(AN-6-6)

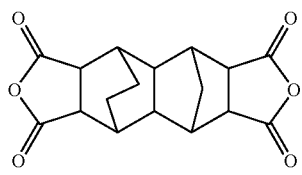

(AN-6-7)

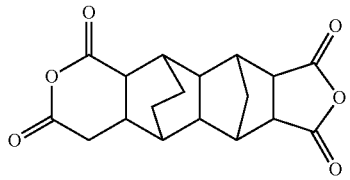

(AN-6-8)

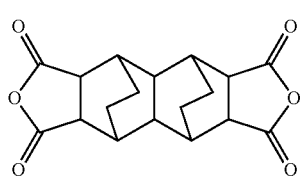

(AN-6-9)

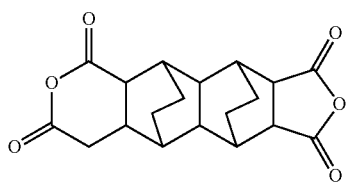

(AN-6-10)

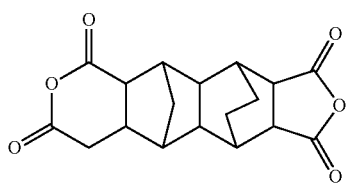

(AN-6-11)

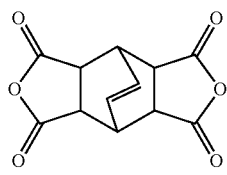

(AN-6-12)

[Formula 46]

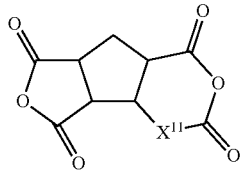

(AN-7)

In Formula (AN-7), $X^{11}$ is a single bond or —$CH_2$—. Examples of the tetracarboxylic dianhydride represented by Formula (AN-7) may be the compounds of the following formulae.

[Formula 47]

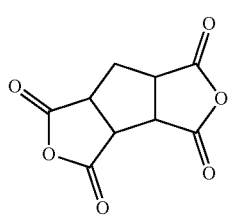
(AN-7-1)

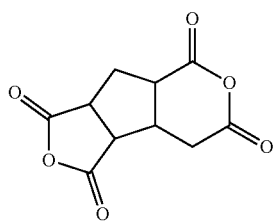
(AN-7-2)

[Formula 48]

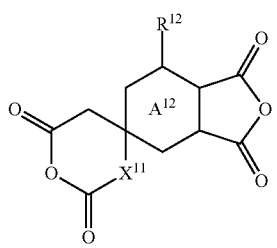
(AN-8)

In Formula (AN-8), $X^{11}$ is a single bond or —CH$_2$—. $R^{12}$ is —H, —CH$_3$, —CH2CH$_3$, or phenyl, and ring $A^{12}$ is a cyclohexane ring or a cyclohexene ring.

Examples of the tetracarboxylic dianhydride represented by Formula (AN-8) may be the compounds of the following formulae.

[Formula 49]

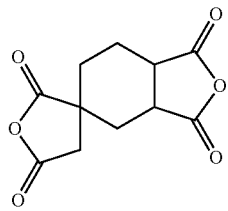
(AN-8-1)

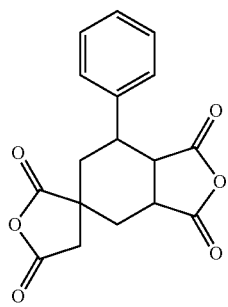
(AN-8-2)

[Formula 50]

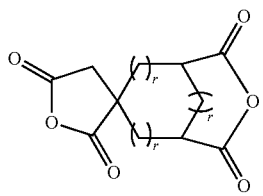
(AN-9)

In Formula (AN-9), r is independently 0 or 1. Examples of the tetracarboxylic dianhydride represented by Formula (AN-9) may be the compounds of the following formulae.

[Formula 51]

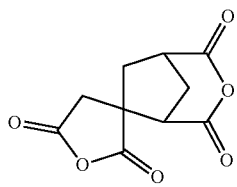
(AN-9-1)

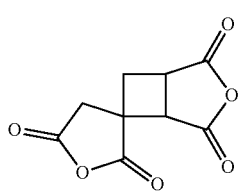
(AN-9-2)

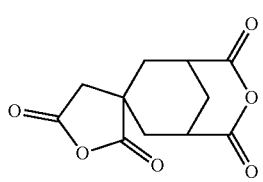
(AN-9-3)

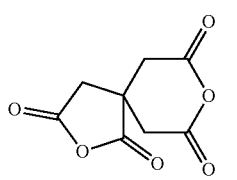
(AN-9-4)

The Formula (AN-10) is the following tetracarboxylic dianhydride.

[Formula 52]

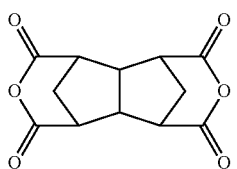
(AN-10)

-continued

[Formula 53]

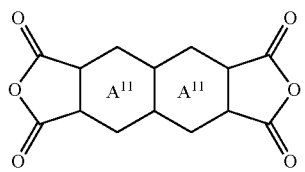
(AN-11)

In Formula (AN-11), ring $A^{11}$ is independently a cyclohexane ring or a benzene ring. Examples of the tetracarboxylic dianhydride represented by Formula (AN-11) may be the compounds of the following formulae.

[Formula 54]

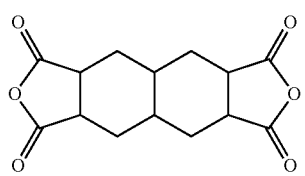
(AN-11-1)

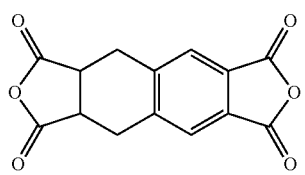
(AN-11-2)

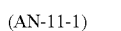
(AN-11-3)

[Formula 55]

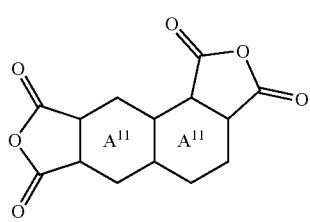
(AN-12)

In Formula (AN-12), ring $A^{11}$ is independently a cyclohexane ring or a benzene ring. Examples of the tetracarboxylic dianhydride represented by Formula (AN-12) may be the compounds of the following formulae.

[Formula 56]

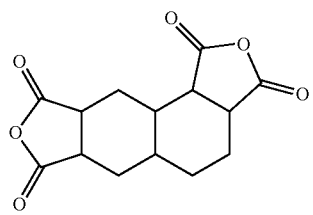
(AN-12-1)

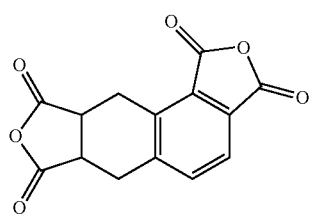
(AN-12-2)

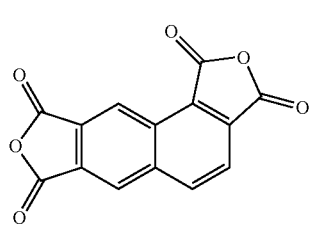
(AN-12-3)

[Formula 57]

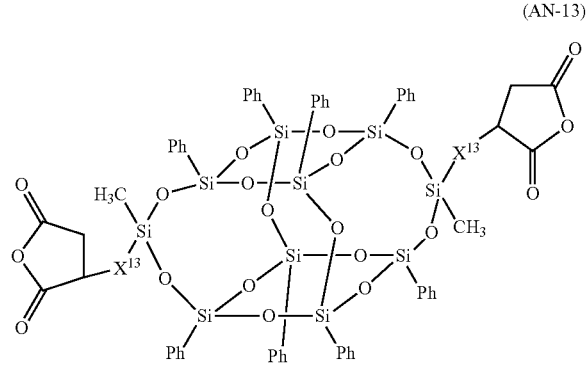
(AN-13)

In Formula (AN-13), $X^{13}$ is alkylene having 2 to 6 carbons, and Ph is phenyl. Examples of the tetracarboxylic dianhydride represented by Formula (AN-13) may be the compounds of the following formulae.

[Formula 58]
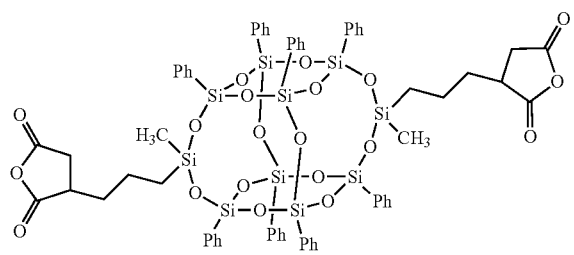
(AN-13-1)
[Formula 59]
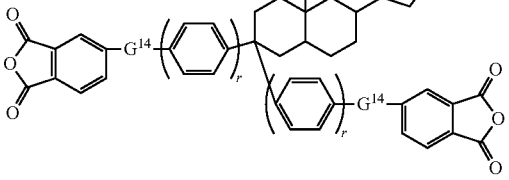
(AN-14)
In Formula (AN-14), $G^{14}$ is independently —O—, —COO—, or —OCO—, and r is independently 0 or 1. Examples of the tetracarboxylic dianhydride represented by Formula (AN-14) may be the compounds of the following formulae.
[Formula 60]
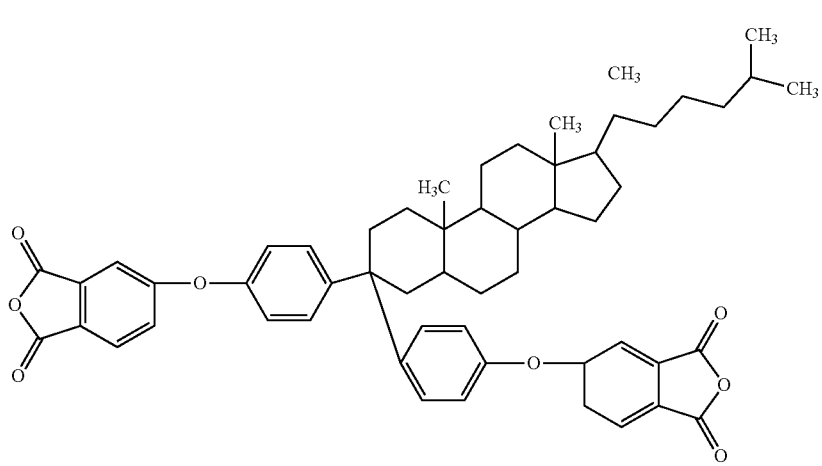
(AN-14-1)
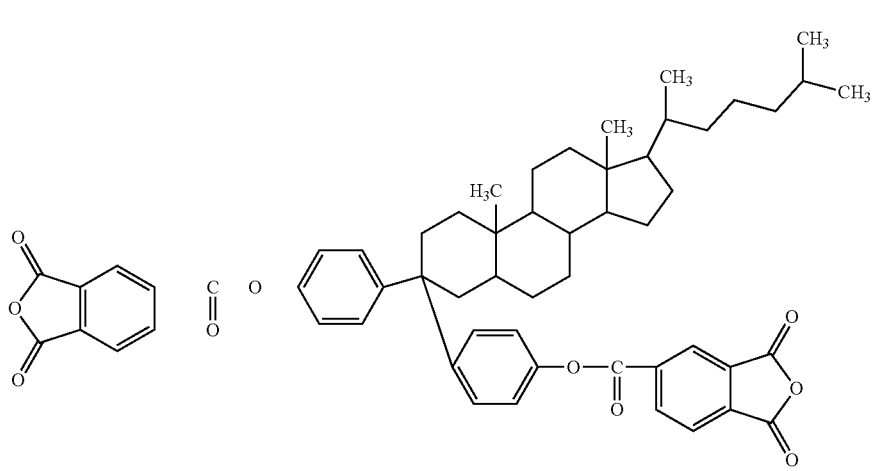
(AN-14-2)

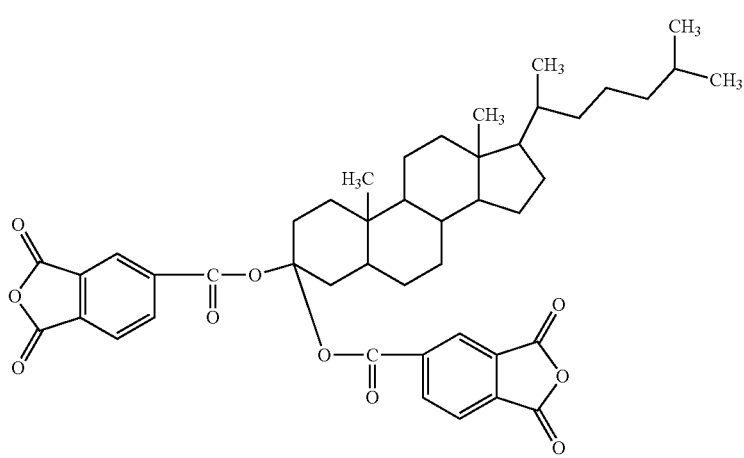
(AN-14-3)
[Formula 61]
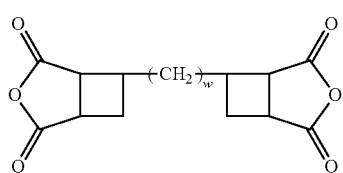
(AN-15)
In Formula (AN-15), w is an integer of 1 to 10. Examples of the tetracarboxylic dianhydride represented by Formula (AN-15) may be the compounds of the following formulae.
Other tetracarboxylic dianhydrides may be the following compounds.
[Formula 62]
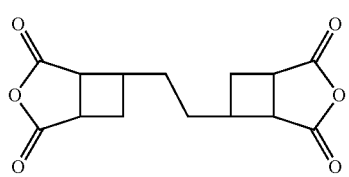
(AN-15-1)
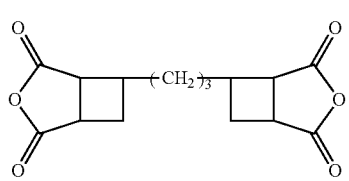
(AN-15-2)
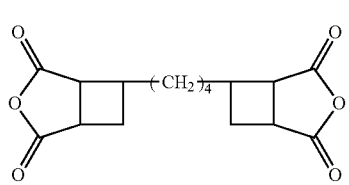
(AN-15-3)
[Formula 63]
(AN-16-1)
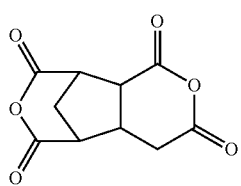
(AN-16-2)
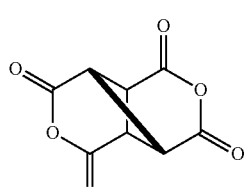
(AN-16-3)
(AN-16-4)

(AN-16-5) 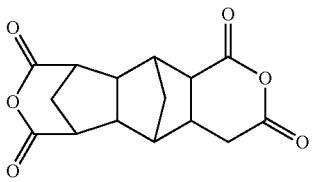

(AN-16-6) 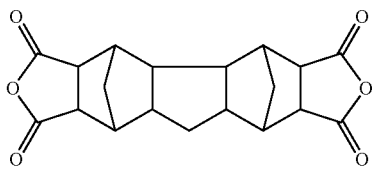

(AN-16-7) 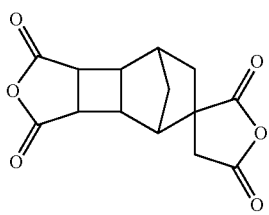

(AN-16-8) 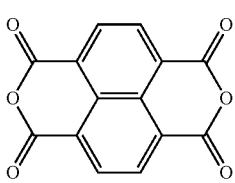

(AN-16-9)

(AN-16-10)

(AN-16-11)

(AN-16-12)

(AN-16-13) 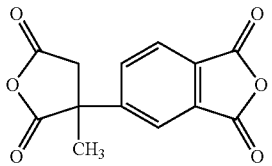

(AN-16-14) 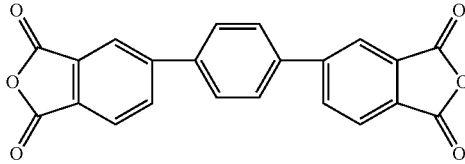

When alignment improvement of the liquid crystal display device is important, the compounds represented by Formula (AN-1-1), Formula (AN-1-13), Formula (AN-2-1), Formula (AN-3-1), Formula (AN-4-17), Formula (AN-4-28), and Formula (AN-4-29) of the acid dianhydrides may be particularly preferable.

When transmittance improvement of the liquid crystal display device is important, the compounds represented by Formula (AN-1-1), Formula (AN-1-13), Formula (AN-2-1), Formula (AN-3-1), Formula (AN-4-28), Formula (AN-4-29), Formula (AN-7-2), and Formula (AN-10) of the acid dianhydrides may be particularly preferable.

When electrical characteristics improvement of the liquid crystal display device is important, the compounds represented by Formula (AN-3-2), Formula (AN-4-5), Formula (AN-4-17), Formula (AN-4-21), Formula (AN-7-2), Formula (AN-10), and Formula (AN-11-3) of the acid dianhydrides may be particularly preferable.

Diamine used for preparation of the polyamic acid and the derivative thereof of the liquid crystal display device of the present invention will be explained below. In preparation of the polyamic acid and the derivative thereof of the present invention, diamine compounds in addition to the diamine compound having the photoisomerization structure may be further used, and known diamine compounds may be selected without limitation.

The diamine compound may be classified into two kinds in accordance with the structure. In other words, the diamine compound may be a diamine having a group branched from the main chain, that is, a side chain group, and a diamine having no side chain group, when a backbone connecting two amino groups is regarded as a main chain. This side chain group has an effect on widening a pretilt angle. The side chain group having this effect may be a group having greater than or equal to three carbons, and specifically, alkyl having 3 or more carbons, alkoxy having 3 or more carbons, alkoxyalkyl having 3 or more carbons, and a group having a steroid backbone. Herein, a group having 1 or more rings, in which a ring at the terminal end has one selected from alkyl having 1 or more carbons, alkoxy having 1 or more carbons, and alkoxyalkyl having 2 or more carbons as a substituent, has an effect as the side chain group. Hereinafter, a diamine having this side chain group may be called a side chain-type diamine. In addition, a diamine not having this side chain group may be called a non-side chain-type diamine.

The non-side chain-type diamine and the side chain-type diamine may be appropriately used to respectively correspond to each needed pretilt angle. The side chain-type diamine may be preferably used together unless it does damage to characteristics of the present invention. In addition, the side chain-type diamine and the non-side chain-type diamine may be selectively used in order to improve perpendicular alignment with liquid crystals, a voltage-holding ratio, a baking characteristic, and an alignment property.

The non-side chain-type diamine will be explained below. Known diamines without a side chain may be, for example, diamines of the following Formula (DI-1) to Formula (DI-15).

[Formula 64]

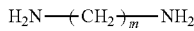
(DI-1)

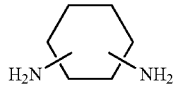
(DI-2)

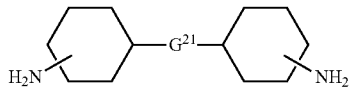
(DI-3)

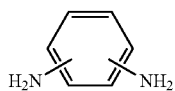
(DI-4)

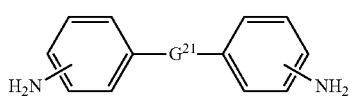
(DI-5)

(DI-6)

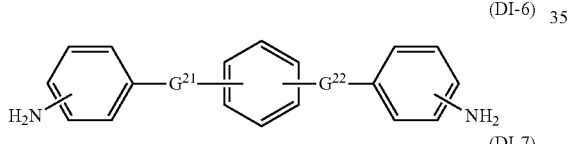
(DI-7)

In Formula (DI-1), m is an integer of 1 to 12, and arbitrary hydrogen of alkylene may be replaced by —OH. In Formula (DI-3) and Formula (DI-5) to Formula (DI-7), $G^{21}$ is independently a single bond, —NH—, —O—, —S—, —S—S—, —SO$_2$—, —CO—, —CONH—, —CONCH$_3$—, —NHCO—, —C(CH$_3$)$_2$—, —C(CF$_3$)$_2$—, —(CH$_2$)$_{m'}$—, —O—(CH$_2$)$_{m'}$—O—, —N(CH$_3$)—(CH$_2$)$_k$—N(CH$_3$)—, or —S—(CH$_2$)$_{m'}$—S—, m' is independently an integer of 1 to 12, and k is an integer of 1 to 5. In Formula (DI-6) and Formula (DI-7), $G^{22}$ is independently a single bond, —O—, —S—, —CO—, —C(CH$_3$)$_2$—, —C(CF$_3$)$_2$—, or alkylene having 1 to 10 carbons. Arbitrary —H of the cyclohexane ring and the benzene ring in Formula (DI-2) to Formula (DI-7) may be replaced by —F, —CH$_3$, —OH, —CF$_3$, —CO$_2$H, —CONH$_2$, or benzyl, or that in Formula (DI-4) may be replaced by the following Formula (DI-4-a) to Formula (DI-4-c). As for a group of which a bonding position is not fixed to any one of carbon atoms constituting a ring, the bonding position is arbitrary. A bonding position of NH$_2$ bound to the cyclohexane ring or benzene ring is arbitrary except a bonding position of $G^{21}$ or $G^{22}$.

[Formula 65]

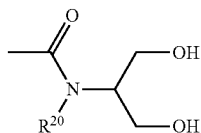
(DI-4-a)

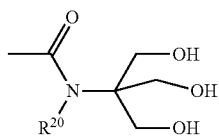
(DI-4-b)

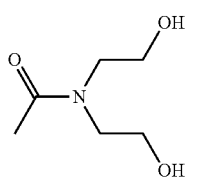
(DI-4-c)

In Formula (DI-4-a) and Formula (DI-4-b), $R^{20}$ is independently —H or —CH$_3$.

[Formula 66]

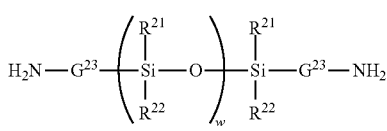
(DI-8)

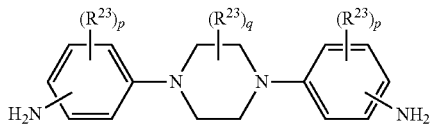
(DI-9)

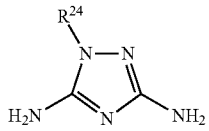
(DI-10)

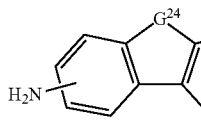
(DI-11)

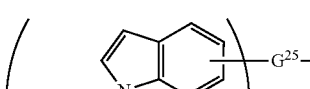
(DI-12)

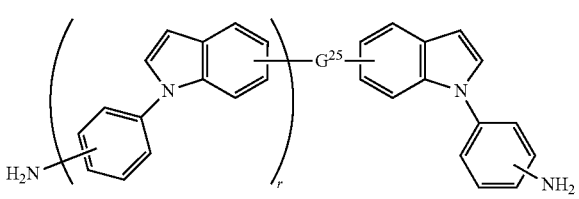

In Formula (DI-8), $R^{21}$ and $R^{22}$ are independently alkyl having 1 to 3 carbons or phenyl, $G^{23}$ is independently C1-C6 alkylene, phenylene, or alkyl-substituted phenylene, and w is an integer of 1 to 10.

In Formula (DI-9), $R^{23}$ is independently alkyl having 1 to 5 carbons, alkoxy having 1 to 5 carbons, or —Cl, p is independently an integer of 1 to 3, and q is independently an integer of 0 to 4.

In Formula (DI-10), $R^{24}$ is —H, alkyl having 1 to 4 carbons, phenyl, or benzyl.

In Formula (DI-11), $G^{24}$ is —$CH_2$— or —NH—.

In Formula (DI-12), $G^{25}$ is a single bond, alkylene having 2 to 6 carbons, or 1,4-phenylene, and r is 0 or 1. As for a group of which a bonding position is not fixed to any one of carbon atoms constituting a ring, the bonding position is arbitrary.

In Formula (DI-9), Formula (DI-11), and Formula (DI-12), a bonding position of $NH_2$ bound to the benzene ring is arbitrary.

[Formula 67]

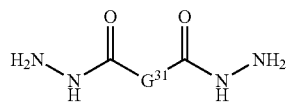 (DI-13)

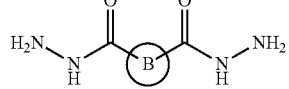 (DI-14)

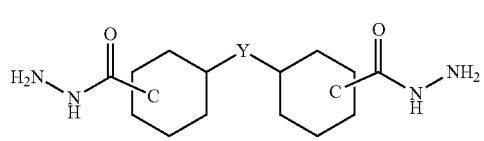 (DI-15)

In Formula (DI-13), $G^{31}$ is a single bond, alkylene having 1 to 20 carbons, —CO—, —O—, —S—, —$SO_2$—, —$C(CH_3)_2$—, or —$C(CF_3)_2$—;

in Formula (DI-14), ring B may be a cyclohexane ring, a benzene ring, or a naphthalene ring, where arbitrary hydrogen of the rings may be replaced by methyl, ethyl, or phenyl;

in Formula (DI-15), rings C are each independently a cyclohexane ring or a benzene ring, where arbitrary hydrogen of the rings may be replaced by methyl, ethyl, or phenyl; and Y is a single bond, alkylene having 1 to 20 carbons, —CO—, —O—, —S—, —$SO_2$—, —$C(CH_3)_2$—, or —$C(CF_3)_2$—.

Examples of the diamine without a side chain of the Formula (DI-1) to Formula (DI-15) may be the following Formula (DI-1-1) to Formula (DI-15-6).

Examples of diamines represented by Formulae (DI-1) to (DI-3) are shown below.

[Formula 68]

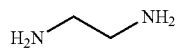 (DI-1-1)

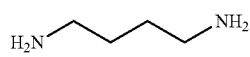 (DI-1-2)

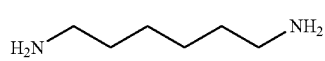 (DI-1-3)

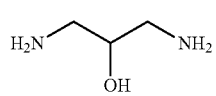 (DI-1-4)

 (DI-2-1)

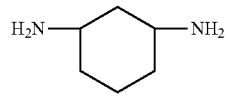 (DI-2-2)

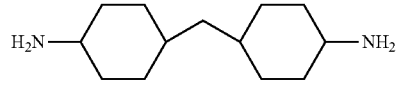 (DI-3-1)

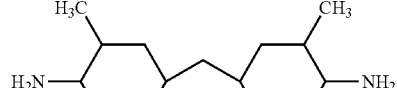 (DI-3-2)

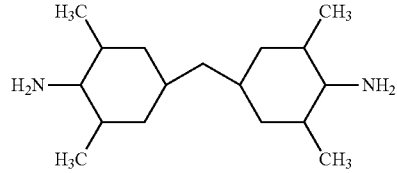 (DI-3-3)

Examples of diamines represented by Formula (DI-4) are shown below.

[Formula 69]

 (DI-4-1)

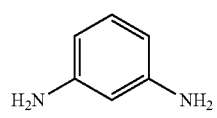 (DI-4-2)

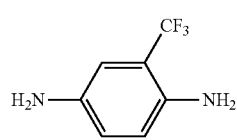 (DI-4-3)

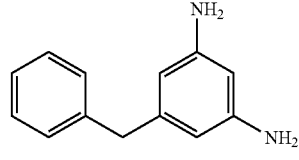 (DI-4-4)

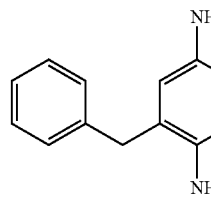 (DI-4-5)

[Formula 70]

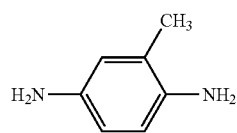 (DI-4-6)

(DI-4-7) 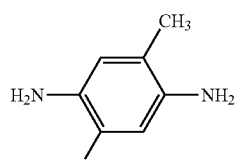
(DI-4-8) 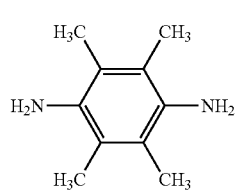
(DI-4-9) 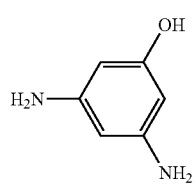
(DI-4-10) 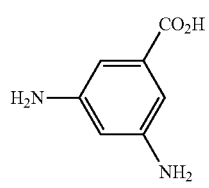
(DI-4-11) 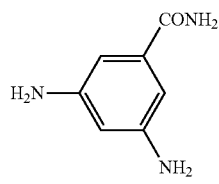
[Formula 71]
(DI-4-12) 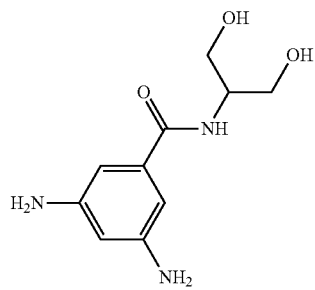
(DI-4-13) 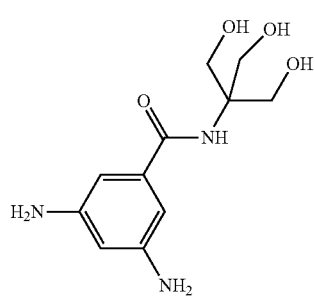
(DI-4-14) 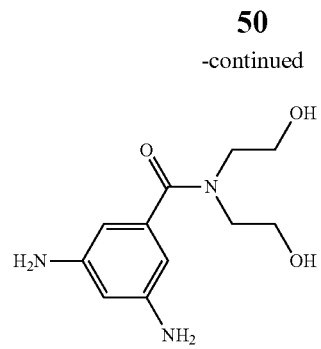
Examples of diamines represented by Formula (DI-5) are shown below.
[Formula 72]
(DI-5-1) 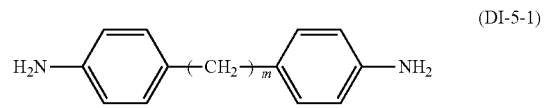
(DI-5-2) 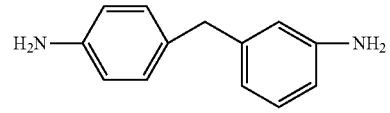
(DI-5-3) 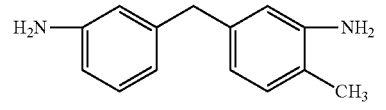
(DI-5-4) 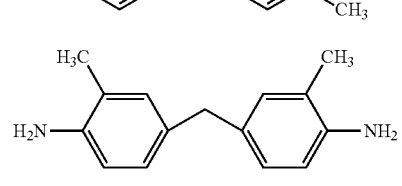
(DI-5-5) 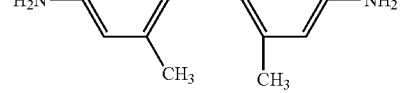
(DI-5-6) 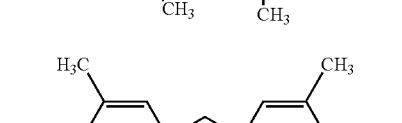
(DI-5-7) 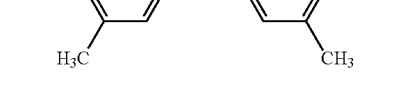
(DI-5-8) 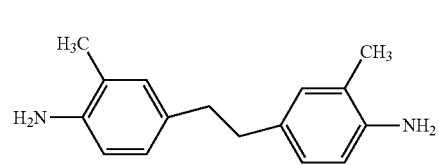

In Formula (DI-5-1), m is an integer of 1 to 12.
[Formula 73]
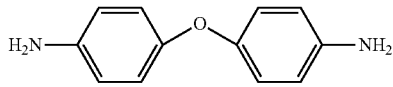 (DI-5-9)
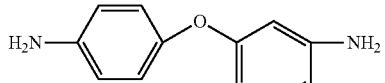 (DI-5-10)
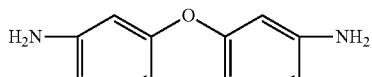 (DI-5-11)
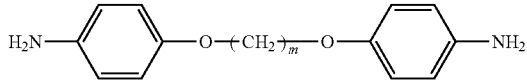 (DI-5-12)
 (DI-5-13)
In Formula (DI-5-12) and Formula (DI-5-13), m is an integer of 1 to 12.
[Formula 74]
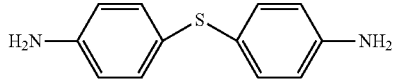 (DI-5-14)
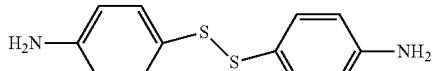 (DI-5-15)
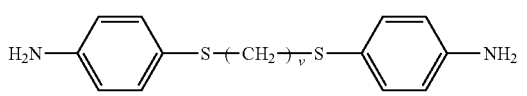 (DI-5-16)
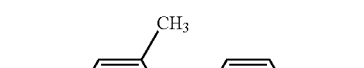 (DI-5-17)
 (DI-5-18)
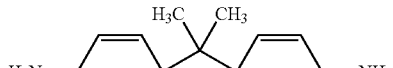 (DI-5-19)
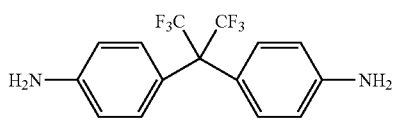 (DI-5-19)
-continued
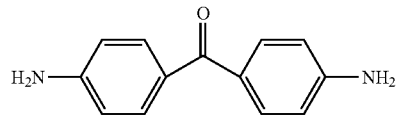 (DI-5-20)
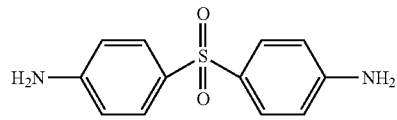 (DI-5-21)
In Formula (DI-5-16), v is an integer of 1 to 6.
[Formula 75]
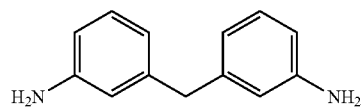 (DI-5-22)
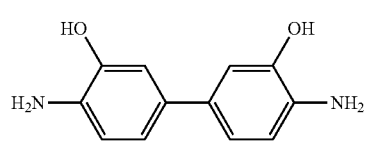 (DI-5-23)
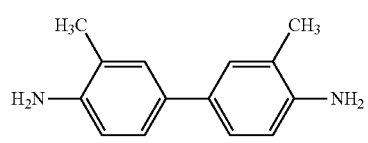 (DI-5-24)
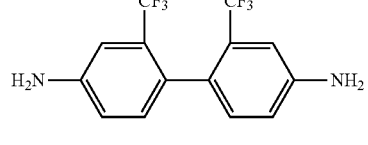 (DI-5-25)
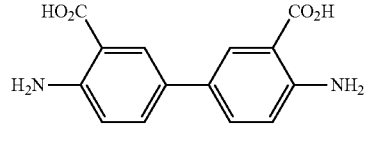 (DI-5-26)
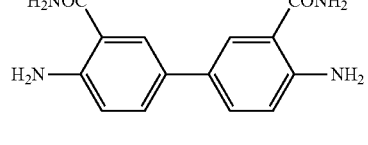 (DI-5-27)
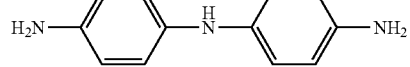 (DI-5-28)
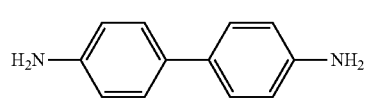 (DI-5-29)
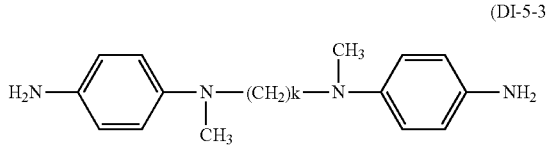 (DI-5-30)

(DI-5-31)
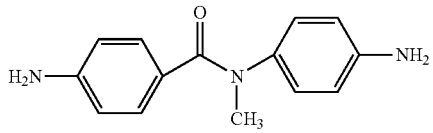
(DI-6-4)
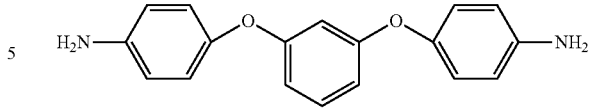
In Formula (DI-5-30), k is an integer of 1 to 5.
Examples of diamines represented by Formula (DI-6) are shown below.
[Formula 76]
(DI-6-1)
(DI-6-2)
(DI-6-3)
(DI-6-5)
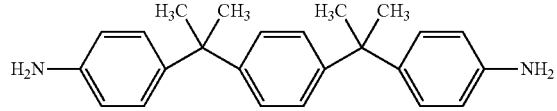
(DI-6-6)
(DI-6-7)
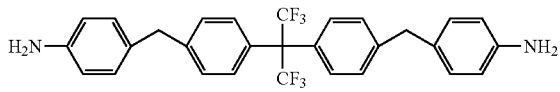
Examples of diamines represented by Formula (DI-7) are shown below.
[Formula 77]
(DI-7-1)
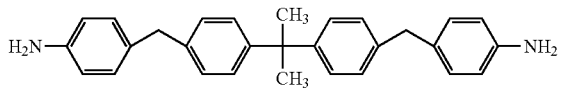
(DI-7-2)
(DI-7-3)
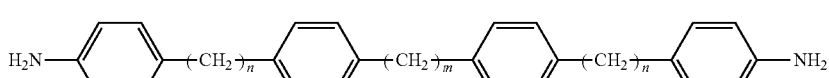
(DI-7-4)
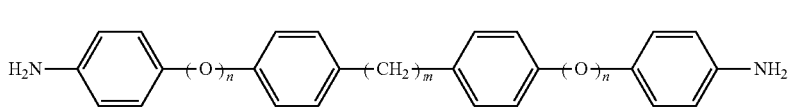
(DI-7-5)
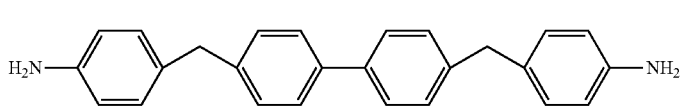

In Formula (DI-7-3) and Formula (DI-7-4), m is an integer of 1 to 12, and n is independently 1 or 2.
[Formula 78]
(DI-7-6)
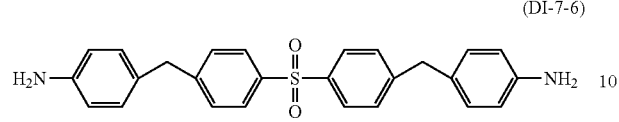
(DI-7-7)
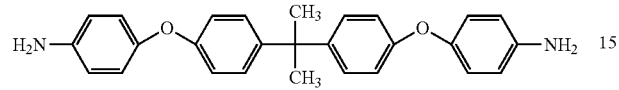
(DI-7-8)
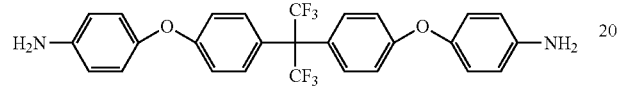
(DI-7-9)
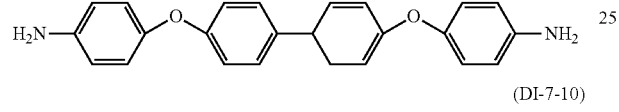
(DI-7-10)
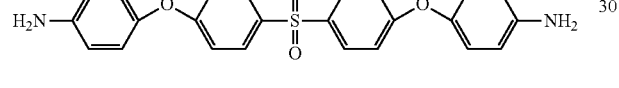
Examples of diamines represented by Formula (DI-8) are shown below.
[Formula 79]
(DI-8-1)
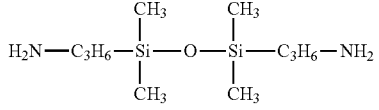
Examples of diamines represented by Formula (DI-9) are shown below.
[Formula 80]
(DI-9-1)
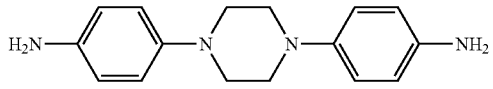
(DI-9-2)
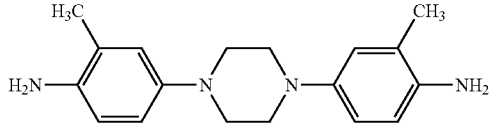
[Formula 81]
(DI-9-3)
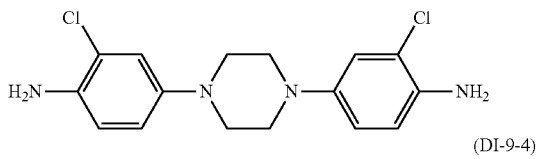
(DI-9-4)
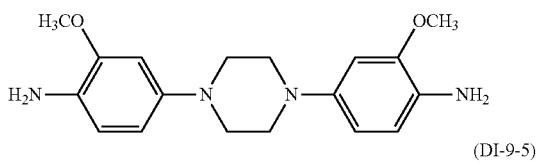
(DI-9-5)
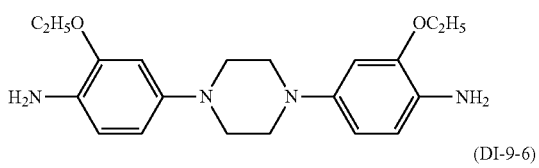
(DI-9-6)
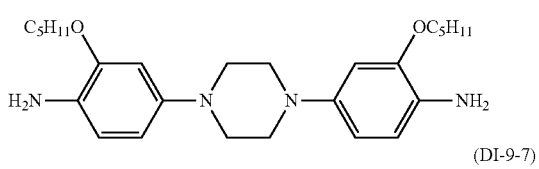
(DI-9-7)
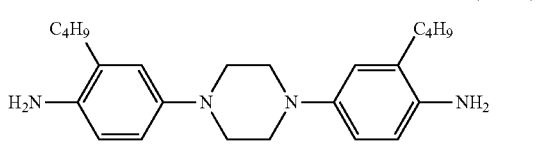
(DI-9-8)
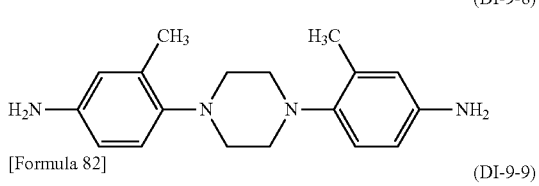
[Formula 82]
(DI-9-9)
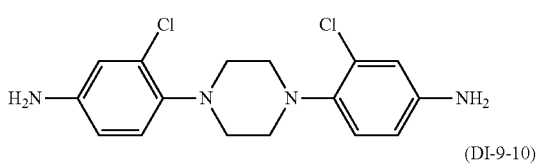
(DI-9-10)
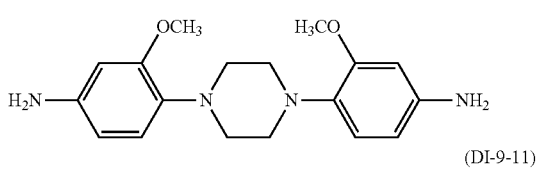
(DI-9-11)
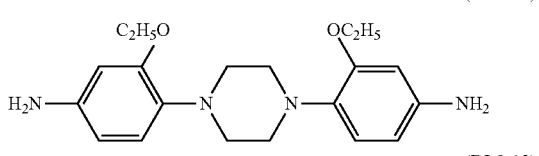
(DI-9-12)
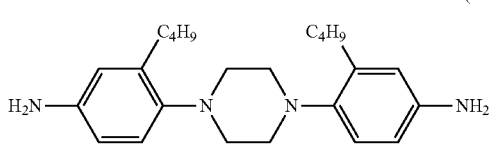

-continued (DI-9-13)

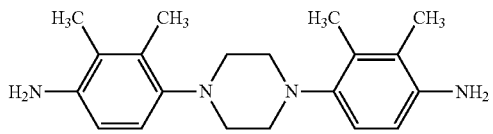

Examples of diamines represented by Formula (DI-10) are shown below.

[Formula 83]

(DI-10-1)
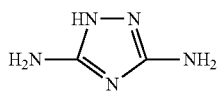

(DI-10-2)
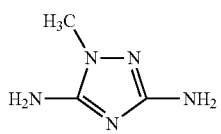

(DI-10-3)
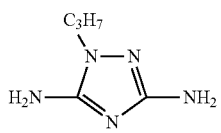

Examples of diamines represented by Formula (DI-11) are shown below.

[Formula 84]

(DI-11-1)
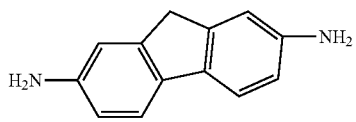

(DI-11-2)
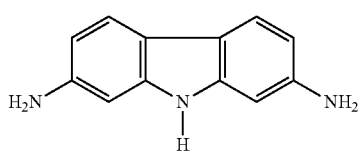

Examples of diamines represented by Formula (DI-12) are shown below.

[Formula 85]

(DI-12-1)
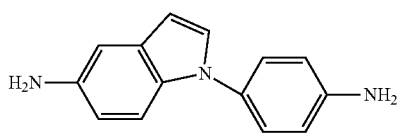

Examples of diamines represented by Formula (DI-13) are shown below.

[Formula 86]

(DI-13-1)
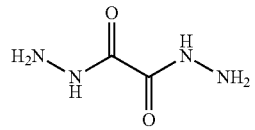

(DI-13-2)
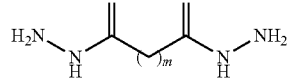

In Formula (DI-13-2), m is an integer of 1 to 12.

Examples of diamines represented by Formula (DI-14) are shown below.

[Formula 87]

(DI-14-1)
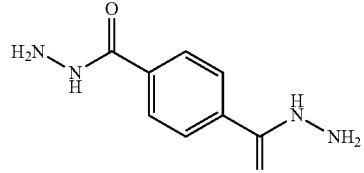

(DI-14-2)
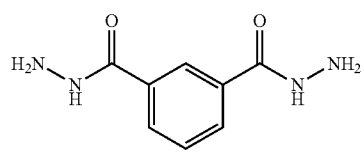

(DI-14-3)
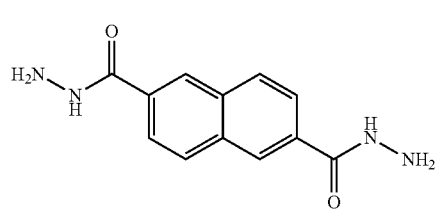

Examples of diamines represented by Formula (DI-15) are shown below.

[Formula 88]

(DI-15-1)
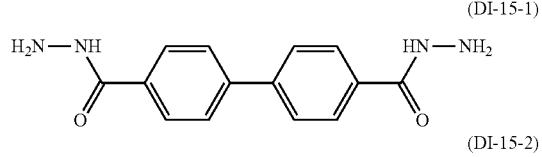

(DI-15-2)
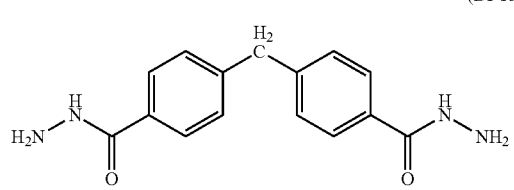

-continued

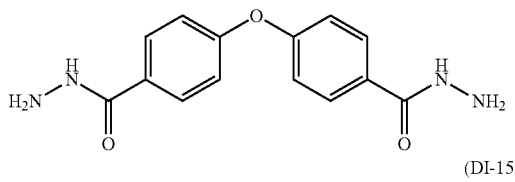
(DI-15-3)

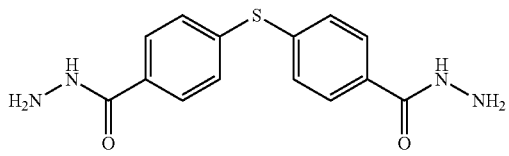
(DI-15-4)

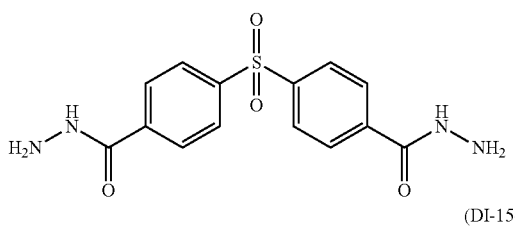
(DI-15-5)

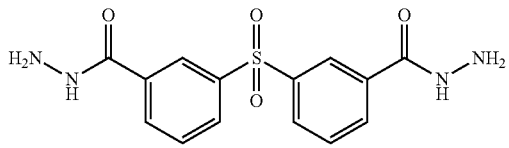
(DI-15-6)

The side chain-type diamine will be explained below. The side chain group of the side chain-type diamine may be the following groups.

Examples of the side chain group may be alkyl, alkyloxy, alkyloxyalkyl, alkylcarbonyl, alkylcarbonyloxy, alkyloxycarbonyl, alkylaminocarbonyl, alkenyl, alkenyloxy, alkenylcarbonyl, alkenylcarbonyloxy, al kenyloxycarbonyl, alkenylaminocarbonyl, alkynyl, alkynyloxy, alkynylcarbonyl, alkynylcarbonyloxy, alkynyloxycarbonyl, alkynylaminocarbonyl, and the like. In the above groups, the alkyl, alkenyl, and alkynyl have 3 or more carbons. The alkyloxyalkyl has 3 or more carbons in the whole group. The above groups may be linear or branched.

Examples may be a ring-structure group such as phenyl, phenylalkyl, phenylalkyloxy, phenyloxy, phenylcarbonyl, phenylcarbonyloxy, phenyloxycarbonyl, phenylaminocarbonyl, phenylcyclohexyloxy, cycloalkyl having 3 or more carbons, cyclohexylalkyl, cyclohexyloxy, cyclohexyloxycarbonyl, cyclohexylphenyl, cyclohexylphenylalkyl, cyclohexylphenyloxy, bis(cyclohexyl)oxy, bis(cyclohexyl)alkyl, bis(cyclohexyl)phenyl, bis(cyclohexyl)phenylalkyl, bis(cyclohexyl)oxycarbonyl, bis(cyclohexyl)phenyloxycarbonyl, and cyclohexylbis(phenyl)oxycarbonyl, as long as the group has alkyl having 1 or more carbons, alkoxy having 1 or more carbons, or alkoxyalkyl having 2 or more carbons at the terminal end as a substituent.

Examples may be a group having two or more benzene rings, a group having two or more cyclohexane rings, or a group including two or more rings of a benzene ring and a cyclohexane ring, wherein a bonding group is independently a single bond, —O—, —COO—, —OCO—, —CONH—, or alkylene having 1 to 3 carbons, or a ring combination having alkyl having 1 or more carbons, a fluorine-substituted alkyl having 1 or more carbons, alkoxy having 1 or more carbons, or alkoxyalkyl having 2 or more carbons as a substituent of the end ring. A group having a steroid backbone may be effectively used as a side chain group.

Examples of a diamine having a side chain may be compounds represented by Formula (DI-16) to Formula (DI-20).

[Formula 89]

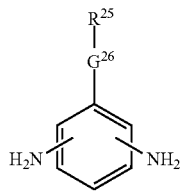
(DI-16)

In Formula (DI-16), $G^{26}$ is a single bond, —O—, —COO—, —OCO—, —CO—, —CONH—, —CH$_2$O—, —OCH$_2$—, —CF$_2$O—, —OCF$_2$—, or —(CH$_2$)$_{m'}$—, and m' is an integer of 1-12. Preferable examples of $G^{26}$ may be a single bond, —O—, —COO—, —OCO—, —CH$_2$O—, and alkylene having 1 to 3 carbons, and particularly preferable examples may be a single bond, —O—, —COO—, —OCO—, —CH$_2$O—, —CH$_2$—, and —CH$_2$CH$_2$—. $R^{25}$ is alkyl having 3 to 30 carbons, phenyl, a group having a steroid backbone, or a group represented by the following Formula (DI-16-a). In the alkyl, arbitrary —H may be replaced by —F, and arbitrary —CH$_2$— may be replaced by —O—, —CH═CH—, or —C≡C—. —H of the phenyl may be replaced by —F, —CH$_3$, —OCH$_3$, —OCH$_2$F, —OCHF$_2$, —OCF$_3$, alkyl having 3 to 30 carbons, or alkoxy having 3 to 30 carbons, and —H of the cyclohexyl may be replaced by alkyl having 3 to 30 carbons or alkoxy having 3 to 30 carbons. A position of bonding an —NH$_2$ group to a benzene ring is arbitrary, but the bonding positions are preferably meta or para. That is, the bonding position of the group 「$R^{25}$-$G^{26}$-」 is defined to be position 1, and two bonding positions are preferably position 3 and position 5, or position 2 and position 5.

[Formula 90]

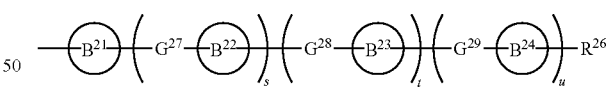
(DI-16-a)

In Formula (DI-16-a), $G^{27}$, $G^{28}$, and $G^{29}$ are bonding groups, which are independently a single bond, or alkylene having 1 to 12 carbons, where one or more —CH$_2$— of the alkylene may be replaced with —O—, —COO—, —OCO—, —CONH—, or —CH═CH—. Ring $B^{21}$, ring $B^{22}$, ring $B^{23}$, and ring $B^{24}$ are independently 1,4-phenylene, 1,4-cyclohexylene, 1,3-dioxane-2,5-diyl, pyrimidine-2,5-diyl, pyridine-2,5-diyl, naphthalene-1,5-diyl, naphthalene-2,7-diyl, or anthracene-9,10-diyl, where arbitrary —H of the ring $B^{21}$, ring $B^{22}$, ring $B^{23}$, and ring $B^{24}$ may be replaced with —F or —CH$_3$, s, t, and u are independently integers of 0 to 2, the sum thereof is 1-5, when s, t, or u is 2, two bonding groups in each parenthesis may be the same or different, and two rings may be the same or different. $R^{26}$ is —F, —OH, alkyl having 1 to 30 carbons, fluorine-substituted alkyl having 1 to 30 carbons, alkoxy having 1 to 30 carbons, —CN, —OCH$_2$F, —OCHF$_2$, or —OCF$_3$, wherein arbitrary —CH$_2$— of the alkyl having 1 to 30 carbons may be replaced with a divalent group represented by the following Formula (DI-16-b).

[Formula 91]

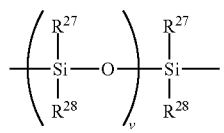

(DI-16-b)

In Formula (DI-16-b), $R^{27}$ and $R^{28}$ are independently alkyl having 1 to 3 carbons, and v is an integer of 1 to 6. Preferable examples of $R^{26}$ may be alkyl having 1 to 30 carbons and alkoxy having 1 to 30 carbons.

[Formula 92]

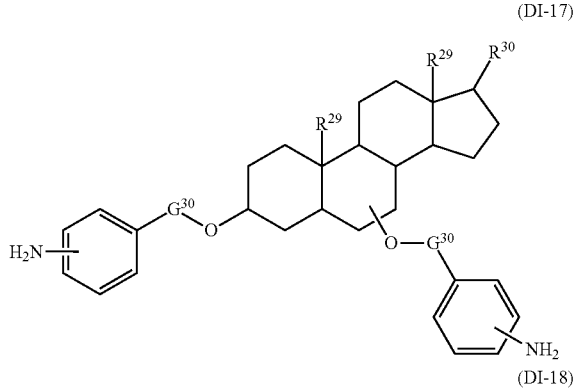

(DI-17)

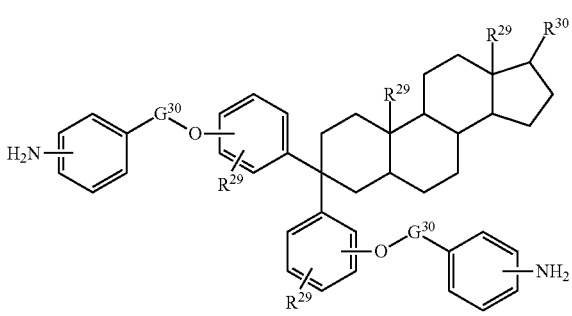

(DI-18)

In Formula (DI-17) and Formula (DI-18), $G^{30}$ is independently a single bond, —CO—, or —CH$_2$—, $R^{29}$ is independently —H or —CH$_3$, and $R^{30}$ is —H, alkyl having 1 to 20 carbons, or alkenyl having 2 to 20 carbons. In Formula (DI-18), one —H of the benzene ring may be replaced with alkyl having 1 to 20 carbons or phenyl. As for a group of which a bonding position is not fixed to any one of carbon atoms constituting a ring, the bonding position is arbitrary. One of two groups of ⌜-phenylene-$G^{30}$-O—⌟ is preferably bound to position 3 of a steroid nucleus, and the other is preferably bound to position 6 of the steroid nucleus in Formula (DI-17). Bonding positions of two groups of ⌜-phenylene-$G^{30}$-O—⌟ to a benzene ring are preferably a meta position or a para position relative to a position of bonding with a steroid nucleus in Formula (DI-18). In Formula (DI-17) and Formula (DI-18), a bonding position of NH$_2$ bound to the benzene ring is arbitrary.

[Formula 93]

(DI-19)

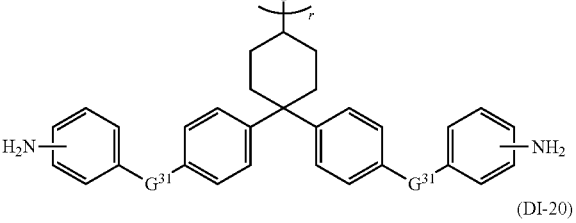

(DI-20)

In Formula (DI-19) and Formula (DI-20), $G^{31}$ is independently —O— or C1-C6 alkylene, and $G^{32}$ is a single bond or alkylene having 1 to 3 carbons. $R^{31}$ may be —H or alkyl having 1 to 20 carbons, where arbitrary —CH$_2$— of the alkyl may be replaced with —O—, —CH═CH—, or —C≡C—. $R^{32}$ is alkyl having 6 to 22 carbons, and $R^{33}$ is —H or alkyl having 1 to 22 carbons. Ring $B^{25}$ is 1,4-phenylene or 1,4-cyclohexylene, and r is 0 or 1. A bonding position of NH$_2$ bound to the benzene ring is arbitrary, but may preferably be a meta position or a para position relative to a bonding position of $G^{31}$.

Examples of the side chain-type diamine will be explained below. Examples of diamine compounds having a side chain represented by Formula (DI-16) to Formula (DI-20) may be compounds represented by the following Formula (DI-16-1) to Formula (DI-20-3).

Examples of the compound represented by Formula (DI-16) are shown below.

[Formula 94]

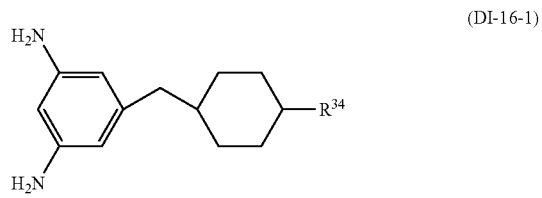

(DI-16-1)

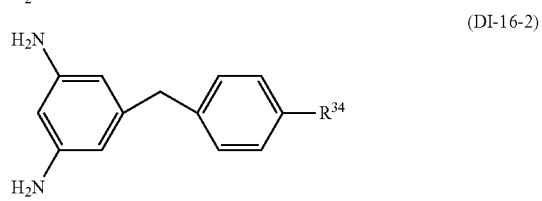

(DI-16-2)

(DI-16-3)
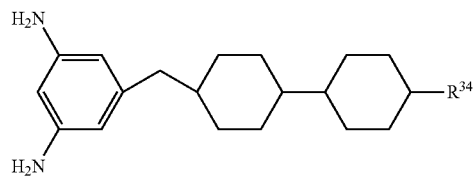

(DI-16-4)
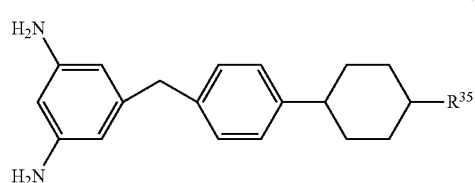

(DI-16-5)
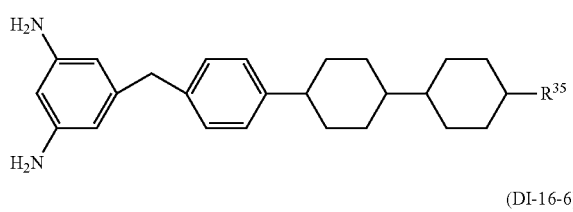

(DI-16-6)
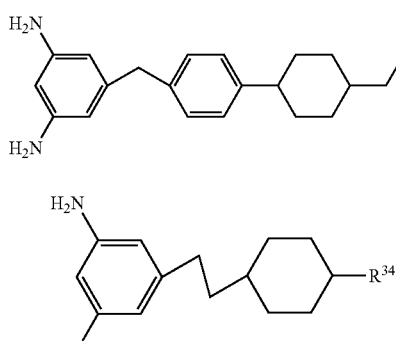

(DI-16-7)
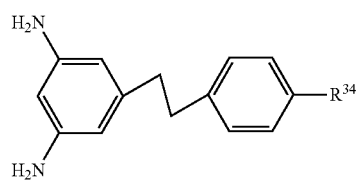

(DI-16-8)
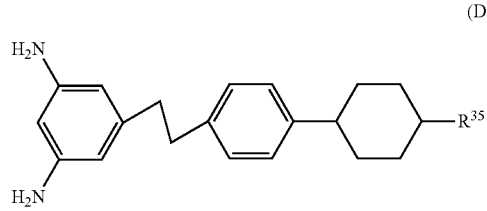

(DI-16-9)
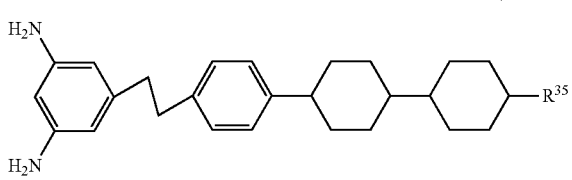

(DI-16-10)

(DI-16-11)
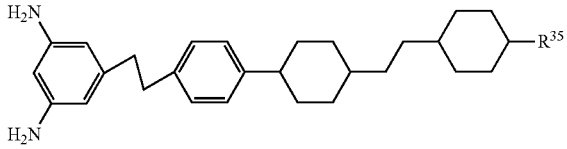

In Formula (DI-16-1) to Formula (DI-16-11), $R^{34}$ is alkyl having 1 to 30 carbons or alkoxy having 1 to 30 carbons, and preferably alkyl having 5 to 25 carbons or alkoxy having 5 to 25 carbons. $R^{35}$ is alkyl having 1 to 30 carbons or alkoxy having 1 to 30 carbons, and preferably alkyl having 3 to 25 carbons or alkoxy having 3 to 25 carbons.

[Formula 95]

(DI-16-12)
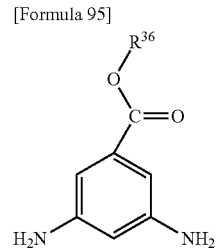

(DI-16-13)

(DI-16-14)
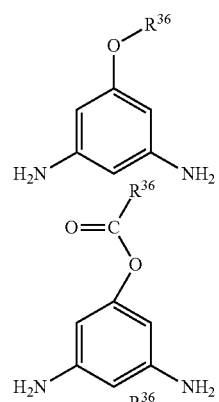

(DI-16-15)

(DI-16-16)
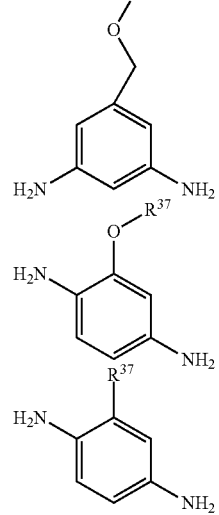

(DI-16-17)

In Formula (DI-16-12) to Formula (DI-16-17), $R^{36}$ is alkyl having 4 to 30 carbons, and preferably alkyl having 6 to 25 carbons. $R^{35}$ is alkyl having 6 to 30 carbons, and preferably alkyl having 8 to 25 carbons.

[Formula 96]
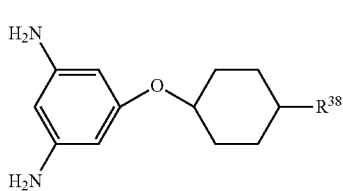 (DI-16-18)
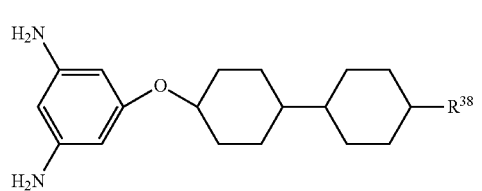 (DI-16-19)
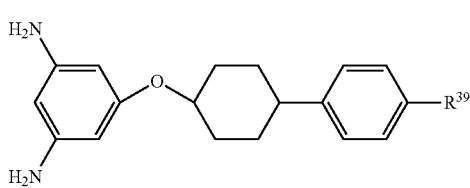 (DI-16-20)
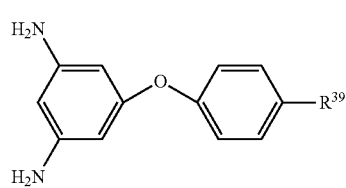 (DI-16-21)
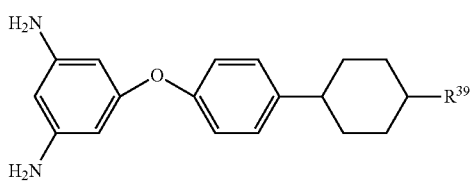 (DI-16-22)
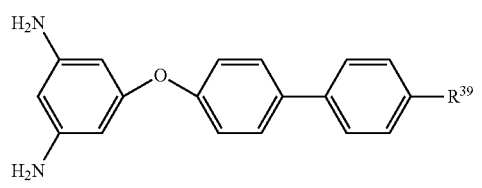 (DI-16-23)
[Formula 97]
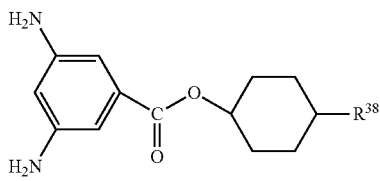 (DI-16-24)
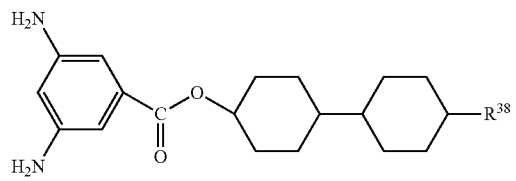 (DI-16-25)
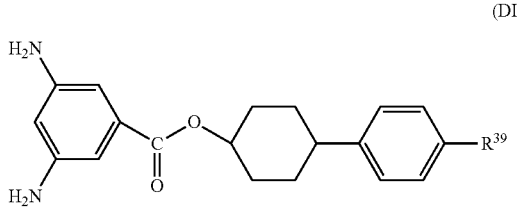 (DI-16-26)
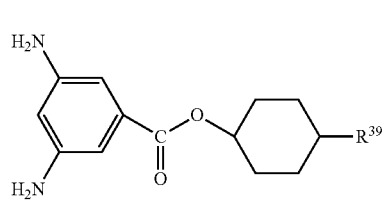 (DI-16-27)
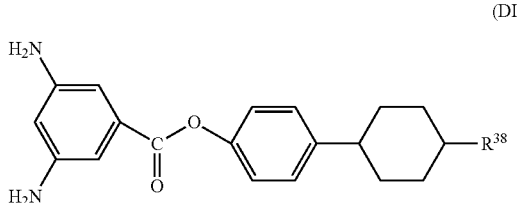 (DI-16-28)
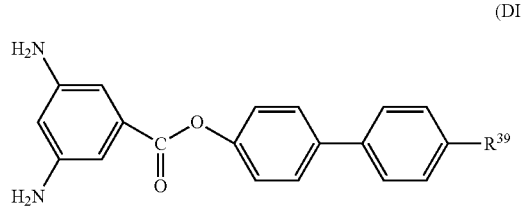 (DI-16-29)
[Formula 98]
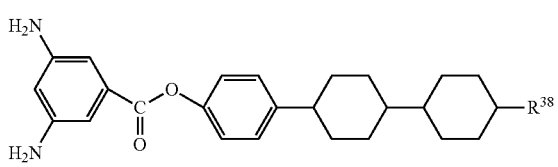 (DI-16-30)
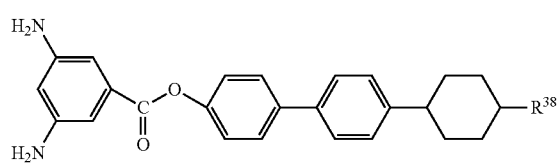 (DI-16-31)

(DI-16-32)
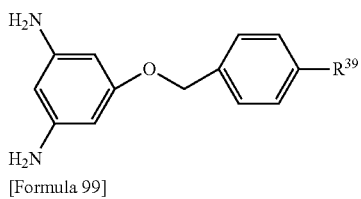
[Formula 99]

(DI-16-33)
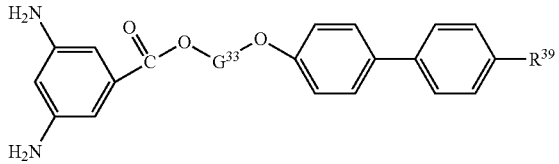

(DI-16-34)
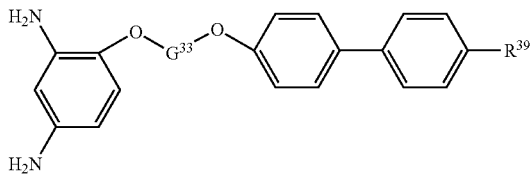

(DI-16-35)
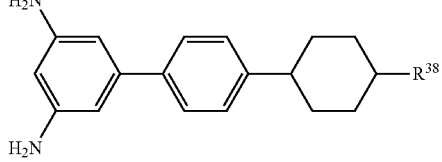

(DI-16-36)
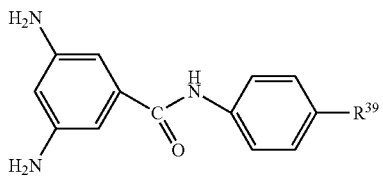
[Formula 100]

(DI-16-37)
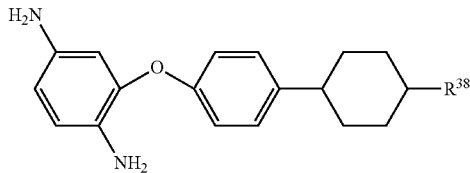

(DI-16-38)
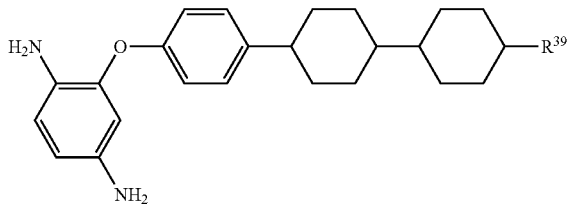

(DI-16-39)
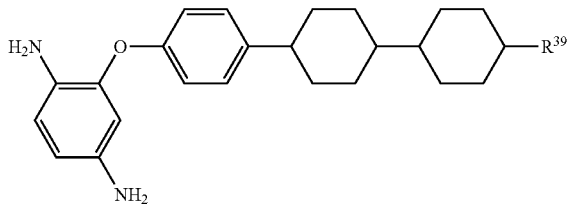

(DI-16-40)
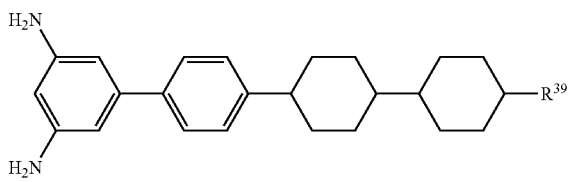

(DI-16-41)
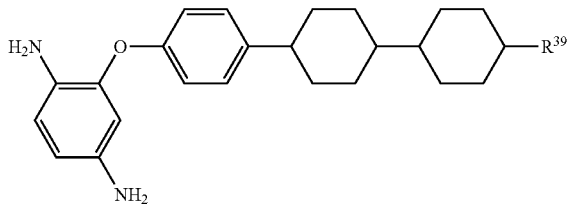

(DI-16-42)
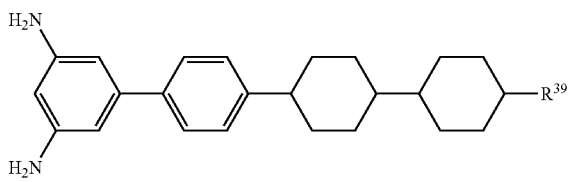

(DI-16-43)
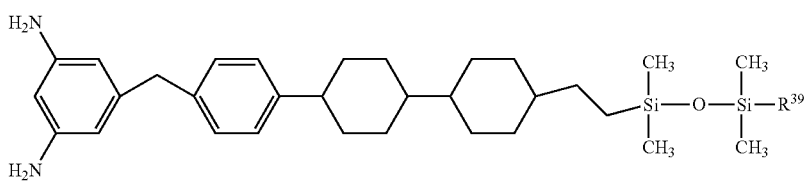

In Formula (DI-16-18) to Formula (DI-16-43), $R^{38}$ is alkyl having 1 to 20 carbons or alkoxy having 1 to 20 carbons, and preferably alkyl having 3 to 20 carbons or alkoxy having 3 to 20 carbons. $R^{39}$ is preferably —H, —F, alkyl having 1 to 30 carbons, alkoxy having 1 to 30 carbons, —CN, —OCH$_2$F, —OCHF$_2$, or —OCF$_3$, alkyl having 3 to 25 carbons, or alkoxy having 3 to 25 carbons. $G^{33}$ is alkylene having 1 to 20 carbons.

[Formula 101]
(DI-16-44)
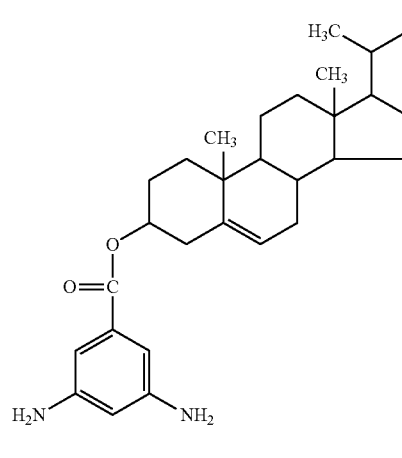
(DI-16-45)
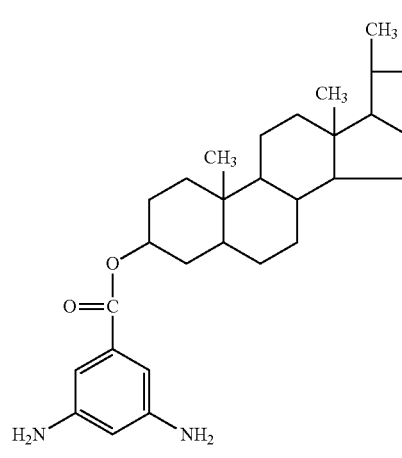
[Formula 102]
(DI-16-46)
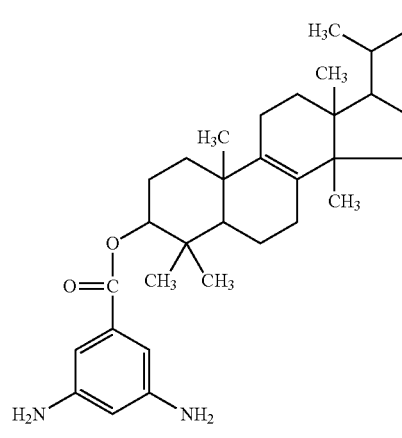
(DI-16-47)
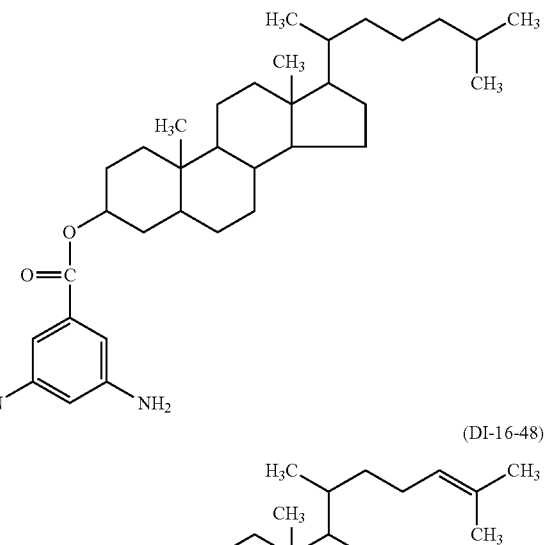
(DI-16-48)
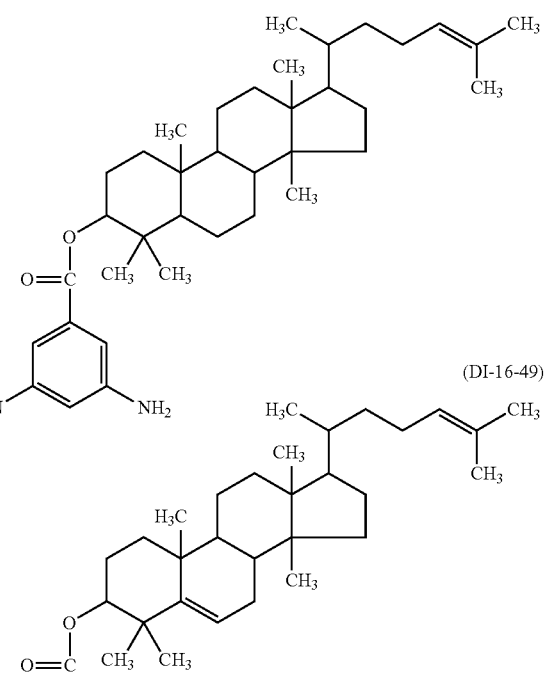
(DI-16-49)
[Formula 103]
(DI-16-50)
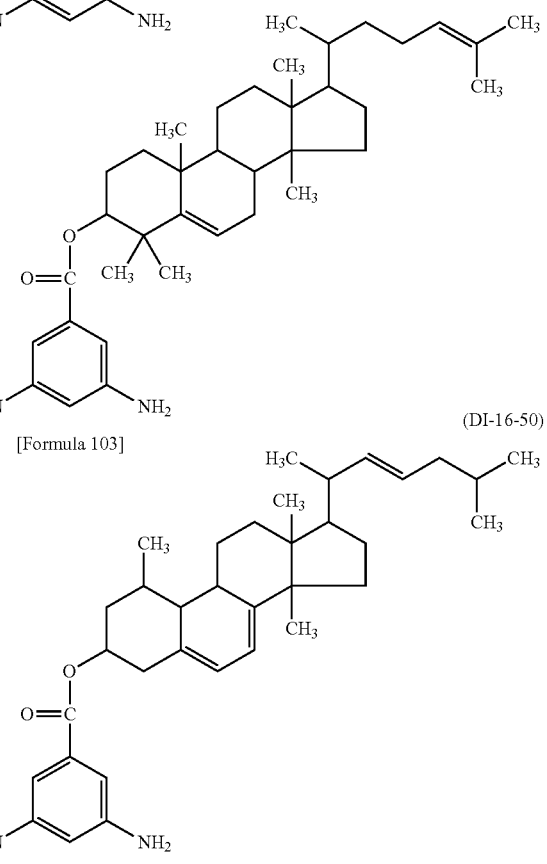

-continued
[Formula 104]
(DI-16-51)
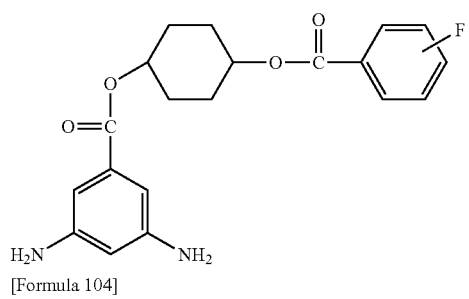
(DI-16-52)
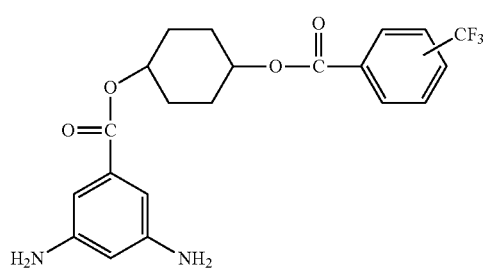
(DI-16-53)
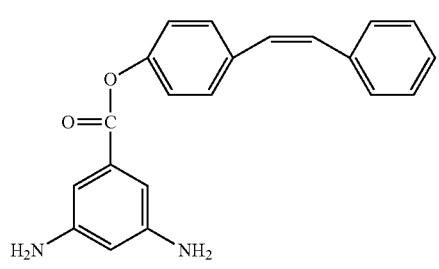
(DI-16-54)
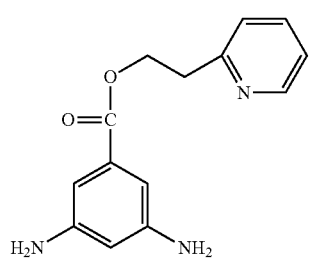
(DI-16-55)
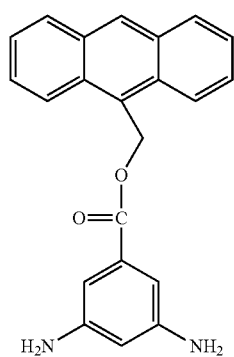
Examples of the compound represented by Formula (DI-17) are shown below.
[Formula 105]
(DI-17-1)
(DI-17-2)
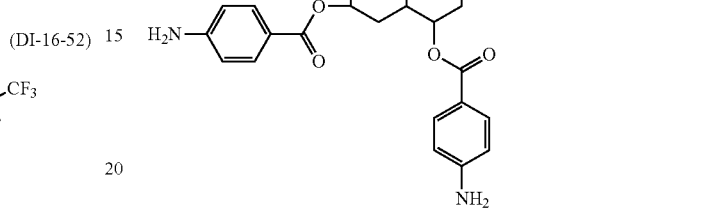
(DI-17-3)
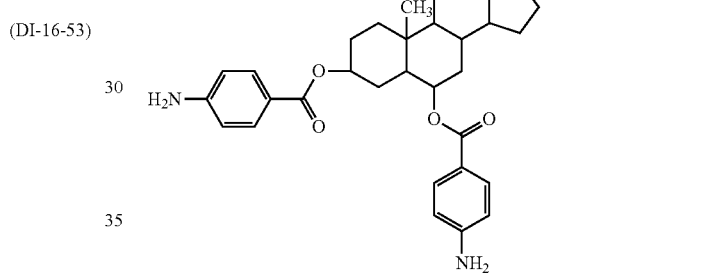
(DI-17-4)
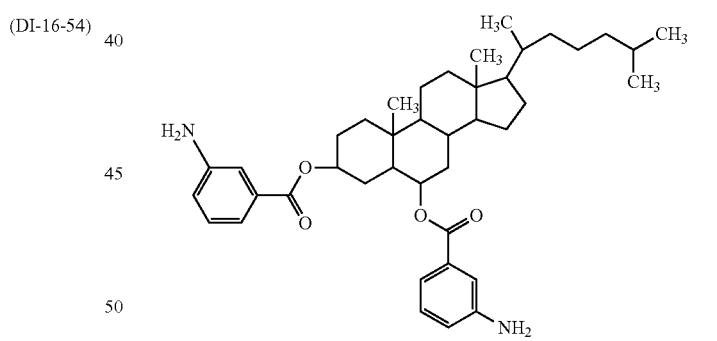

Examples of the compound represented by Formula (DI-18) are shown below.
[Formula 106]
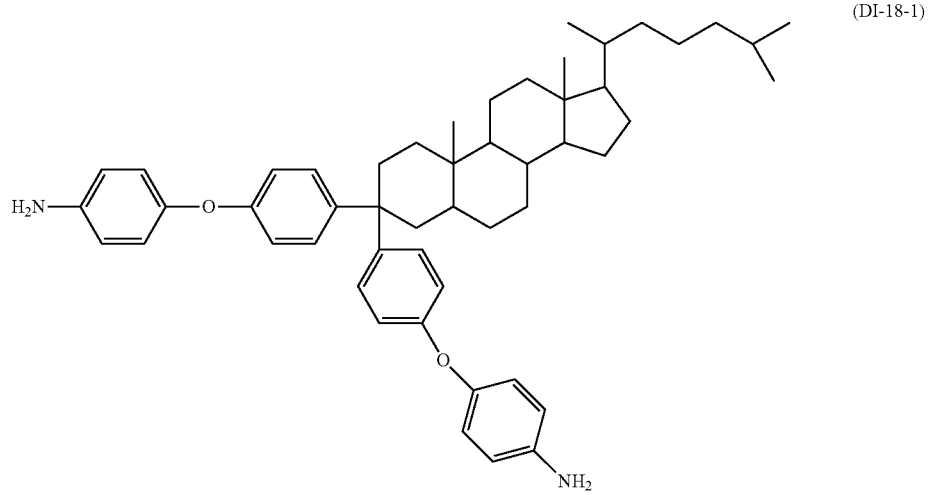
(DI-18-1)
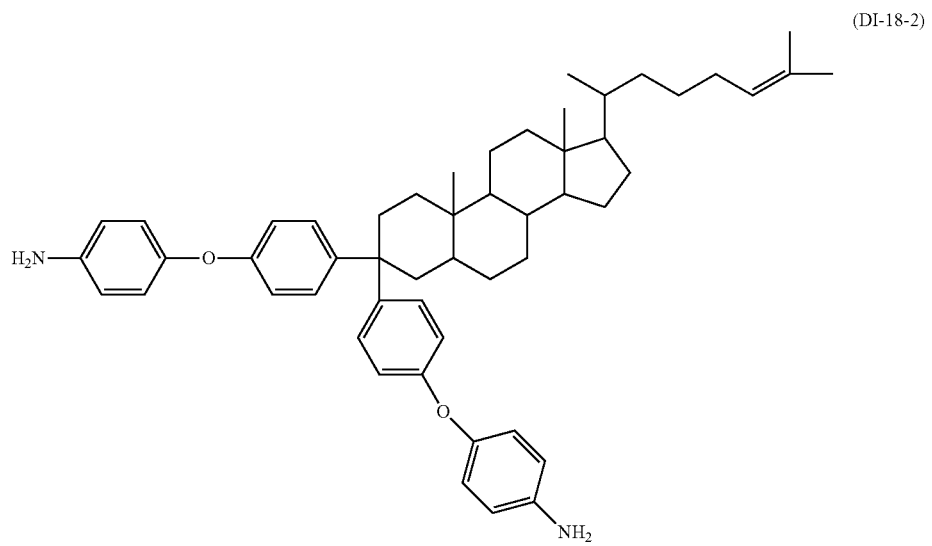
(DI-18-2)
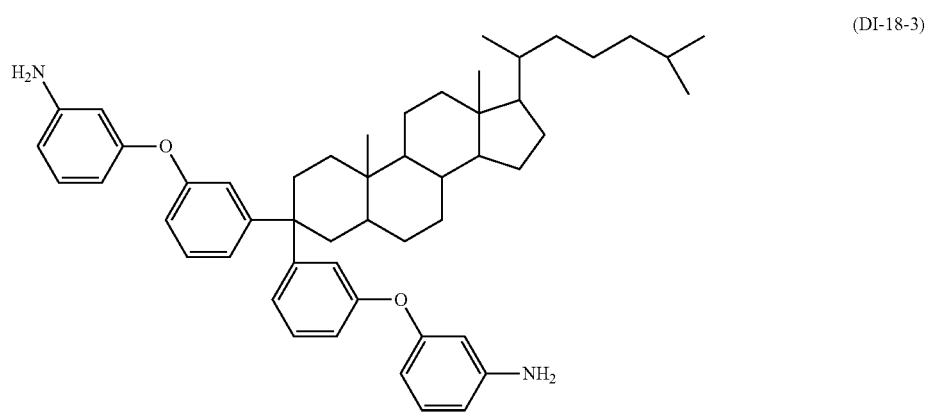
(DI-18-3)

(DI-18-4)
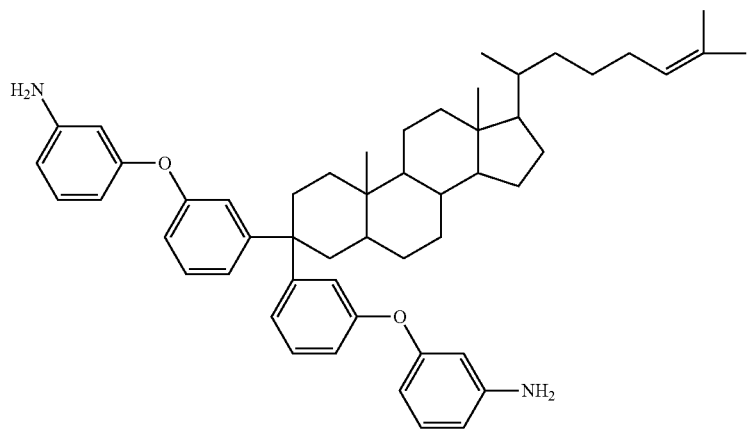
[Formula 107]
(DI-18-5)
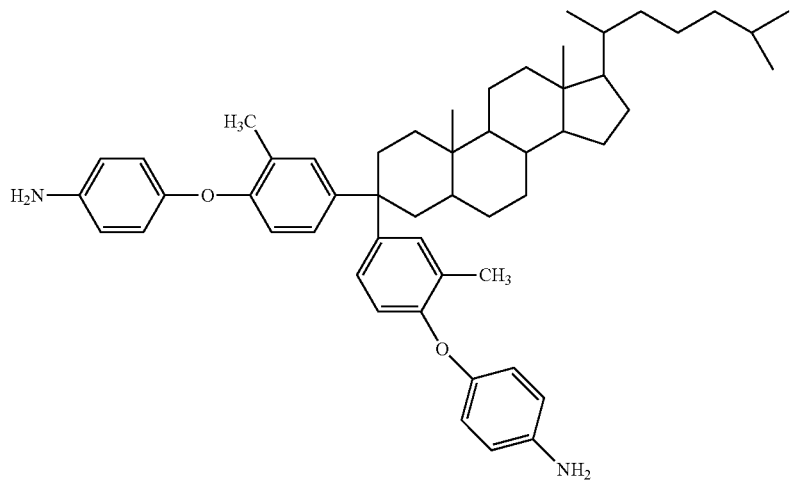
(DI-18-6)
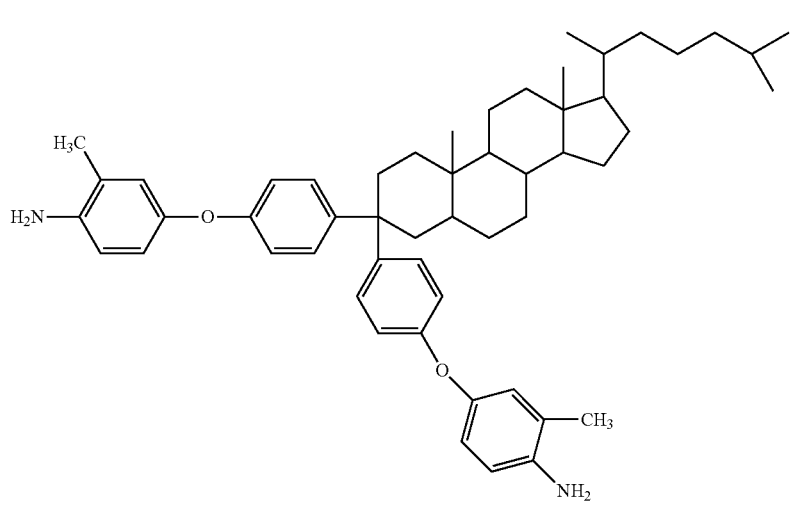

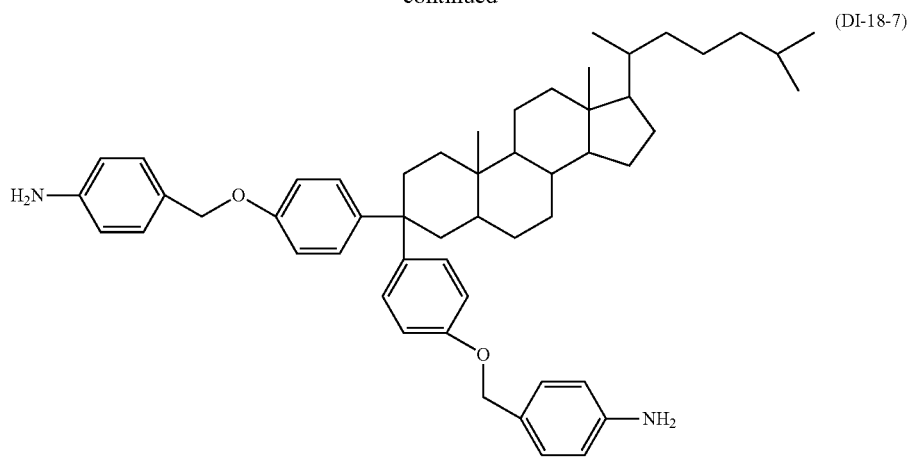
(DI-18-7)
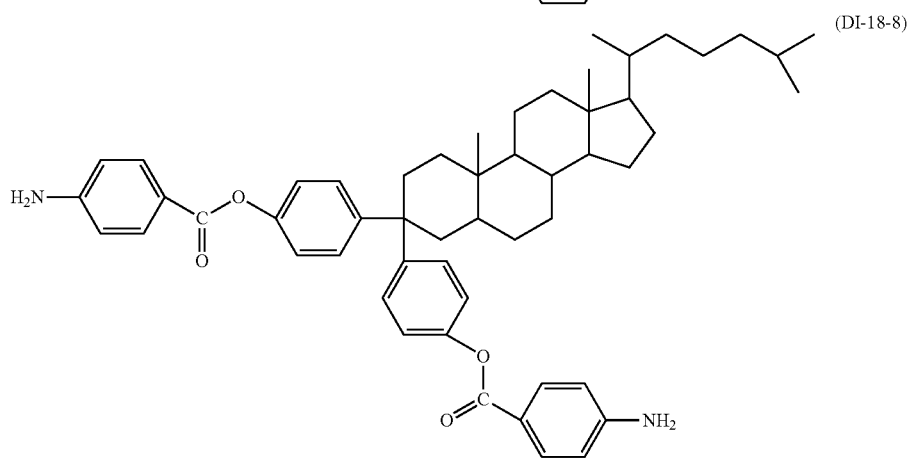
(DI-18-8)
Examples of the compound represented by Formula (DI-19) are shown below.
[Formula 108]
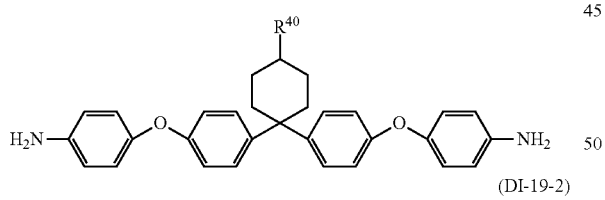
(DI-19-1)
(DI-19-2)
(DI-19-3)
-continued
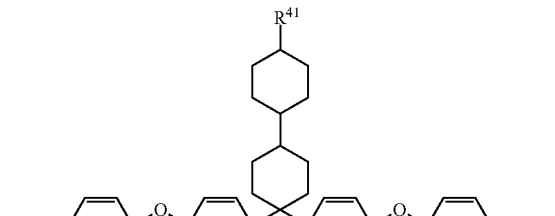
(DI-19-4)
[Formula 109]
(DI-19-5)
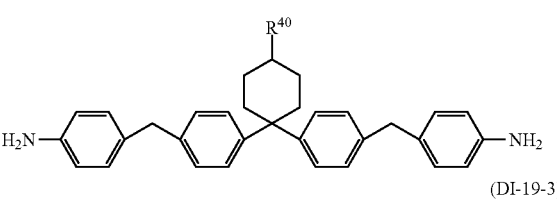
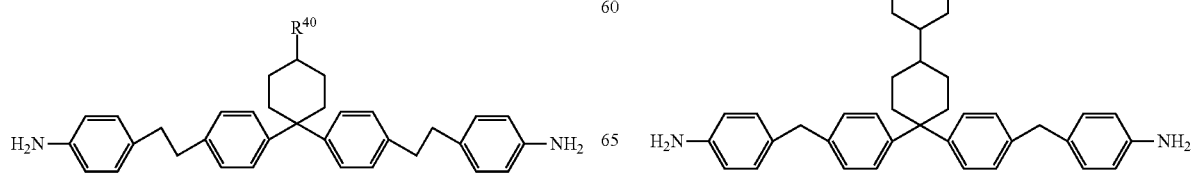

-continued
(DI-19-6)
(DI-19-7)
[Formula 110]
(DI-19-8)
(DI-19-9)
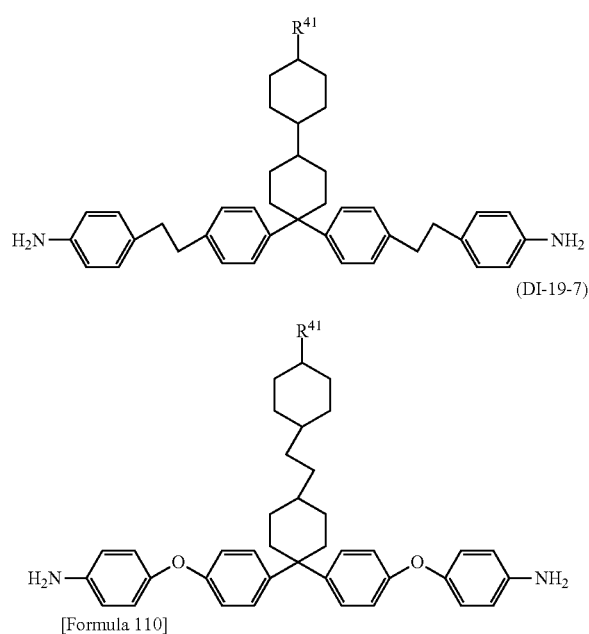
-continued
[Formula 111]
(DI-19-10)
(DI-19-11)
(DI-19-12)
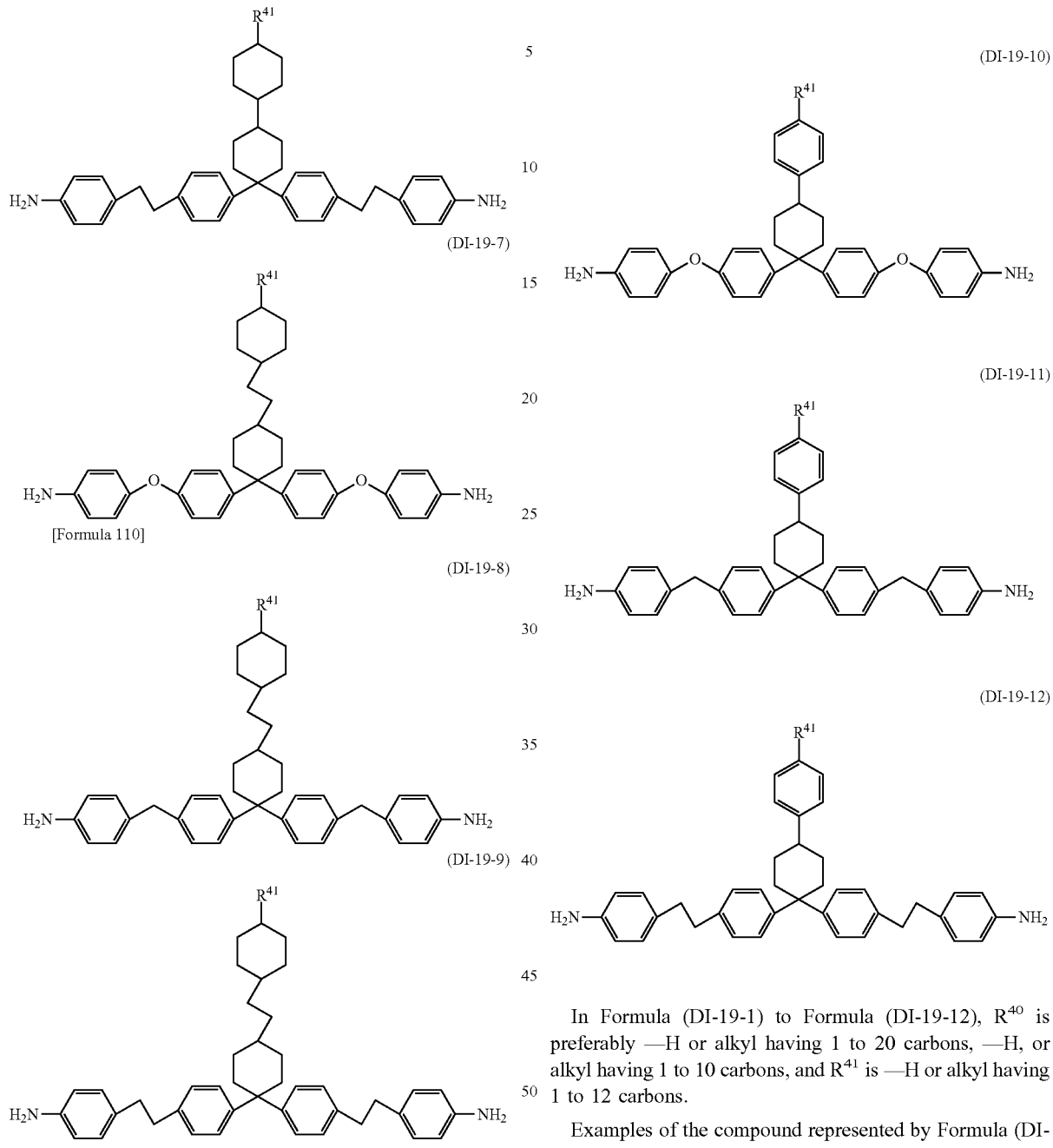
In Formula (DI-19-1) to Formula (DI-19-12), $R^{40}$ is preferably —H or alkyl having 1 to 20 carbons, —H, or alkyl having 1 to 10 carbons, and $R^{41}$ is —H or alkyl having 1 to 12 carbons.
Examples of the compound represented by Formula (DI-20) are shown below.
[Formula 112]
(DI-20-1)
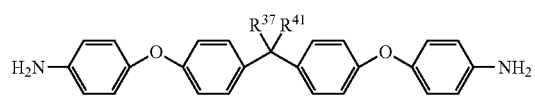
(DI-20-2)
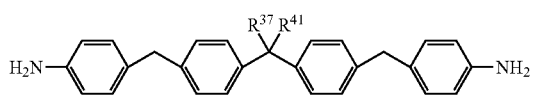

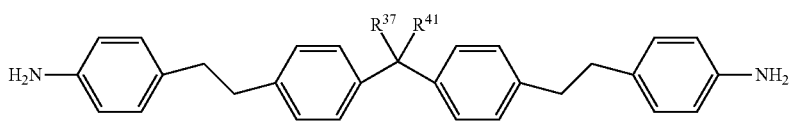
(DI-20-3)

In Formula (DI-20-1) to Formula (DI-20-3), $R^{37}$ is alkyl having 6 to 30 carbons, and $R^{41}$ is —H or alkyl having 1 to 12 carbons.

For the diamine of the present invention, diamines in addition to photosensitive diamines represented by the Formula (PDI-1) to Formula (PDI-8) and diamines represented by the Formula (DI-1-1) to Formula (DI-20-3) may be used. Such diamines may be, for example, diamines having a side chain structure except Formula (DI-16-1) to Formula (DI-20-3).

For example, there are compounds represented by the following Formula (DI-21-1) to Formula (DI-21-8).

[Formula 113]

(DI-21-1)
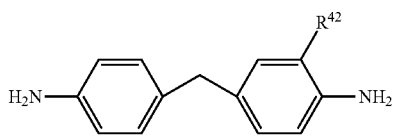

(DI-21-2)
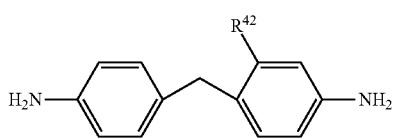

(DI-21-3)
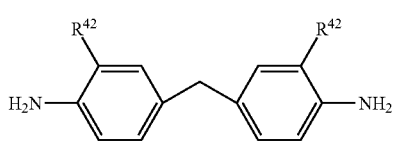

(DI-21-4)
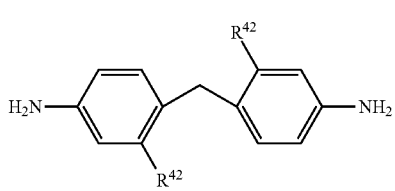

(DI-21-5)
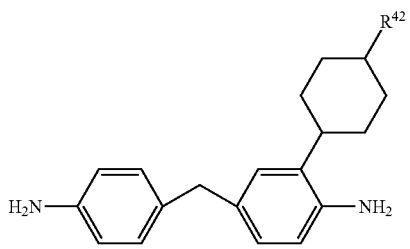

-continued (DI-21-6)
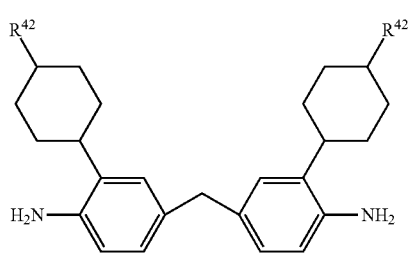

(DI-21-7)
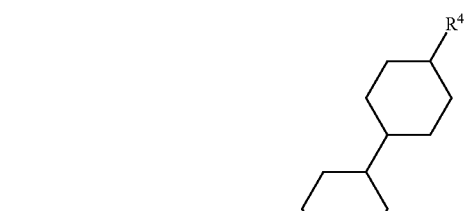

(DI-21-8)

In Formula (DI-21-1) to Formula (DI-21-8), $R^{42}$ is each independently alkyl having 3 to 30 carbons group.

In each diamine, a part of diamine may be replaced by a monoamine within a monoamine ratio of 40 mol % or less relative to the diamine. Such replacement may cause termination of a polymerization reaction for producing polyamic acid, and may suppress progress of the polymerization reaction. Accordingly, molecular weights of the obtained polymer (the polyamic acid or the derivative thereof) may be easily adjusted by such replacement, and for example, application characteristics of the liquid crystal alignment agent may be improved without damaging the effect of the present invention. The diamine replaced by the monoamine may be one kind or two or more kinds as long as the effect of the present invention is not damaged. The monoamine may be, for example, aniline, 4-hydroxyaniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, and n-eicosylamine.

The polyamic acid or the derivative thereof may further include a monoisocyanate compound in addition to the monomers. The terminal end of the obtained polyamic acid or the derivative thereof may be modified to adjust the molecular weight by adding the monoisocyanate compound to the monomers. The terminal end-modified polyamic acid or derivative thereof may improve, for example, application characteristics of the liquid crystal alignment agent without damaging the effect of the present invention. A content of the monoisocyanate compound of the monomers monomer may preferably be 1 to 10 mol % based on the total amount of the diamine and the tetracarboxylic dianhydride of the monomers, from the above viewpoint. The monoisocyanate compound may be, for example, phenylisocyanate and naphthylisocyanate.

When alignment improvement of the liquid crystal is important, diamines represented by Formula (DI-1-3), Formula (DI-5-1), Formula (DI-5-12), Formula (DI-7-3), Formula (DI-13-2), Formula (DI-14-1), or Formula (DI-14-2) of the diamines may be preferable.

When reactivity or photosensitivity improvement is important, diamines represented by Formula (DI-1-4), Formula (DI-4-1), Formula (DI-5-1), Formula (DI-5-12), Formula (DI-5-28), Formula (DI-5-30), Formula (DI-9-1), Formula (DI-13-1), Formula (DI-13-2), Formula (DI-14-1), or Formula (DI-14-2) of the diamines may be preferable.

When transmittance improvement is important, diamines represented by Formula (DI-1-3), Formula (DI-1-4), Formula (DI-13-1), Formula (DI-13-2), Formula (DI-14-1), or Formula (DI-14-2) of the diamines may be preferable.

When electrical characteristics improvement is important, v (DI-4-1), Formula (DI-5-5), Formula (DI-5-9), Formula (DI-5-21), Formula (DI-5-28), Formula (DI-5-30), Formula (DI-5-31), Formula (DI-9-1), Formula (DI-14-1), or Formula (DI-14-2) of the diamines may be preferable.

Polyamic acid used as a liquid crystal alignment agent to form an alignment film used in the present invention is obtained by reacting acid dianhydride and diamine components in a solvent. This synthesis reaction requires no particular condition except for selecting a raw material, but may be performed under a condition for generally synthesizing polyamic acid. The solvent will be described later.

The liquid crystal alignment agent may be in a form of a so-called blend, and may further include polyamic acid or a derivative thereof, or other components except the polyamic acid or the derivative thereof. The other components may be one kind or two or more kinds.

In addition, the liquid crystal alignment agent may include, for example, other polymer components such as an acrylic acid polymer, an acrylate polymer, and a polyamideimide that is a reaction product of a diamine with a tetracarboxylic dianhydride, dicarboxylic acid, or a derivative thereof, unless they do damage to the effect of the present invention (for example, 20 wt % or less based on the polyamic acid or the derivative thereof).

The polyamic acid or the derivative thereof may be synthesized in the same method of synthesizing a publically known polyamic acid or a derivative thereof for forming a polyimide film. The tetracarboxylic dianhydride may be used in the same moles as the total moles of diamine (a mole ratio of 0.9 to 1.1).

The molecular weight of the polyamic acid or the derivative thereof is a polystyrene-reduced weight average molecular weight (Mw) ranging from 10,000 to 500,000, and specifically, 20,000 to 200,000. Molecular weights of the polyamic acid or the derivative thereof may be obtained by a gel permeation chromatography (GPC) method.

The polyamic acid or the derivative thereof may be identified by analyzing a solid from precipitation by using a large amount of a poor solvent through IR or NMR. Furthermore, the used monomer may be identified by decomposing the polyamic acid or the derivative thereof by a strong alkali aqueous solution such as KOH or NaOH, extracting the products with an organic solvent, and analyzing the extract through GC, HPLC, or GC-MS.

<Alkenyl-Substituted Nadimide Compound>

For example, the liquid crystal alignment agent of the present invention may further include an alkenyl-substituted nadimide compound from a viewpoint of long-term stability of the electrical characteristics of the liquid crystal display device. The alkenyl-substituted nadimide compound may be one kind of a compound or two or more kinds of a compound. A content of the alkenyl-substituted nadimide compound may preferably be 1 to 100 wt %, more preferably 1 to 70 wt %, and still more preferably 1 to 50 wt % based on the polyamic acid or the derivative thereof considering the above purposes.

Hereinafter, the nadimide compound is specifically explained.

The alkenyl-substituted nadimide compound may be preferably dissolved in a solvent that dissolves the polyamic acid or the derivative thereof. The alkenyl-substituted nadimide compound may be, for example, a compound represented by the following Formula (NA).

[Formula 114]

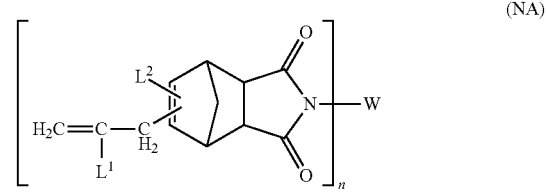

(NA)

In Formula (NA), $L^1$ and $L^2$ are independently —H, alkyl having 1 to 12 carbons, alkenyl having 3 to 6 carbons, cycloalkyl having 5 to 8 carbons, aryl, or benzyl, and n is 1 or 2.

In Formula (NA), when n=1, W is alkyl having 1 to 12 carbons, alkenyl having 2 to 6 carbons, cycloalkyl having 5 to 8 carbons, aryl having 6 to 12 carbons, benzyl, a group represented by $—Z^1—(O)_r—(Z^2O)_k—Z^3—H$ (wherein $Z^1$, $Z^2$, and $Z^3$ are independently alkylene having 2 to 6 carbons, r is 0 or 1, and k is an integer of 1 to 30), a group represented by $—Z^4_r—B—Z^5—H$ (wherein $Z^4$ and $Z^5$ are independently alkylene having 1 to 4 carbons or cycloalkylene having 5 to 8 carbons, B is phenylene, and r is 0 or 1), a group represented by -B-T-B-H (wherein B is phenylene, and T is —$CH_2$—, —$C(CH_3)_2$—, —O—, —CO—, —S—, or —$SO_2$—), or the groups where 1 to 3-H's are replaced by —OH.

A preferable alkenyl-substituted nadimide compound may be bis{4-(allylbicyclo[2.2.1]hepto-5-ene-2,3-dicarboxylimide)phenyl}methane represented by the following Formula (NA-1), N,N'-m-xylene-bis(allylbicyclo[2.2.1]hepto-5-ene-2,3-dicarboxylimide) represented by the following Formula (NA-2), and N,N'-hexamethylene-bis(allylbicyclo[2.2.1]hepto-5-ene-2,3-dicarboxylimide) represented by the following Formula (NA-3).

[Formula 115]

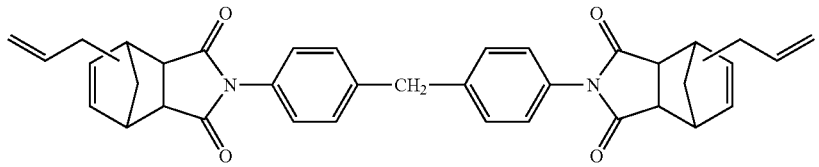

(NA-1)

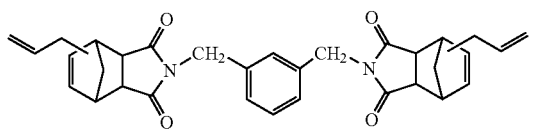

(NA-2)

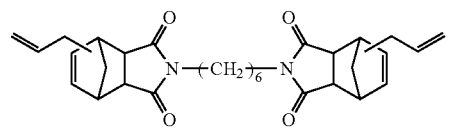

(NA-3)

<Compound Having Radical Polymerizable Unsaturated Double Bond>

For example, the liquid crystal alignment agent of the present invention may further include a compound having a radical polymerizable unsaturated double bond from a viewpoint of long-term stability of the electrical characteristics of the liquid crystal display device. The compound having a radical polymerizable unsaturated double bond may be one kind of a compound or two or more kinds of a compound. The compound having a radical polymerizable unsaturated double bond does not include an alkenyl-substituted nadimide compound. A content of the compound having a radical polymerizable unsaturated double bond may preferably be 1 to 100 wt %, more preferably 1 to 70 wt %, and still more preferably 1 to 50 wt % based on the polyamic acid or the derivative thereof considering the above purposes.

Hereinafter, the compound having a radical polymerizable unsaturated double bond is specifically explained.

The compound having a radical polymerizable unsaturated double bond may be, for example, a (meth)acrylic acid derivative such as a (meth)acrylic acid ester, a (meth)acrylic acid amide, and the like, and a bismaleimide. The compound having a radical polymerizable unsaturated double bond may preferably be a (meth)acrylic acid derivative having two or more radical polymerizable unsaturated double bonds.

A preferable (meth)acrylic acid derivative may be, for example N,N'-methylene bisacrylamide, N,N'-dihydroxyethylenebisacrylamide, ethylenebisacrylate, and 4,4'-methylene bis(N,N-dihydroxyethyleneacrylateaniline).

The bismaleimide may be, for example, BMI-70 and BMI-80 manufactured by K•I Chemical Industry Co., Ltd., and BMI-1000, BMI-3000, BMI-4000, BMI-5000, and BMI-7000 manufactured by Daiwa Kasei Industry Co., Ltd.

<Oxazine Compound>

For example, the liquid crystal alignment agent of the present invention may further include an oxazine compound from a viewpoint of long-term stability of the electrical characteristics of the liquid crystal display device. The oxazine compound may be one kind of a compound or two or more kinds of a compound. A content of the oxazine compound may preferably be 0.1 to 50 wt %, more preferably 1 to 40 wt %, and still more preferably 1 to 20 wt % based on the polyamic acid or the derivative thereof considering the above purposes.

Hereinafter, the oxazine compound is specifically explained.

The oxazine compound may be dissolved in a solvent that dissolves the polyamic acid or the derivative thereof, and may preferably be an oxazine compound having ring-opening polymerizable properties.

The number of oxazine structures in the oxazine compound is not particularly limited.

The various oxazine structures are known. In the present invention, the oxazine structures are not particularly limited, but oxazine structures in the oxazine compound may be oxazine structures having an aromatic group including a condensed polycyclic aromatic group, such as benzoxazine, naphthoxazine, and the like.

The oxazine compound may be, for example, compounds represented by the following Formula (OX-1) to Formula (OX-6). In the following formulae, a bond indicated toward a center of a ring is bound to any one carbon constituting the ring and being capable of being bound to a substituent.

[Formula 116]

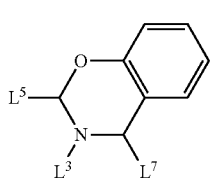

(OX-1)

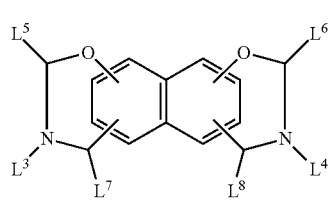

(OX-2)

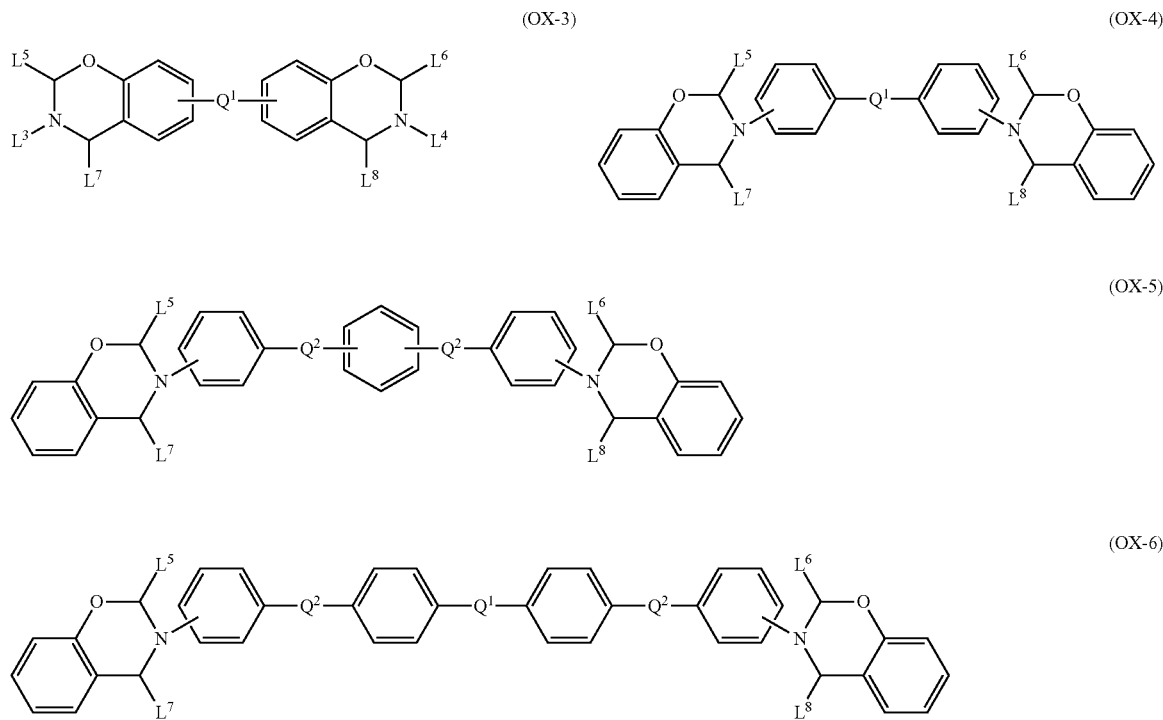

In Formula (OX-1) to Formula (OX-3), $L^3$ and $L^4$ are an organic group having 1 to 30 carbons, in Formula (OX-1) to Formula (OX-6), $L^5$ to $L^8$ are —H or a C1-C6 hydrocarbon group, in Formula (OX-3), Formula (OX-4), and Formula (OX-6), $Q^1$ is a single bond, —O—, —S—, —S—S—, —SO$_2$—, —CO—, —CONH—, —NHCO—, —C(CH$_3$)$_2$—, —C(CF$_3$)$_2$—, —(CH$_2$)$_v$—, —O—(CH$_2$)$_v$—O—, and —S—(CH$_2$)$_v$—S—, wherein v is an integer of 1 to 6, and in Formula (OX-5) and Formula (OX-6), $Q^2$ is independently a single bond, —O—, —S—, —CO—, —C(CH$_3$)$_2$—, —C(CF$_3$)$_2$—, or alkylene having 1 to 3 carbons, where a hydrogen bound to a benzene ring or a naphthalene ring in the $Q^2$ may be independently replaced by —F, —CH$_3$, —OH, —COOH, —SO$_3$H, or —PO$_3$H$_2$.

The oxazine compound may include an oligomer or a polymer having an oxazine structure in the side chain, or an oligomer or a polymer having an oxazine structure in the main chain.

Of the oxazine compounds of Formula (OX-1) to Formula (OX-6), more preferable examples may be oxazine compounds represented by the following Formula (OX-2-1), Formula (OX-3-1), Formula (OX-3-3), Formula (OX-3-5), Formula (OX-3-7), Formula (OX-3-9), Formula (OX-4-1) to Formula (OX-4-6), Formula (OX-5-3), Formula (OX-5-4), and Formula (OX-6-2) to Formula (OX-6-4).

[Formula 117]

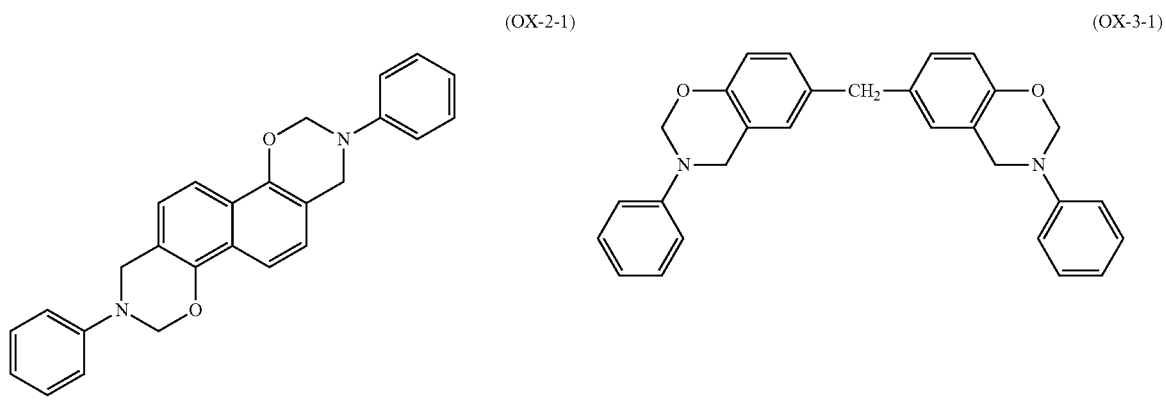

-continued
(OX-3-3) (OX-3-5)
(OX-3-7) (OX-3-9)
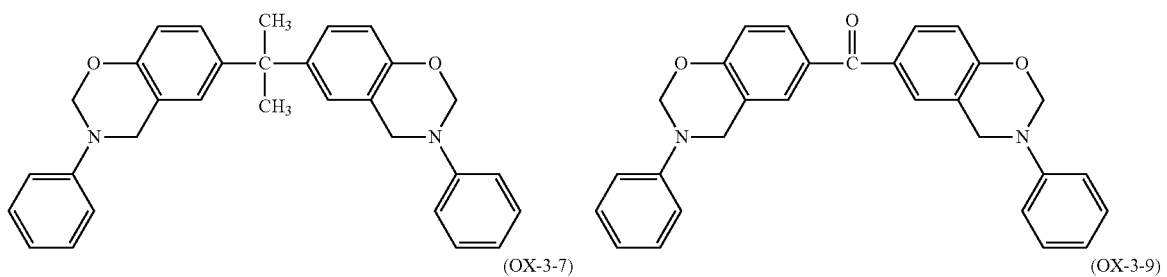
[Formula 118]
(OX-4-1) (OX-4-2)
(OX-4-3) (OX-4-4)
(OX-4-5) (OX-4-6)
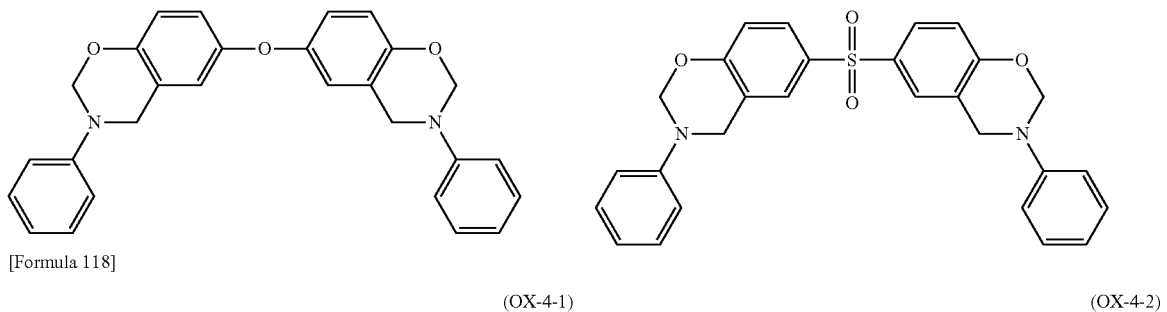
[Formula 119]
(OX-5-3)
(OX5-4)
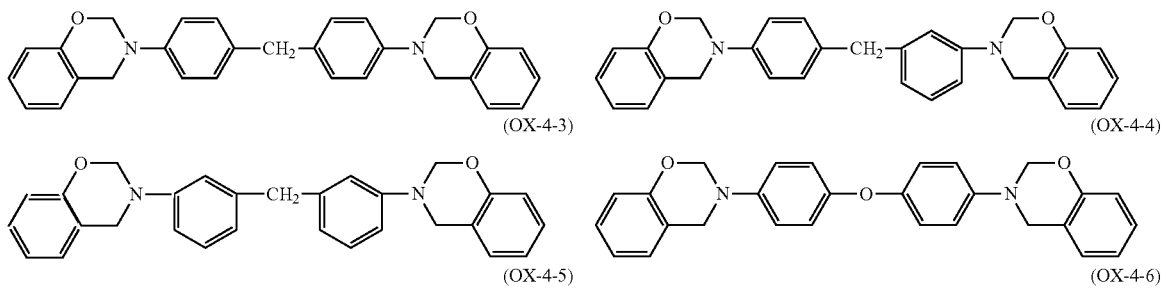
[Formula 120]
(OX-6-2)
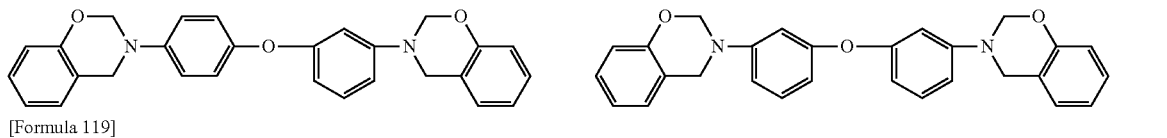
(OX-6-3)
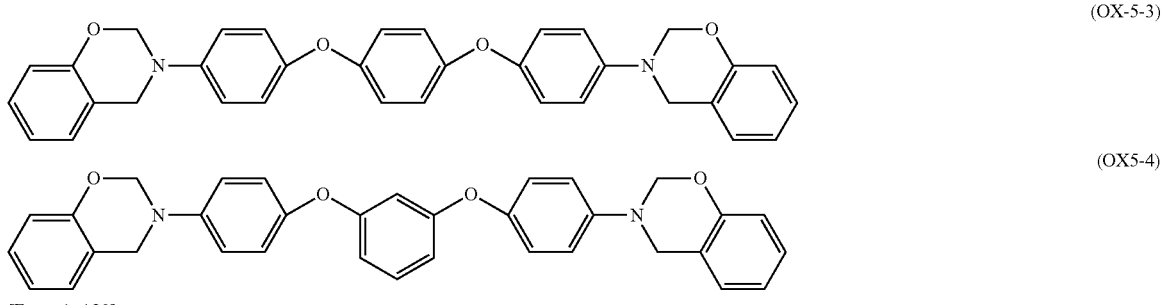

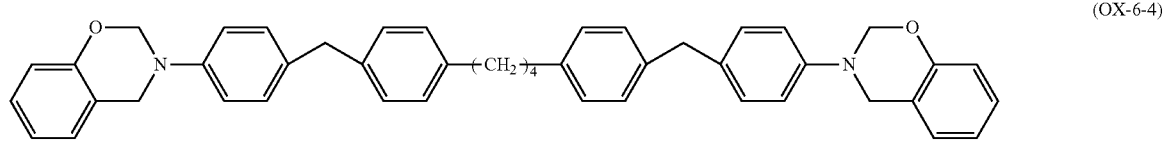

(OX-6-4)

<Oxazoline Compound>

For example, the liquid crystal alignment agent of the present invention may further include an oxazoline compound from a viewpoint of long-term stability of the electrical characteristics of the liquid crystal display device. The oxazoline compound is a compound having an oxazoline structure. The oxazoline compound may be one kind of a compound or two or more kinds of a compound. A content of the oxazoline compound may preferably be 0.1 to 50 wt %, more preferably 1 to 40 wt %, and still more preferably 1 to 20 wt % based on the polyamic acid or the derivative thereof considering the above purposes. Or, the content of the oxazoline compound may preferably be 0.1 to 40 wt % based on the polyamic acid or the derivative thereof when the oxazoline structure of the oxazoline compound is reduced into oxazoline.

Hereinafter, the oxazoline compound is specifically explained.

The oxazoline compound may include one kind of an oxazoline structure or two or more kinds of an oxazoline structure in one compound. Or, the oxazoline compound may preferably include one oxazoline structure or two or more oxazoline structures in one compound. Or, the oxazoline compound may be a polymer or a copolymer having an oxazoline ring structure in the side chain. The polymer having an oxazoline structure in the side chain may be a homopolymer of a monomer having an oxazoline structure in the side chain, or a copolymer of a monomer having an oxazoline structure in the side chain and a monomer without an oxazoline structure. The copolymer having an oxazoline ring structure in the side chain may be a copolymer of two or more kinds of monomers having an oxazoline structure in the side chain, or a copolymer of two or more kinds of monomers having an oxazoline structure in the side chain and a monomer without an oxazoline structure.

The oxazoline structure may be a structure wherein one or both of oxygen and nitrogen of the oxazoline structure is/are present so that it/they may react with a carbonyl group of polyamic acid.

The oxazoline compound may be, for example, 2,2'-bis(2-oxazoline), 1,2,4-tris(2-oxazolinyl-2)-benzene, 4-furan-2-yl methylene-2-phenyl-4H-oxazol-5-one, 1,4-bis(4,5-dihydro-2-oxazolyl)benzene, 1,3-bis(4,5-dihydro-2-oxazolyl)benzene, 2,3-bis(4-isopropenyl-2-oxazolin-2-yl)butane, 2,2'-bis-4-benzyl-2-oxazoline, 2,6-bis(isopropyl-2-oxazolin-2-yl)pyridine, 2,2'-isopropylidenebis(4-tert-butyl-2-oxazoline), 2,2'-isopropylidene bis(4-phenyl-2-oxazoline), 2,2'-methylene bis(4-tert-butyl-2-oxazoline), and 2,2'-methylene bis(4-phenyl-2-oxazoline). Additionally, an oxazolyl-containing polymer or oligomer such as Epocros (tradename, manufactured by Nippon Shokubai Co., Ltd.) may be exemplified. Of these, 1,3-bis(4,5-dihydro-2-oxazolyl)benzene is more preferably exemplified.

<Epoxy Compound>

For example, the liquid crystal alignment agent of the present invention may further include an epoxy compound from a viewpoint of long-term stability of the electrical characteristics of the liquid crystal display device. The epoxy compound may be one kind of a compound or two or more kinds of a compound. A content of the epoxy compound may preferably be 0.1 to 50 wt %, more preferably 1 to 40 wt %, and still more preferably 1 to 20 wt % based on the polyamic acid or the derivative thereof considering the above purposes.

Hereinafter, the epoxy compound is specifically explained.

The epoxy compound may include, for example, a bisphenol A epoxy resin, a glycidylester epoxy resin, an alicyclic epoxy resin, a polymer of a monomer having oxirane, and a copolymer of a monomer having oxirane and other monomers, compounds represented by the following Structural Formulae (E-1) to (E-3), and (E-5), and a compound represented by the following General Formula (E-4).

[Formula 121]

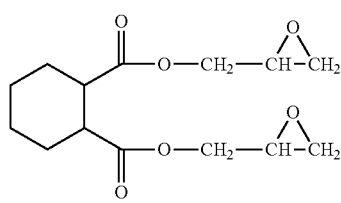

(E-1)

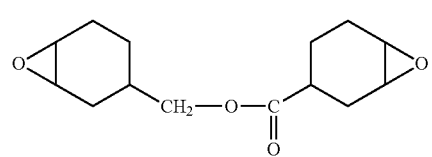

(E-2)

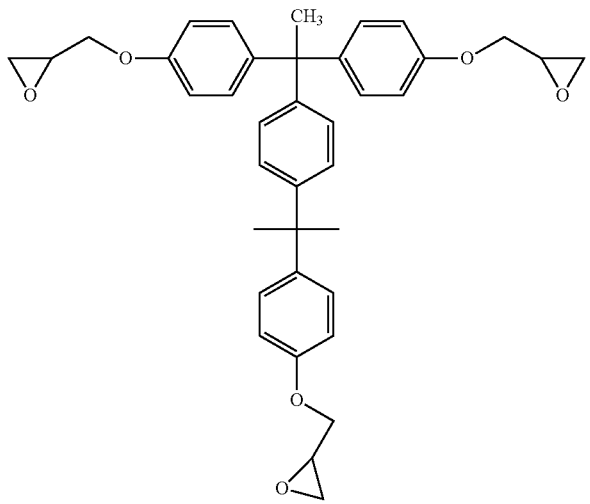

(E-3)

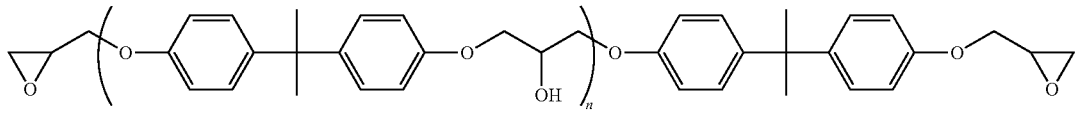

(E-4)

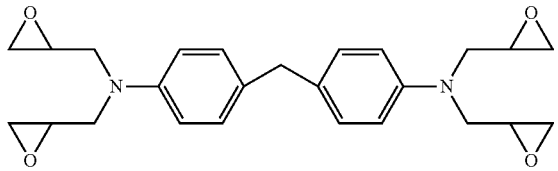

(E-5)

In General Formula (E-4), n is an integer of 0 to 10.

More specifically, the epoxy resin may be tradename 「Epikote 807」, 「Epikote 815」, 「Epikote 825」, 「Epikote 827」, and the like.

The compound represented by the General Formula (E-4) may be tradenames 「Epikote 828」, 「Epikote 190P」, 「Epikote 191P」, tradename 「Epikote 1004」, and 「Epikote 1256」 (manufactured by Japan Epoxy Resins Co., Ltd.), and tradename 「Araldite CY177」.

The compound represented by the Structural Formula (E-1) may be tradename 「Araldite CY184」 (manufactured by Chiba Japan Co., Ltd.).

The compound represented by the Structural Formula (E-2) may be tradename 「Celloxide 2021P」 and 「EHPE-3150」 (manufactured by Daicel Chemical Industries, Ltd.).

The compound represented by the Structural Formula (E-3) may be tradename 「Techmore VG3101 L」 (manufactured by Mitsui Chemicals, Inc.).

The compound represented by the Structural Formula (E-5) may be 「4,4'-methylene bis(N,N-diglycidylaniline)」 (manufactured by Sigma-Aldrich Corporation).

Of these, the epoxy compound may be 「Epikote 828」 that is a compound (a mixture of compounds (n=0 to 4)) represented by General Formula (E-4), 「Araldite CY184」 (manufactured by Nihon Ciba-Geigy Co., Ltd.) that is a compound represented by Structural Formula (E-1), tradename 「Celloxide 2021P」 (manufactured by Daicel Chemical Industries, Ltd.) represented by Structural Formula (E-2), tradename 「Techmore VG3101L」 (manufactured by Mitsui Chemicals, Inc.) that is a compound represented by Structural Formula (E-3), and 「4,4'-methylene bis(N,N-diglycidylaniline)」 (manufactured by Sigma-Aldrich Corporation) that is a compound represented by Structural Formula (E-5) are preferable from viewpoints of good transparency and flatness of an alignment film.

For example, the liquid crystal alignment agent may further include various additives. The various additives may be, for example, polymer compounds and low molecular compounds except the polyamic acid and the derivative thereof, and may be selected in accordance with each purpose.

The polymer compounds may be, for example, polymer compounds that are soluble in an organic solvent. Addition of such polymer compounds to the liquid crystal alignment agent of the present invention is preferable from a viewpoint of electrical characteristics or alignment controlling properties of the liquid crystal alignment film. The polymer compound may be, for example, polyamide, polyurethane, polyurea, polyester, polyepoxide, polyesterpolyol, silicone-modified polyurethane, and silicone-modified polyester.

The low molecular compounds may include, for example, 1) a surfactant for the purpose of improving coating properties, 2) an antistatic agent for the purpose of improving antistatic properties, 3) a silane coupling agent or a titanium-based coupling agent for the purpose of improving close contacting properties to a substrate, or 4) an imidization catalyst to proceed imidization at a low temperature.

The silane coupling agent may be, for example, vinyltrimethoxysilane, vinyltriethoxysilane, N-(2-aminoethyl)-3-aminopropylmethyldimethoxysilane, N-(2-aminoethyl)-3-aminopropylmethyltrimethoxysilane, paraaminophenyltrimethoxysilane, paraaminophenyltriethoxysilane, metaaminophenyltrimethoxysilane, metaaminophenyltriethoxysilane, 3-aminopropyltrimethoxysilane, 3-aminopropyltriethoxysilane, 3-glycidoxypropyltrimethoxysilane, 3-glycidoxypropylmethyldimethoxysilane, 3-chloropropylmethyldimethoxysilane, 3-chloropropyltrimethoxysilane, 3-methacryloxypropyltrimethoxysilane, 3-mercaptopropyltrimethoxysilane, N-(1,3-dimethylbutylidene)-3-(triethoxysilyl)-1-propylamine and N,N'-bis[3-(trimethoxysilyl)propyl]ethylenediamine. The silane coupling agent may preferably be 3-aminopropyltriethoxysilane.

The imidization catalyst may include, for example, aliphatic amines such as trimethylamine, triethylamine, tripropylamine, tributylamine, and the like; aromatic amines such as N,N-dimethylaniline, N,N-diethylaniline, methyl substituted aniline, hydroxy substituted aniline, and the like; cyclic amines such as pyridine, methyl substituted pyridine, hydroxy substituted pyridine, quinoline, methyl substituted quinoline, hydroxy substituted quinoline, isoquinoline, methyl substituted isoquinoline, hydroxy substituted isoquinoline, imidazole, methyl substituted imidazole, hydroxy substituted imidazole, and the like. The imidization catalyst may be one kind or two or more kinds selected from N,N-dimethylaniline, o-, m-, p-hydroxy aniline, o-, m-, p-hydroxypyridine, and isoquinoline.

An addition amount of the silane coupling agent is preferably 0 to 20 wt %, or 0.1 to 10 wt % based on the total amount of the polyamic acid or the derivative thereof.

An addition amount of the imidization catalyst is preferably 0.01-5 equivalents, or 0.05 to 3 equivalents relative to the carbonyl group of the polyamic acid or the derivative thereof.

Addition amounts of other additives may be different depending on their uses, and may be 0 to 100 wt %, or 0.1 to 50 wt % based on the total amount of the polyamic acid or the derivative thereof.

For example, the liquid crystal alignment agent may further include a solvent from a viewpoint of adjusting coating properties of the liquid crystal alignment agent or a concentration of the polyamic acid or the derivative thereof. The solvent may be applied without a particular limitation, if the solvent has the capability of dissolving the polymeric component. The solvent widely includes a solvent ordinarily used in a process for manufacturing the polymeric components such as the polyamic acid and the soluble polyimide or in terms of usages, and may be appropriately selected according to the purpose. The solvent may include one kind or a mixed solvent including two or more kinds.

The solvent may be, for example, a solvent having affinity for the polyamic acid or the derivative thereof, and any other solvent for the purpose of improving coating properties.

Examples of an aprotic polar organic solvent being the solvent having affinity for the polyamic acid or the derivative thereof include N-methyl-2-pyrrolidone, dimethylimidazolidinone, N-methylcaprolactam, N-methylpropionamide, N,N-dimethyl acetamide, dimethylsulfoxide, N,N-dimethyl formamide, N,N-diethylformamide, diethylacetamide, and a lactone such as γ-butyrolactone.

Examples of other solvents for the purpose of improving coating properties include alkyl lactate, 3-methyl-3-methoxybutanol, tetralin, isophorone, an ethylene glycol monoalkylether such as ethylene glycol monobutylether, a diethylene glycol monoalkylether such as diethylene glycol monoethylether, ethylene glycol monoalkyl or phenylacetate, triethylene glycol monoalkylether, propylene glycol monomethylether, a propylene glycol monoalkylether such as propylene glycol monobutylether, a dialkyl malonate such as diethyl malonate, a dipropylene glycol monoalkylether such as dipropylene glycol monomethylether, and an ester compound such as acetates thereof.

Among these solvents, the solvent may particularly preferably be N-methyl-2-pyrrolidone, dimethylimidazolidinone, γ-butyrolactone, ethylene glycol monobutylether, diethylene glycol monoethylether, propylene glycol monobutylether, propylene glycol monomethylether, and dipropylene glycol monomethylether.

A concentration of the polyamic acid in the alignment agent is preferably in the range of 0.1 to 40 wt %. When the alignment agent is applied on a substrate, an operation for diluting the polyamic acid by a solvent in advance may be needed for adjusting film thickness.

A solid content in the alignment agent is not particularly limited, and an optimal concentration may be selected according to the following various methods for applying the alignment agent. Generally, in order to suppress non-uniformity or pinholes during application, it may preferably be in the range of 0.1 to 30 wt %, and more preferably 1 to 10 wt % based on the weight of varnish.

A method of manufacturing the liquid crystal alignment film of the present invention is explained in detail. The liquid crystal alignment film of the present invention is a film obtained by heating a film of the liquid crystal alignment agent of the present invention. The liquid crystal alignment film of the present invention may be obtained by an ordinary method to manufacture a liquid crystal alignment film from a liquid crystal alignment agent. For example, the liquid crystal alignment film of the present invention may be obtained by forming a film of the liquid crystal alignment agent of the present invention, followed by heat-drying and heat-baking the resultant. Light irradiation may be performed as needed to provide anisotropy, after the film forming process and heat-drying processes, or after the heat-baking process.

The film may be formed by applying the liquid crystal alignment agent of the present invention on a substrate in a liquid crystal display device like a manufacturing process of an ordinary liquid crystal alignment film. The substrate may be a glass substrate mounded with an ITO (Indium Tin Oxide) electrode, an IZO ($In_2O_3$—ZnO) electrode, an IGZO (In—Ga—$ZnO_4$) electrode, or a color filter.

The liquid crystal alignment agent may be applied on a substrate using general methods such as a spinner method, a printing method, a dipping method, a dripping method, and an inkjet method. These methods may be applied to the present invention in a similar manner.

For the heat-drying process, a method for performing heat treatment in an oven or an infrared furnace, a method for performing heat treatment on a hot plate, or the like is generally known. The heat-drying process may preferably be performed at a temperature at which a solvent can be evaporated, and more preferably at a relatively lower temperature than a temperature in a heat-baking process. Specifically, the heat-drying temperature may preferably be in the range of 30° C. to 150° C., and more preferably 50° C. to 120° C.

The heat-baking process may be performed under conditions required for the polyamic acid or the derivative thereof to perform a dehydration and ring-closure reaction. For the heat-baking process of the film, a method for performing heat treatment in an oven or an infrared furnace, a method for performing heat treatment on a hot plate, or the like is generally known. These methods may be applied to the present invention in a similar manner. In general, the heat-baking process may preferably be performed at a temperature of 100° C. to 300° C. for 1 minute to 3 hours, more preferably at a temperature of 120° C. to 280° C., and still more preferably at a temperature of 150° C. to 250° C.

A method of forming the liquid crystal alignment film of the present invention is explained by a photo-alignment method. The liquid crystal alignment film of the present invention using the photo-alignment method may be formed by heat-drying a film, irradiating linearly polarized light or non-polarized light to provide the film with anisotropy, and heat-baking the film. Alternatively, it may be formed by irradiating linearly polarized light or non-polarized light after heat-drying a film, and heat-baking the film. Considering alignment properties, the irradiation process may preferably be performed before the heat-baking process.

In order to heighten liquid crystal alignment performance of the liquid crystal alignment film, linearly polarized light or non-polarized light may be irradiated while heating the film. The irradiation process may be performed while heat-drying the film or heat-baking the film, or between the heat-drying process and the heat-baking process. A heat-drying temperature in the process may preferably be in the range of 30° C. to 150° C., and more preferably in the range of 50° C. to 120° C. A heat-baking temperature in the process may preferably be in the range of 30° C. to 300° C., and more preferably in the range of 50° C. to 250° C.

For irradiation, ultraviolet (UV) light or visible light including light at a wavelength of 150 to 800 nm, may be used, for example, but ultraviolet (UV) light including light in a 300 to 400 nm wavelength is preferable. Linearly polarized light or non-polarized light may be used. The light is not particularly limited as long as the light can provide the film with liquid crystal alignment performance, but linearly polarized light is preferable in order to implement strong alignment restraining forces for liquid crystals.

The liquid crystal alignment film of the present invention may have high liquid crystal alignment performance even if light of a low energy is irradiated. An irradiation dose of the linearly polarized light during the irradiation process may preferably be in the range of 0.05 to 20 J/cm$^2$, and more preferably 0.5 to 10 J/cm$^2$. A wavelength of the linearly polarized light may preferably be in the range of 200 to 400 nm, and more preferably 300 to 400 nm. An irradiation angle of the linearly polarized light to the surface of the film is not particularly limited, but in order to implement strong alignment restraining forces for liquid crystals, the angle is preferably as perpendicular as possible with respect to the surface of the film, from the viewpoint of the reduction of alignment treatment time. The liquid crystals of the liquid crystal alignment film of the present invention may be aligned in a direction perpendicular to the polarization direction of the linearly polarized light by irradiating linearly polarized light.

In order to implement a pretilt angle, light irradiated to the film may be linearly polarized light or non-polarized light, as described above. In order to implement a pretilt angle, a dose of light irradiated to the film is preferably in the range of 0.05 to 20 J/cm$^2$, and more preferably in the range of 0.5 to 10 J/cm$^2$, and the wavelength thereof is preferably in the range of 250 to 400 nm, and more preferably 300 to 380 nm. In order to implement a pretilt angle, an irradiation angle of the light to the surface of the film is not particularly limited, but the angle is preferably 30° to 60° from the viewpoint of the reduction of alignment treatment time.

A light source to be used for irradiation of linearly polarized light or non-polarized light may be an ultra-high pressure mercury lamp, a high-pressure mercury lamp, a low pressure mercury lamp, a deep UV lamp, a halogen lamp, a metal halide lamp, a high power metal halide lamp, a xenon lamp, a mercury xenon lamp, an excimer lamp, a KrF excimer laser, a fluorescent lamp, an LED lamp, a sodium lamp, a microwave excitation electroless lamp, and the like, without limitation.

The liquid crystal alignment film of the present invention may preferably be obtained by a method further including any process other than the process described above. For example, the liquid crystal alignment film of the present invention may be formed by further cleaning the film with a cleaning solution after a baking or irradiation process depending on conditions of other processes even if cleaning is not an essential process.

The cleaning method with a cleaning solution may include brushing, jet spraying, vapor cleaning, or ultrasonic wave cleaning. The methods may be applied alone or in combination. As the cleaning solution, pure water or alcohols such as methanol, ethanol, and isopropyl alcohol, aromatic hydrocarbons such as benzene, toluene, and xylene, a halogen-based solvent such as methylene chloride, and ketones such as acetone and methylethyl ketone may be used, but the cleaning solution is not limited thereto. A sufficiently purified cleaning solution containing a tiny amount of impurities is clearly used as a cleaning solution. Such a cleaning method may also be applied to the cleaning process in formation of the liquid crystal alignment film of the present invention In order to increase liquid crystal alignment performance of the liquid crystal alignment film of the present invention, annealing by heat or light may be performed before or after the heat-baking process, before or after the rubbing process, or before or after irradiating polarized or non-polarized light. In the annealing treatment, the annealing temperature is preferably 30° C. to 180° C., and more preferably 50° C. to 150° C., and the annealing time is preferably 1 minute to 2 hours. Light used for the annealing treatment may be an UV lamp, a fluorescent lamp, an LED lamp, and the like. A dose of the light is preferably in the range of 0.3 to 10 J/cm$^2$.

The film thickness of the liquid crystal alignment film is not particularly limited, but is preferably in the range of 10 to 300 nm, and more preferably in the range of 30 to 150 nm. The film thickness of the liquid crystal alignment film of the present invention may be measured by means of a publicly known thickness measurement apparatus such as a profilometer and an ellipsometer.

The alignment film has particularly large alignment anisotropy. The size of the anisotropy may be evaluated by a method using polarized IR that is described in Japanese Patent Laid-Open Publication No. 2005-275364. In addition, it may be evaluated by a method using ellipsometry as described in the following embodiments. When the alignment film of the present invention is used for an alignment film for a liquid crystal composition, a material having larger film anisotropy is considered to have larger alignment restraining forces for the liquid crystal composition.

A liquid crystal layer used in the device of the present invention will be described below. The liquid crystal layer used in the device of the present invention is a liquid crystal composition having negative dielectric anisotropy.

The liquid crystal composition having negative dielectric anisotropy includes at least one liquid crystal compound selected from the group of liquid crystal compounds represented by the Chemical Formula 1 as a first component.

[Formula 122]

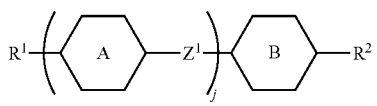
(1)

Herein, $R^1$ and $R^2$ are independently alkyl having 1 to 12 carbons, alkoxy having 1 to 12 carbons, alkenyl having 2 to 12 carbons, or alkenyl having 2 to 12 carbons where arbitrary hydrogen is replaced by fluorine; ring A and ring B are independently 1,4-cyclohexylene, tetrahydropyran-2,5-diyl, 1,3-dioxane-2,5-diyl, 1,4-phenylene, 2-fluoro-1,4-phenylene, 2,5-difluoro-1,4-phenylene, 2,3-difluoro-1,4-phenylene, 2-fluoro-3-chloro-1,4-phenylene, 2,3-difluoro-6-methyl-1,4-phenylene, 2,6-naphthalenediyl, or 7,8-difluorochroman-2,6-diyl, and at least one of ring A and ring B is 2,3-difluoro-1,4-phenylene, 2-fluoro-3-chloro-1,4-phenylene, 2,3-difluoro-6-methyl-1,4-phenylene, or 7,8-difluorochroman-2,6-diyl; $Z^1$ is independently a single bond, —(CH$_2$)$_2$—, —CH$_2$O—, —COO—, or —CF$_2$O—; and j is 1, 2, or 3.

Examples of the liquid crystal compound of Formula (1) may include compounds of Formula (1-1) to Formula (1-32).

[Formula 123]

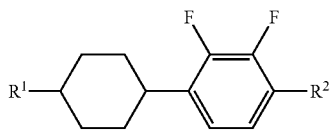
(1-1)

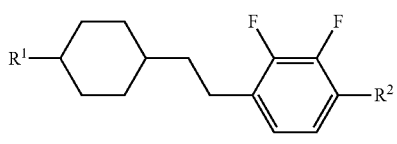
(1-2)

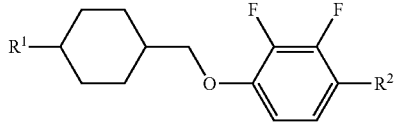
(1-3)

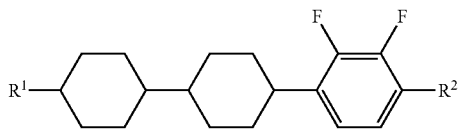
(1-4)

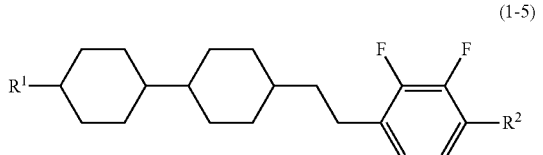
(1-5)

(1-6)

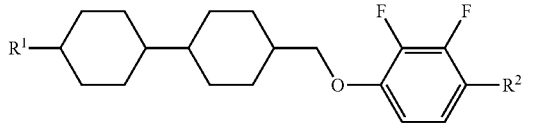

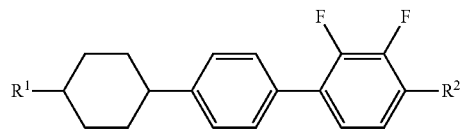
(1-7)

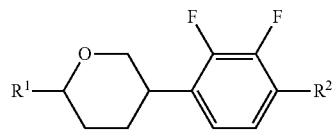
(1-8)

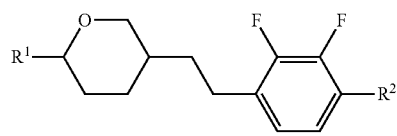
(1-9)

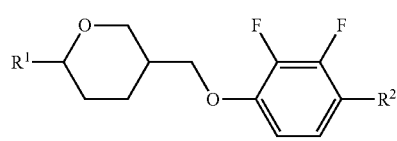
(1-10)

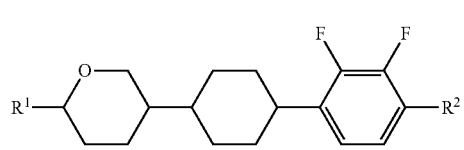
(1-11)

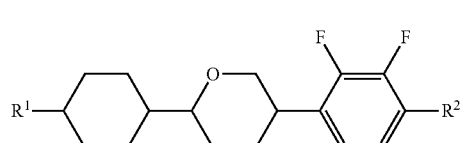
(1-12)

[Formula 124]

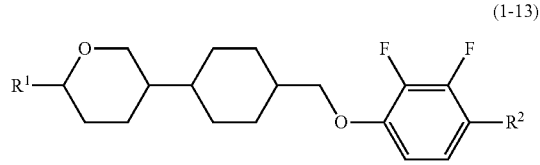
(1-13)

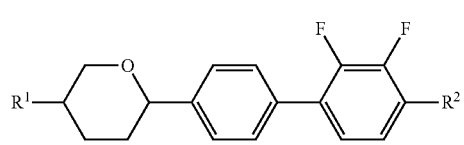
(1-14)

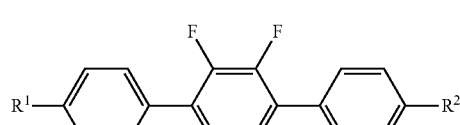
(1-15)

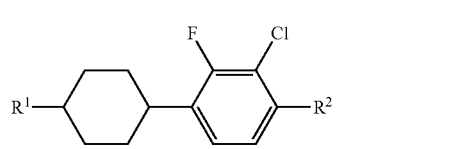
(1-16)

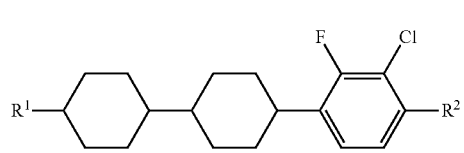
(1-17)

-continued

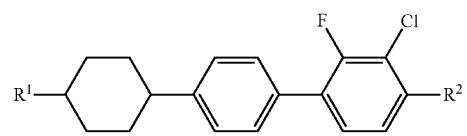 (1-18)

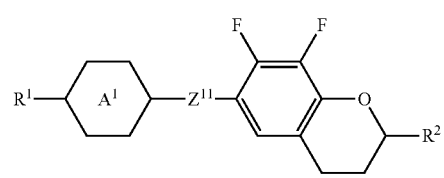 (1-19)

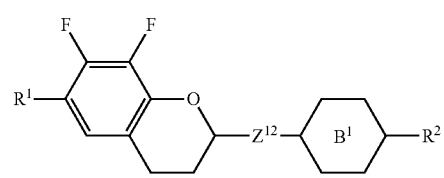 (1-20)

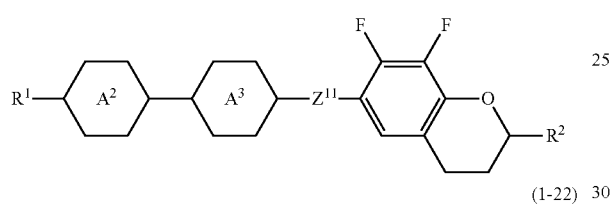 (1-21)

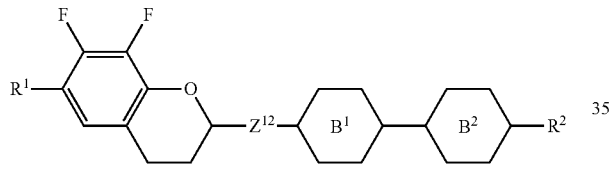 (1-22)

[Formula 125]

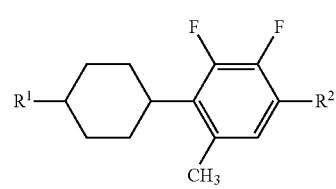 (1-23)

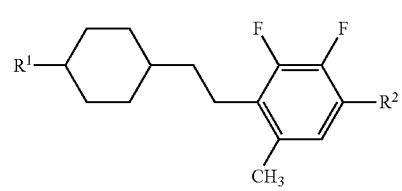 (1-24)

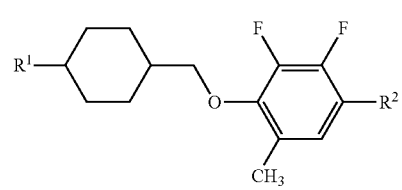 (1-25)

-continued

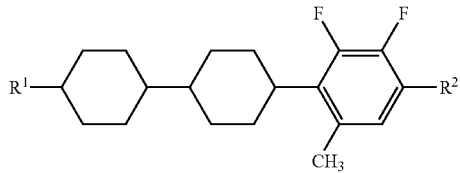 (1-26)

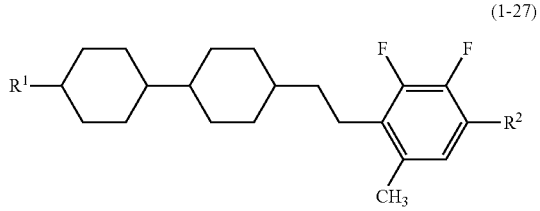 (1-27)

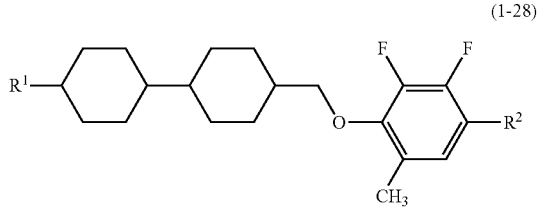 (1-28)

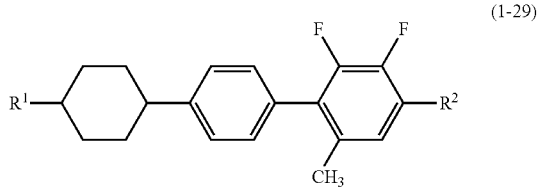 (1-29)

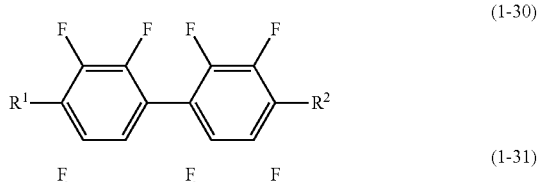 (1-30)

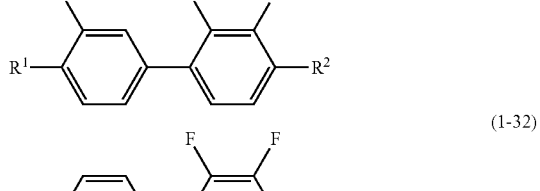 (1-31)

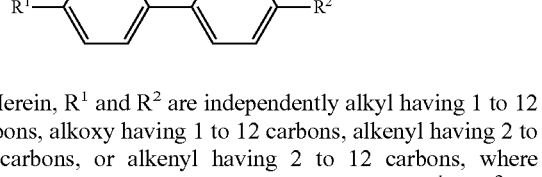 (1-32)

Herein, $R^1$ and $R^2$ are independently alkyl having 1 to 12 carbons, alkoxy having 1 to 12 carbons, alkenyl having 2 to 12 carbons, or alkenyl having 2 to 12 carbons, where arbitrary hydrogen is replaced by fluorine. The $R^1$ or $R^2$ for increasing stability for ultraviolet (UV) light or heat is preferably alkyl having 1 to 12 carbons, or the $R^1$ or $R^2$ for increasing an absolute value of dielectric anisotropy is preferably alkoxy having 1 to 12 carbons. Preferable alkyl is methyl, ethyl, propyl, butyl, pentyl, hexyl, heptyl, or octyl. More preferable alkyl for reducing viscosity is ethyl, propyl, butyl, pentyl, or heptyl.

Preferable alkoxy is methoxy, ethoxy, propoxy, butoxy, pentyloxy, hexyloxy, or heptyloxy. More preferable alkoxy for reducing viscosity is methoxy or ethoxy.

Preferable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More preferable alkenyl for reducing viscosity is vinyl, 1-propenyl, 3-butenyl, or 3-pentenyl. In these alkenyls, preferable stereo-configurations of —CH=CH— depend on a position of a double bond. In order to reduce viscosity, trans is preferable in alkenyls such as 1-propenyl, 1-butenyl, 1-pentenyl, 1-hexenyl, 3-pentenyl, and 3-hexenyl. Cis is preferable in alkenyls such as 2-butenyl, 2-pentenyl, and 2-hexenyl. In these alkenyls, linear alkenyl is more preferable than branched alkenyl.

Examples of the alkenyl where arbitrary hydrogen is replaced by fluorine are preferably 2,2-difluorovinyl, 3,3-difluoro-2-propenyl, 4,4-difluoro-3-butenyl, 5,5-difluoro-4-pentenyl, and 6,6-difluoro-5-hexenyl. More preferably, it is 2,2-difluorovinyl and 4,4-difluoro-3-butenyl in order to reduce viscosity.

Ring A and ring B are independently 1,4-cyclohexylene, tetrahydropyran-2,5-diyl, 1,3-dioxane-2,5-diyl, 1,4-phenylene, 2-fluoro-1,4-phenylene, 2,5-difluoro-1,4-phenylene, 2,3-difluoro-1,4-phenylene, 2-fluoro-3-chloro-1,4-phenylene, 2,3-difluoro-6-methyl-1,4-phenylene, 2,6-naphthalenediyl, or 7,8-difluorochroman-2,6-diyl, wherein at least one of ring A and ring B is 2,3-difluoro-1,4-phenylene, 2-fluoro-3-chloro-1,4-phenylene, 2,3-difluoro-6-methyl-1,4-phenylene, or 7,8-difluorochroman-2,6-diyl, and when j is 2 or 3, arbitrary two rings A may be the same or different. Preferable ring A and ring B are 2,3-difluoro-1,4-phenylene or tetrahydropyran-2,5-diyl, respectively, in order to increase dielectric anisotropy, and preferable ring A and ring B are 1,4-cyclohexylene in order to reduce viscosity.

Ring $A^1$, ring $A^2$, ring $A^3$, ring $B^1$, and ring $B^2$ are independently 1,4-cyclohexylene or 1,4-phenylene. Preferable ring $A^1$, ring $A^2$, ring $A^3$, ring $B^1$, and ring $B^2$ for reducing viscosity are 1,4-cyclohexylene.

$Z^1$ is independently a single bond, —$(CH_2)_2$—, —$CH_2O$—, —COO—, or —$CF_2O$—, when j is 2 or 3, two arbitrary $Z^1$'s may be the same or different, and a preferable $Z^1$ for increasing dielectric anisotropy is —$CH_2O$—, and a preferable $Z^1$ for reducing viscosity is a single bond.

$Z^{11}$ and $Z^{12}$ are independently a single bond, —$(CH_2)_2$—, —$CH_2O$—, or —COO—. Preferable $Z^{11}$ and $Z^{12}$ for increasing dielectric anisotropy are —$CH_2O$—, and preferable $Z^{11}$ and $Z^{12}$ for reducing viscosity is a single bond.

j is 1, 2, or 3. A preferable j for reducing the minimum temperature is 1, and a preferable j for increasing the maximum temperature is 2.

In the liquid crystal composition having negative dielectric anisotropy, the compound (1) preferably includes the compound (1-1), the compound (1-4), the compound (1-7), or the compound (1-32) as a first component.

Preferable examples of the liquid crystal composition having negative dielectric anisotropy may be liquid crystal compositions disclosed in Japanese Patent Laid-Open Publication No. S57-114532, Japanese Patent Laid-Open Publication No. H2-4725, Japanese Patent Laid-Open Publication No. H4-224885, Japanese Patent Laid-Open Publication No. H8-40953, Japanese Patent Laid-Open Publication No. H8-104869, Japanese Patent Laid-Open Publication No. H10-168076, Japanese Patent Laid-Open Publication No. H10-168453, Japanese Patent Laid-Open Publication No. H10-236989, Japanese Patent Laid-Open Publication No. H10-236990, Japanese Patent Laid-Open Publication No. H10-236992, Japanese Patent Laid-Open Publication No. H10-236993, Japanese Patent Laid-Open Publication No. H10-236994, Japanese Patent Laid-Open Publication No. H10-237000, Japanese Patent Laid-Open Publication No. H10-237004, Japanese Patent Laid-Open Publication No. H10-237024, Japanese Patent Laid-Open Publication No. H10-237035, Japanese Patent Laid-Open Publication No. H10-237075, Japanese Patent Laid-Open Publication No. H10-237076, Japanese Patent Laid-Open Publication No. H10-237448 (EP967261A1 specification), Japanese Patent Laid-Open Publication No. H10-287874, Japanese Patent Laid-Open Publication No. H10-287875, Japanese Patent Laid-Open Publication No. H10-291945, Japanese Patent Laid-Open Publication No. H11-029581, Japanese Patent Laid-Open Publication No. H11-080049, Japanese Patent Laid-Open Publication No. 2000-256307, Japanese Patent Laid-Open Publication No. 2001-019965, Japanese Patent Laid-Open Publication No. 2001-072626, Japanese Patent Laid-Open Publication No. 2001-192657, Japanese Patent Laid-Open Publication No. 2010-037428, the pamphlet of International Publication No. 2011/024666, the pamphlet of International Publication No. 2010/072370, Japanese Translated PCT Patent Application Laid-open No. 2010-537010, Japanese Patent Laid-Open Publication No. 2012-077201, and Japanese Patent Laid-Open Publication No. 2009-084362.

For example, the liquid crystal composition used in the device of the present invention may further include an additive from the viewpoint of improving alignment. The additive may include a photopolymerizable monomer, an optically active compound, an antioxidant, an ultraviolet (UV) light absorber, a dye, an antifoaming agent, a polymerization initiator, a polymerization inhibitor, and the like.

For the purpose of improving alignment properties of liquid crystals, the photopolymerizable monomer or oligomer may have the following Formula (3-1) to (3-6) as the most preferable structure.

[Formula 126]

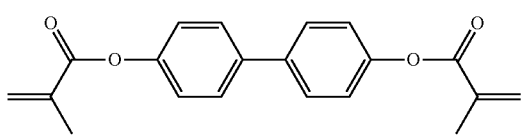

(3-1)

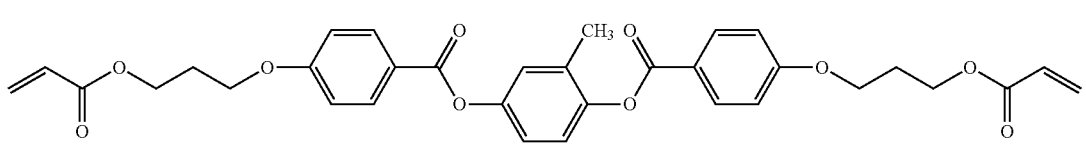

(3-2)

-continued (3-3)
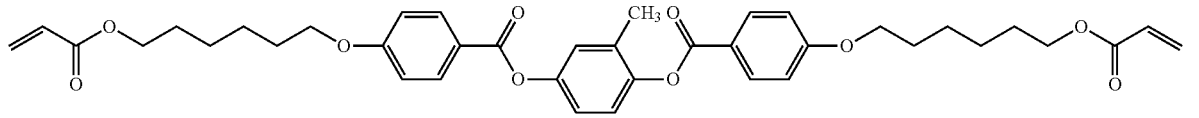

(3-4)
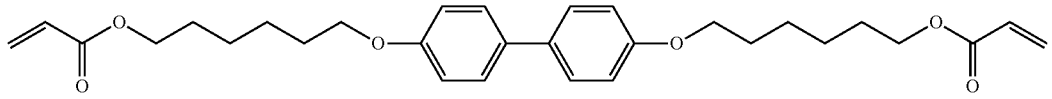

(3-5)
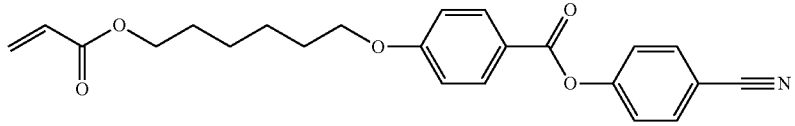

(3-6)
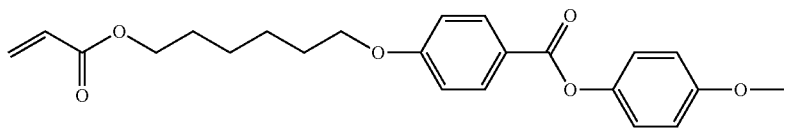

A content of the photopolymerizable monomer or oligomer is preferably greater than or equal to 0.01 wt % in order to implement an effect to determine a tilting direction of the liquid crystals after polymerization. In order to implement an appropriate alignment effect of a polymer after polymerization, or in order to avoid elution of an unreacted monomer or oligomer into liquid crystals after irradiation of ultraviolet (UV) light, the content is preferably less than or equal to 30 wt %.

For the purpose of providing a twist angle by inducing a helical structure of liquid crystals, an optically active compound is mixed in the composition. Examples of such a compound are compound (4-1) to compound (4-4).

A preferable ratio of the optically active compound is less than or equal to 5 wt %. A more preferable ratio thereof is in the range of 0.01 wt % to 2 wt %.

[Formula 127]

(4-1)
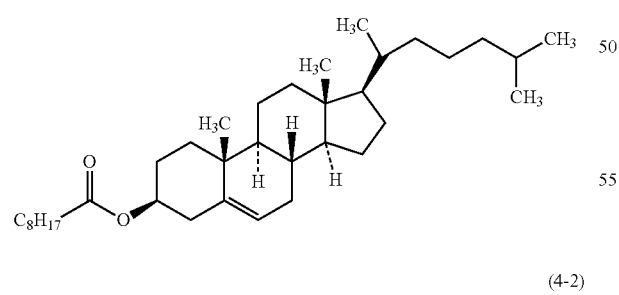

(4-2)
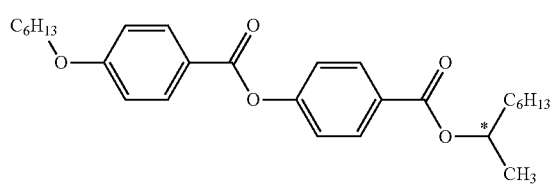

(4-3)
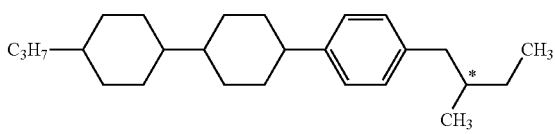

(4-4)
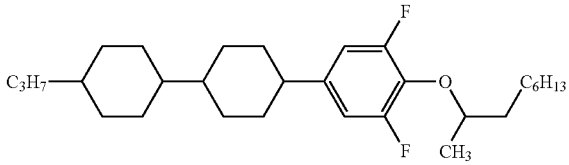

The antioxidant is mixed with the liquid crystal composition for the purpose of preventing a decrease in specific resistance caused by heating in air, or maintaining a large voltage holding ratio at room temperature and also at a high temperature after the device has been used for a long period of time.

[Formula 128]

(5)
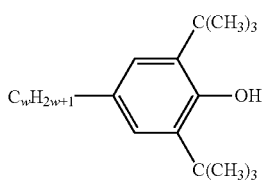

Preferable examples of the antioxidant include compound (5) where w is an integer from 1 to 9. In compound (5), a preferable w is 1, 3, 5, 7, or 9. A more preferable w is 1 or 7. Compound (5) where w is 1 is effective in preventing a decrease in specific resistance caused by heating in air because the compound (5) has high volatility. Compound (5) where w is 7 is effective in maintaining a large voltage holding ratio at room temperature and also at a high temperature after the device has been used for a long period of time because the compound (5) has low volatility. A preferable ratio of the antioxidant is greater than or equal to 50 ppm for achieving the effect thereof, and less than or equal to 600 ppm for avoiding a decrease in maximum temperature of a nematic phase of the liquid crystal composition or avoiding an increase in minimum temperature of a nematic phase of the liquid crystal composition. A more preferable ratio is in the range of 100 ppm to 300 ppm.

Preferable examples of the ultraviolet light absorber include a benzophenone derivative, a benzoate derivative, and a triazole derivative. A light stabilizer such as an amine having steric hindrance is also preferable. A preferable ratio of the ultraviolet light absorber or the stabilizer is greater than or equal to 50 ppm for achieving the effect thereof, and less than or equal to 10,000 ppm for avoiding a decrease in maximum temperature of a nematic phase of the liquid crystal composition or avoiding an increase in minimum temperature of a nematic phase of the liquid crystal composition. A more preferable ratio is in the range of 100 ppm to 10,000 ppm.

A dichroic dye such as an azo-based dye or an anthraquinone-based dye is mixed with the composition to be adapted for a guest-host (GH) mode device. A preferable ratio of the dye is in the range of 0.01 wt % to 10 wt %.

The antifoaming agent such as dimethyl silicone oil or methyl phenyl silicone oil is mixed with the composition for preventing foam formation. A preferable ratio of the antifoaming agent is greater than or equal to 1 ppm for achieving the effect thereof, and less than or equal to 1000 ppm for avoiding display defects. A more preferable ratio is in the range of 1 ppm to 500 ppm.

A polymerizable compound is mixed with the composition to be adapted for a PSA (polymer sustained alignment) mode device. Preferable examples of the polymerizable compound may be a compound having a polymerizable group such as an acrylate, a methacrylate, a vinyl compound, a vinyloxy compound, propenylether, an epoxy compound (oxirane and oxetane), and vinylketone. Particularly preferable examples are derivatives of an acrylate or a methacrylate. Examples of the compounds are compound (7-1) to compound (7-9). A preferable ratio of the polymerizable compound is greater than or equal to about 0.05 wt % for achieving the effect thereof, and less than or equal to about 10 wt % for avoiding display defects. A more preferable ratio is in the range of about 0.1 wt % to about 2 wt %.

[Formula 129]

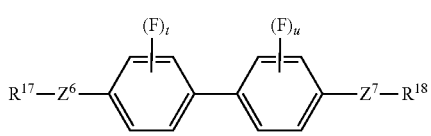

(7-1)

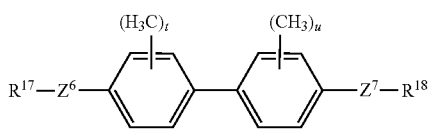

(7-2)

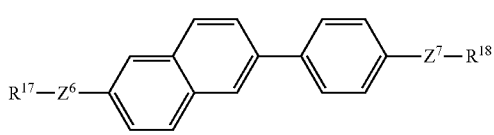

(7-3)

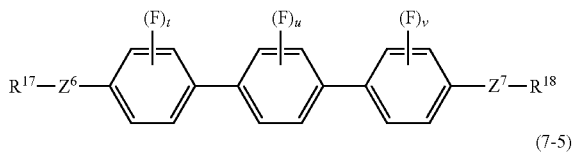

(7-4)

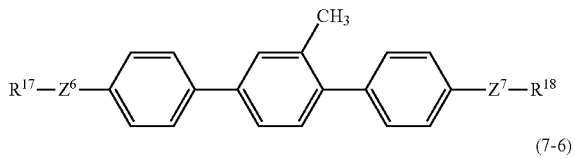

(7-5)

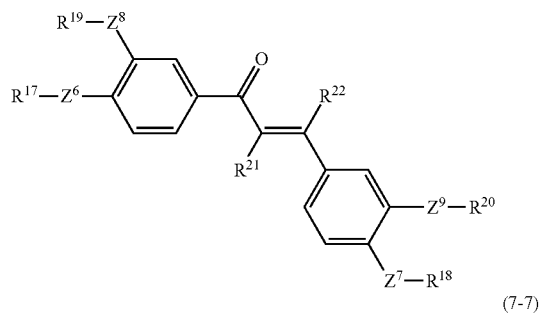

(7-6)

(7-7)

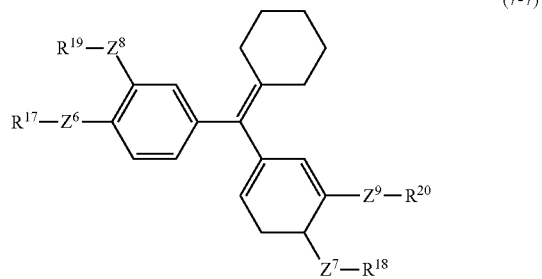

(7-8)

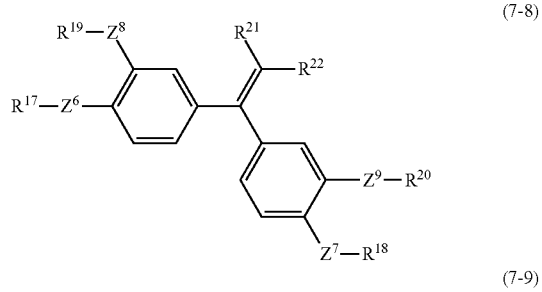

(7-9)

Herein, $R^{17}$, $R^{18}$, $R^{19}$, and $R^{20}$ are independently acryloyl or methacryloyl, $R^{21}$ and $R^{22}$ are independently hydrogen, a halogen, or C1-C10 alkyl, $Z^6$, $Z^7$, $Z^8$, and $Z^9$ are independently a single bond or alkylene having 1 to 12 carbons, wherein at least one —$CH_2$— may be replaced by —O— or —CH=CH—, and t, u, and v are 0, 1, or 2.

The polymerization initiator is mixed as a substance easily generating radicals or ions, and is required for initiating a chain polymerization reaction. For example, Irgacure 651 (registered trademark), Irgacure 184 (registered trademark), or Darocure 1173 (registered trademark) (Ciba Japan K. K.), each being a photopolymerization initiator, is suitable for radical polymerization. The polymerizable compound includes the photopolymerization initiator preferably in the range of 0.1 wt % to 5 wt %. Particularly preferably, it includes the photopolymerization initiator in the range of 1 wt % to 3 wt %.

The polymerization inhibitor is mixed in a radical polymerization system for the purpose of quickly reacting with the radials generated from the polymerization initiator or a monomer to change into a stable radical or a neutral compound, and as a result, to terminate the polymerization reaction. The polymerization inhibitor is structurally classified into several forms. One of the forms is a radical that is stable in itself, such as tri-p-nitrophenylmethyl or di-p-fluorophenylamine, and the other is a compound that easily reacts with the radical present in a polymerization system to change into the stable radical, such as a nitro, nitroso, amino, or polyhydroxy compound as the representative thereof. The representatives of the latter include hydroquinone and dimethoxybenzene. A preferable ratio of the polymerization inhibitor is greater than or equal to 5 ppm for achieving the effect thereof and less than or equal to 1000 ppm for avoiding display defects. A further preferable ratio is in the range of 5 ppm to 500 ppm.

The liquid crystal display device of the present invention includes a pair of substrates arranged opposite to each other, an electrode group disposed on one side or both sides of the pair of substrates facing each other, a plurality of active elements connected to the electrode group, a liquid crystal alignment film disposed on each facing side of the pair of substrates, and a liquid crystal layer interposed between the pair of substrates. The alignment film and the liquid crystal layer are respectively the alignment film and the liquid crystal layer of the present invention.

As for the substrate, a glass substrate aforementioned in the alignment film of the present invention may be used, and the electrode may include any electrode formed at one side of the substrate without a particular limit. This electrode may include, for example, ITO, IZO, IGZO, a metal-deposited film, or the like. In addition, the electrode may be formed on the whole side of the substrate, for example, as a desired pattern. The desired shape of the electrode may include, for example, a comb-shape, a zigzag structure, or the like. The electrode may be formed on one of a pair of substrates or both of the substrates. The electrode may be variously formed depending on a kind of a liquid crystal display device, for example, as for an IPS-type liquid crystal display device and an FFS-type liquid crystal display device, the electrode may be disposed on one side of the pair of substrates, while as for the other liquid crystal displays, the electrode may be disposed on both of the pair of substrates. The liquid crystal alignment film is formed on either the substrate or the electrode.

The liquid crystal layer is formed by a liquid crystal composition sealing a gap between the substrates when the substrates are positioned with the sides having the alignment layers facing each other.

The liquid crystal display device of the present invention is obtained by forming an alignment layer of the present invention on at least one side of a pair of substrates, facing the pair of substrates with a spacer interposed therebetween, and injecting and sealing a liquid crystal composition into a gap between the substrates to form a liquid crystal layer. The liquid crystal display device of the present invention may be formed by further including a process of attaching a polarizing film to the substrate and the like if necessary.

The liquid crystal layer is formed by injecting the liquid crystal composition between the pair of substrates with the sides of the substrates having liquid crystal alignment films facing each other. Herein, a spacer interposed between the pair of substrates and forming an appropriate gap, for example, a particulate or resin sheet and the like, may be used if necessary.

EXAMPLES

Hereinafter, the present invention will be explained in more detail by way of examples, but the invention is not limited by the examples. Each evaluation method of a liquid crystal display device is as follows.

<Weight Average Molecular Weight (Mw)>

The weight average molecular weight of the polyamic acid was measured according to a GPC method using a 2695 separation module•2414 differential refractometer (manufactured by Waters Corporation), and was calculated in terms of polystyrene. The obtained polyamic acid was diluted to be about 2 wt % of polyamic acid concentration with a phosphoric acid-DMF mixed solution (phosphoric acid/DMF=0.6/100 (weight ratio)). Measurement was carried out using HSPgel RT MB-M (manufactured by Waters Corporation) as a column, and the mixed solution as an eluent, under conditions of a column temperature of 50° C. and a flow rate of 0.40 mL/min. For standard polystyrene, TSK standard polystyrene manufactured by Tosoh Corporation was used.

<Evaluation Method of Liquid Crystal Display Device>

<1. Pretilt Angle>

A spectral ellipsometer M-2000U (manufactured by J. A. Woollam Co. Inc.) was used.

<2. AC Image Sticking (Brightness Change Rate)>

Brightness-voltage characteristics (B-V characteristics) of a post-described liquid crystal display device were measured. This value was regarded as brightness-voltage characteristics: B (before) before applying stress to the liquid crystal display device. Then, the brightness-voltage characteristics (B-V characteristics) were measured again after applying an alternating current at 4.5 V and 60 Hz for 20 minutes to the liquid crystal display device and short-circuiting it for 1 second. This value was regarded as brightness-voltage characteristics: B (after) after applying the stress. These values were used to obtain a brightness change rate ΔB (%) by using the following equation.

$$\Delta B(\%)=[B(\text{after})-B(\text{before})]/B(\text{before}) \quad \text{(Equation 1)}$$

These measurements were performed according to a pamphlet of International Publication No. 2000/43833. As the ΔB (%) at a voltage of 0.75 V is smaller, an AC image sticking may be more prevented.

<3. Alignment Stability (Liquid Crystal Alignment Axis Stability)>

The change rate of a liquid crystal alignment axis at an electrode of the post-described liquid crystal display was obtained. An liquid crystal alignment angle φ (before) at the electrode before applying the stress was measured, and then, after applying a rectangular wave of 4.5 V, 60 Hz to the liquid crystal display for 20 minutes and short-circuiting it for one second, liquid crystal alignment angles φ (after) at the electrode were respectively measured again after 1 second and 5 minutes. Then, liquid crystal alignment angle changes Δφ (deg.) after one second and 5 minutes were obtained based on the above measurements according to the following equation.

$$\Delta\phi(\text{deg.})=\phi(\text{after})-\phi(\text{before}) \quad \text{(Equation 2)}$$

These measurements were performed referring to J. Hilfiker, B. Johs, C. Herzinger, J. F. Elman, E. Montbach, D. Bryant, and P. J. Bos Thin Solid Films, 455-456, 2004, 596-600. Herein, a small Δϕ indicates a small change rate of a liquid crystal alignment axis and excellent stability of the liquid crystal alignment axis.

Solvents, additives, and liquid crystal compositions used in examples are as follows.

<Solvent>

N-methyl-2-pyrrolidone: NMP

Butyl cellosolve (ethylene glycol monobutylether): BC

<Additive>

Additive (Ad1): bis[4-(allylbicyclo[2.2.1]hepto-5-ene-2,3-dicarboxylimide)phenyl]methane Additive (Ad2): N,N,N',N'-tetraglycidyl-4,4'-diaminodiphenylmethane Additive (Ad3): 3-aminopropyltriethoxysilane Additive (Ad4): 2-(3,4-epoxycyclohexyl)ethyltrimethoxysilane <Liquid Crystal Composition>

Positive Liquid Crystal Composition:

[Formula 130]

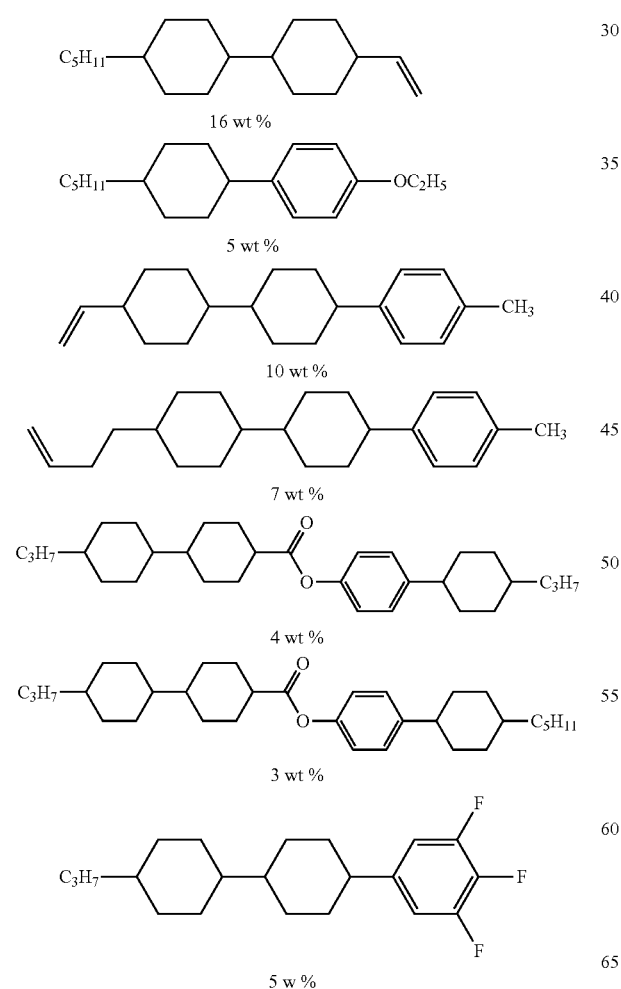

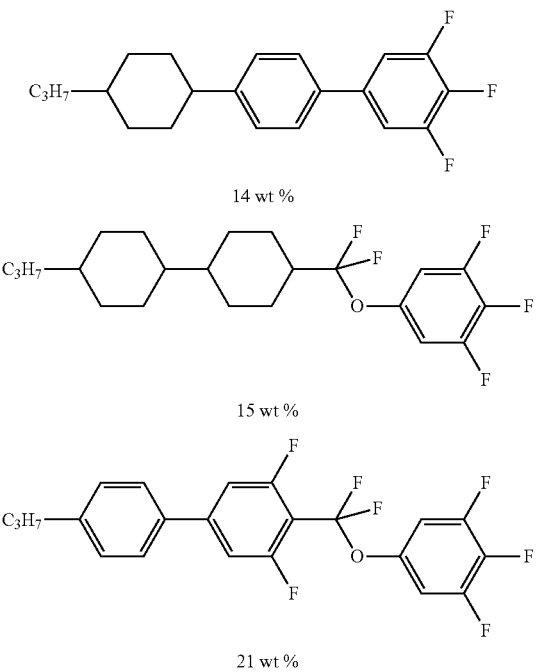

Negative Liquid Crystal Composition A:

[Formula 131]

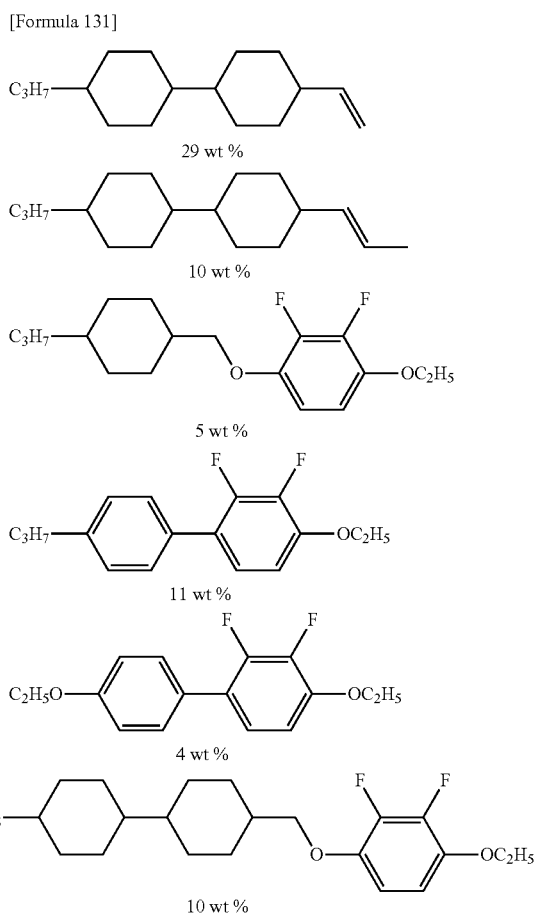

113
-continued
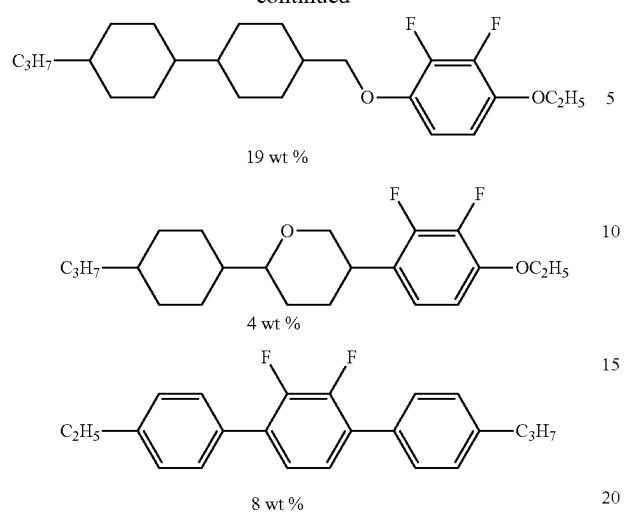
Negative Liquid Crystal Composition B:
[Formula 132]
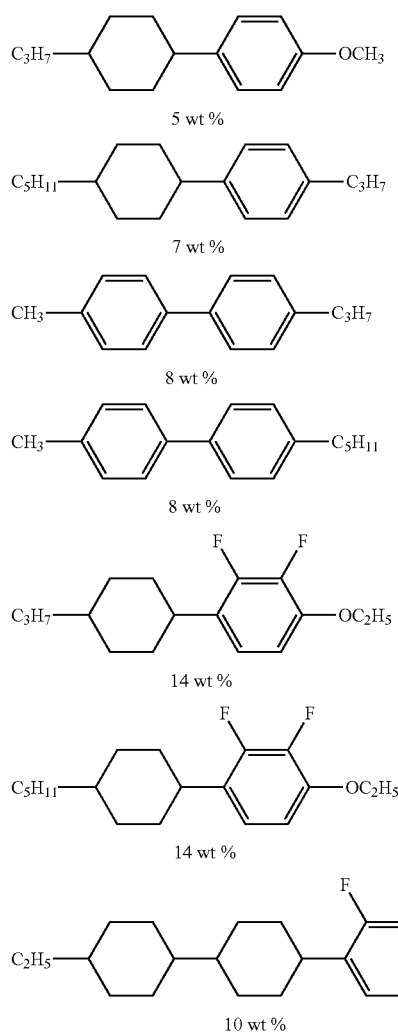
114
-continued
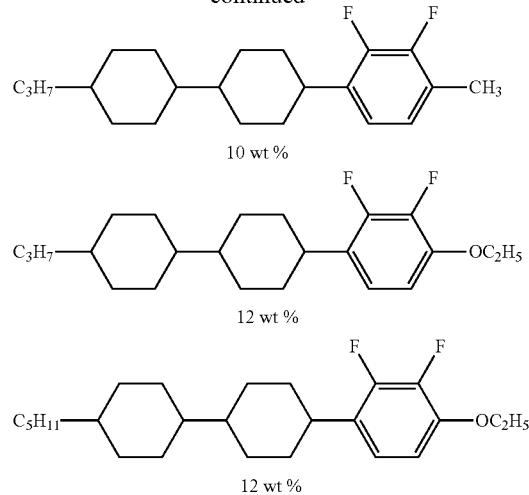
Negative Liquid Crystal Composition C:
[Formula 133]
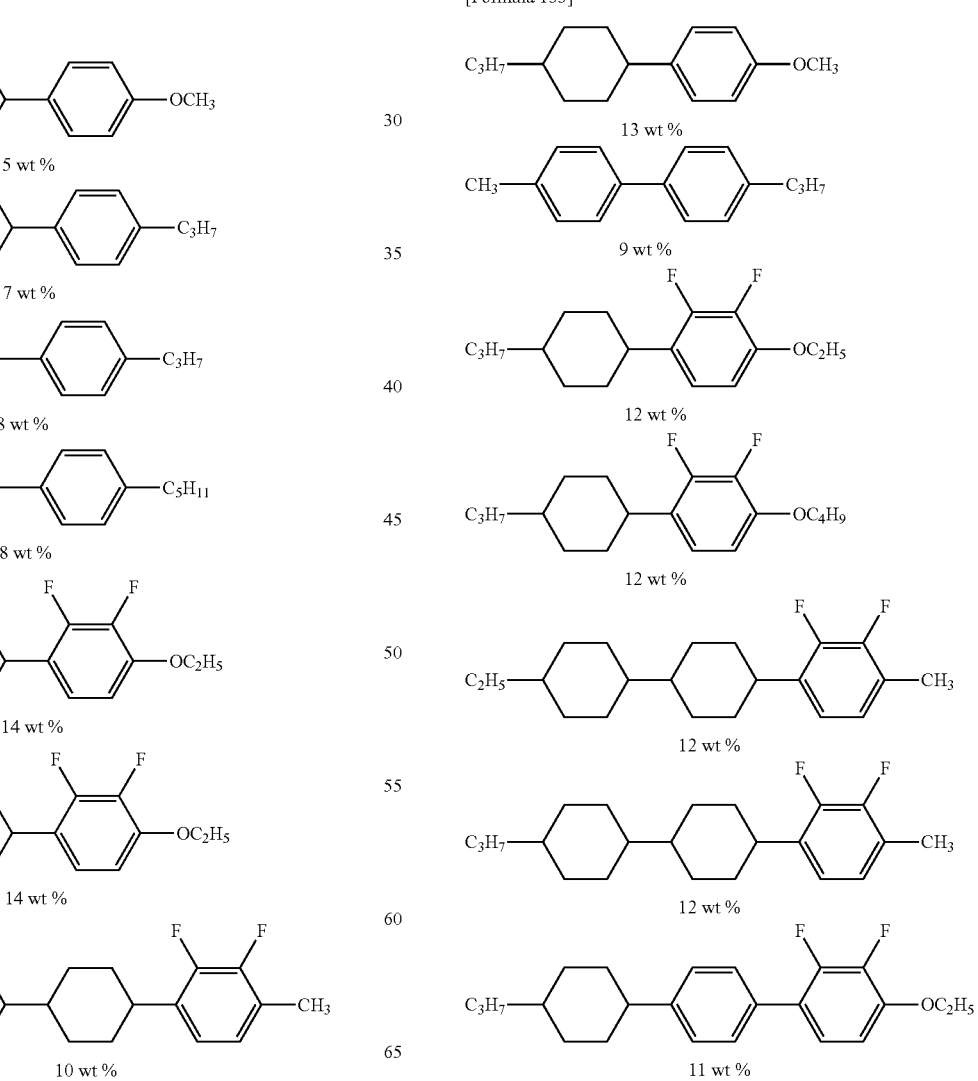

-continued
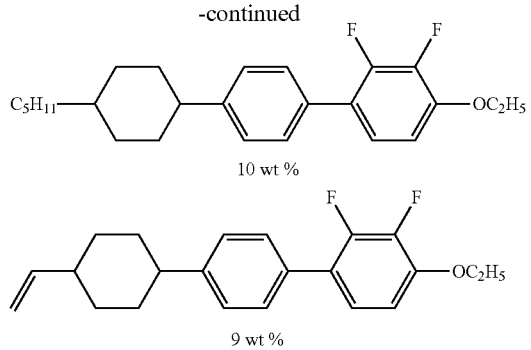
10 wt %
9 wt %
Negative Liquid Crystal Composition D:
[Formula 134]
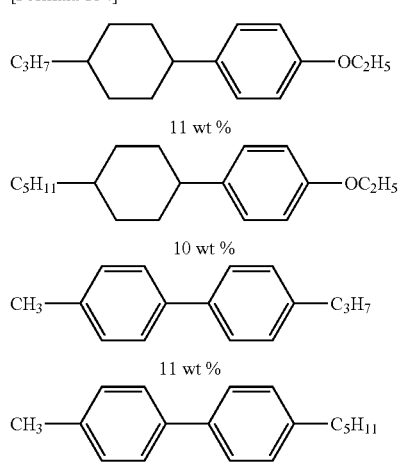
11 wt %
10 wt %
11 wt %
9 wt %
4 wt %
3 wt %
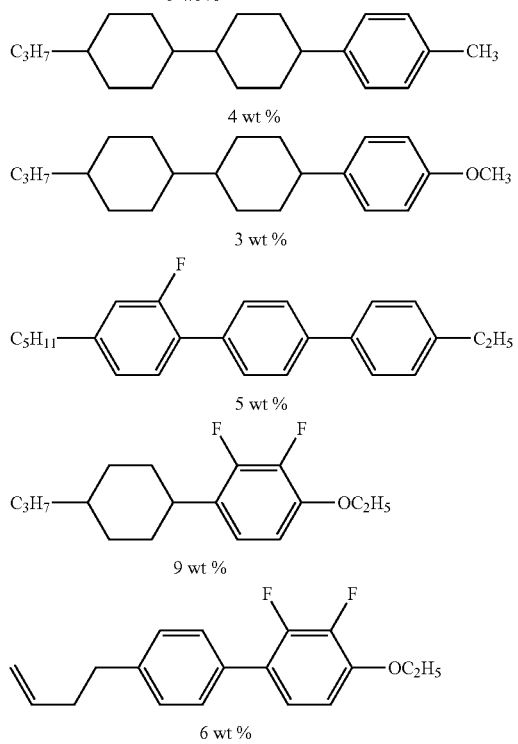
5 wt %
9 wt %
6 wt %
-continued
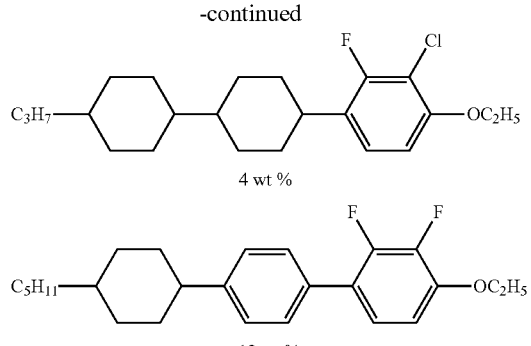
4 wt %
12 wt %
[Formula 135]
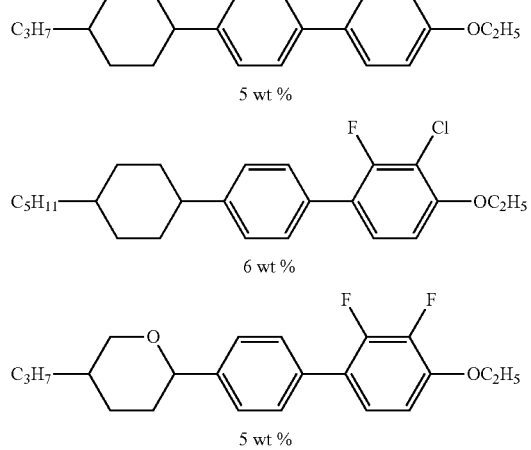
5 wt %
6 wt %
5 wt %
Negative Liquid Crystal Composition E:
[Formula 136]
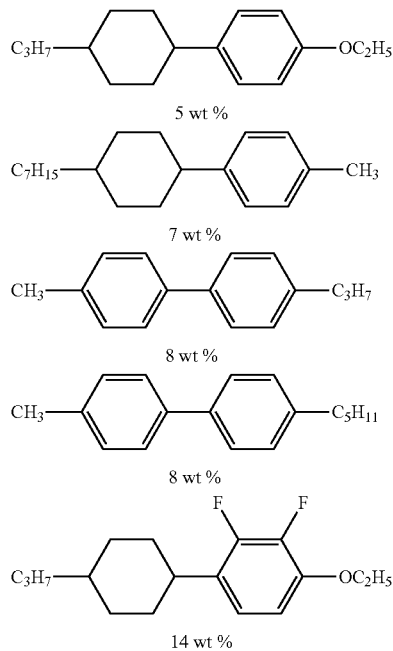
5 wt %
7 wt %
8 wt %
8 wt %
14 wt %

-continued

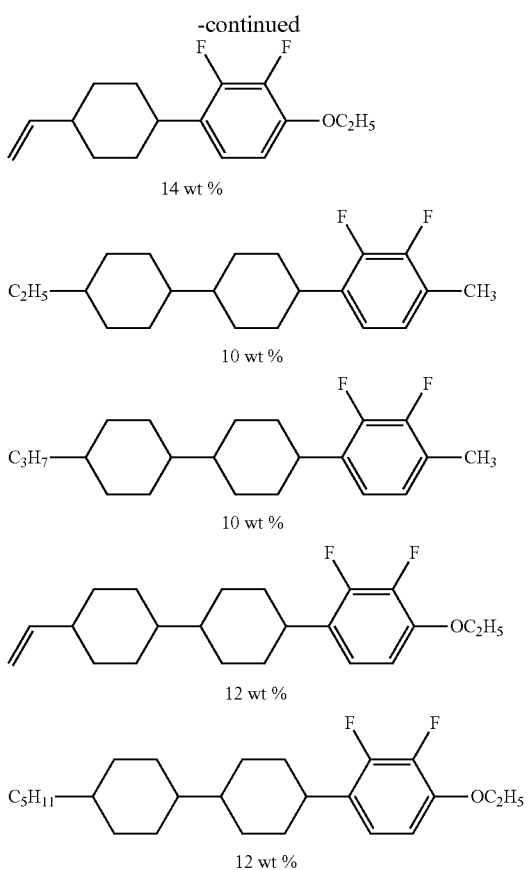

<1. Synthesis of Polyamic Acid of [A]>

Synthesis Example 1

0.2102 g of diamine (DI-5-1, m=2), 0.0664 g of diamine (DI-9-1), 0.2082 g of diamine (PDI-6-1), 0.5778 g of diamine (PDI-7-1), and 18.5 g 50 mL of dehydration NMP were put in a brown four-necked flask equipped with a thermometer, a stirrer, an inlet for feeding a raw material, and another inlet for introducing nitrogen gas and then stirred and dissolved under a dry nitrogen stream. Subsequently, 0.1268 g of acid dianhydride (AN-1-13), 1.8106 g of acid dianhydride (AN-4-17, m=8), and 18.5 g of dehydrated NMP were added thereto and continuously stirred at room temperature for 24 hours. Then, 10.0 g of BC was added to the reaction solution, obtaining a polyamic acid solution having a polymer solid concentration of 6 wt %. This polyamic acid solution is called PA1. A weight average molecular weight of the polyamic acid included in the PA1 was 39,400.

Synthesis Examples 2 to 8

As shown in Table 1, polyamic acid solutions PA2 to PA8 respectively having a polymer solid concentration of 6 wt % were prepared according to the same method as Synthesis Example 1, except for changing the tetracarboxylic dianhydride and the diamine. Table 1 shows the weight average molecular weight results of the obtained polyamic acids as well as the result of Synthesis Example 1.

TABLE 1

| Synthesis Ex. No. | Polyamic acid No. | Tetracarboxylic dianhydride | (mol %) | Diamine | (mol %) | Weight average molecular weight |
|---|---|---|---|---|---|---|
| 1 | PA1 | AN-1-13 | (10) | DI-5-1 (m = 2) | (20) | 39,400 |
|   |     | AN-4-17 (m = 8) | (90) | DI-9-1 | (5) | |
|   |     |     |     | PDI-6-1 | (20) | |
|   |     |     |     | PDI-7-1 | (55) | |
| 2 | PA2 | AN-3-1 | (30) | DI-5-1 (m = 2) | (50) | 42,000 |
|   |     | AN-4-17 (m = 8) | (70) | PDI-7-1 | (50) | |
| 3 | PA3 | AN-4-17 (m = 8) | (100) | DI-5-1 (m = 4) | (40) | 32,000 |
|   |     |     |     | PDI-7-1 | (60) | |
| 4 | PA4 | AN-4-21 | (100) | DI-5-1 (m = 4) | (25) | 21,700 |
|   |     |     |     | PDI-7-1 | (75) | |
| 5 | PA5 | AN-4-21 | (100) | DI-5-4 | (50) | 28,600 |
|   |     |     |     | PDI-7-1 | (50) | |
| 6 | PA6 | PAN-2 | (100) | DI-2-1 | (20) | 40,700 |
|   |     |     |     | PDI-7-1 | (80) | |
| 7 | PA7 | AN-4-17 (m = 8) | (100) | DI-19-7($R^{41}$=$C_7H_{15}$) | (3) | 17,500 |
|   |     |     |     | PDI-7-1 | (97) | |
| 8 | PA8 | AN-4-17 (m = 8) | (100) | DI-4-13 | (10) | 15,200 |
|   |     |     |     | DI-16-5($R^{35}$=$C_5H_{11}$) | (5) | |
|   |     |     |     | PDI-7-1 | (85) | |

<2. Synthesis of Polyamic Acid of [B]>

Synthesis Example 9

0.7349 g of diamine (DI-4-1) and 18.5 g of dehydration NMP were put in a brown 50 mL four-necked flask equipped with a thermometer, a stirrer for feeding a raw material, and another inlet for introducing nitrogen gas and then stirred and dissolved under a dry nitrogen stream. Subsequently, 0.6732 g of acid dianhydride (AN-1-1), 1.5918 g of acid dianhydride (AN-4-28), and 18.5 g of dehydrated NMP were added thereto at room temperature and continuously stirred for 24 hours. Then, 10.0 g of BC was added to the reaction solution, obtaining a polyamic acid solution having a polymer solid concentration of 6 wt %. This polyamic acid solution was called PA9. A weight average molecular weight of the polyamic acid included in the PA9 was 51,000.

Synthesis Examples 10 to 24

As shown in Table 2, polyamic acid solutions (PA10) to (PA24) respectively having a polymer solid concentration of 6 wt % were prepared according to the same method as Synthesis Example 9, except for changing the tetracarboxylic dianhydride and the diamine. Table 2 shows the weight average molecular weight results of the obtained polyamic acids as well as the result of Synthesis Example 9.

TABLE 2

| Synthesis Ex. No. | Polyamic acid No. | Tetracarboxylic dianhydride | (mol %) | Diamine | (mol %) | Weight average molecular weight |
|---|---|---|---|---|---|---|
| 9 | PA9 | AN-1-1 | (50) | DI-4-1 | (100) | 51,000 |
|   |   | AN-4-28 | (50) |   |   |   |
| 10 | PA10 | AN-1-1 | (5) | DI-5-1 (m = 1) | (90) | 79,200 |
|   |   | AN-2-1 | (95) | DI-5-4 | (10) |   |
| 11 | PA11 | AN-1-1 | (5) | DI-5-1 (m = 8) | (100) | 72,200 |
|   |   | AN-2-1 | (95) |   |   |   |
| 12 | PA12 | AN-1-13 | (40) | DI-5-1 (m = 4) | (100) | 84,000 |
|   |   | AN-3-2 | (60) |   |   |   |
| 13 | PA13 | AN-1-13 | (40) | DI-5-1 (m = 4) | (80) | 71,100 |
|   |   | AN-3-2 | (40) | DI-14-1 | (20) |   |
|   |   | AN-4-28 | (20) |   |   |   |
| 14 | PA14 | AN-1-13 | (20) | DI-14-1 | (100) | 100,600 |
|   |   | AN-4-28 | (80) |   |   |   |
| 15 | PA15 | AN-2-1 | (100) | DI-2-1 | (50) | 90,200 |
|   |   |   |   | DI-9-1 | (50) |   |
| 16 | PA16 | AN-2-1 | (100) | DI-4-1 | (100) | 86,400 |
| 17 | PA17 | AN-2-1 | (100) | DI-5-1 (m = 1) | (80) | 90,800 |
|   |   |   |   | DI-9-1 | (20) |   |
| 18 | PA18 | AN-2-1 | (80) | DI-5-1 (m = 1) | (100) | 69,900 |
|   |   | AN-3-1 | (20) |   |   |   |
| 19 | PA19 | AN-2-1 | (70) | DI-5-1 (m = 1) | (80) | 74,000 |
|   |   | AN-3-2 | (30) | DI-9-1 | (20) |   |
| 20 | PA20 | AN-2-1 | (100) | DI-5-1 (m = 2) | (80) | 90,500 |
|   |   |   |   | DI-5-30 | (20) |   |
| 21 | PA21 | AN-3-1 | (10) | DI-4-1 | (100) | 68,600 |
|   |   | AN-3-2 | (50) |   |   |   |
|   |   | AN-4-28 | (40) |   |   |   |
| 22 | PA22 | AN-3-1 | (100) | DI-1-3 | (100) | 101,000 |
| 23 | PA23 | AN-4-5 | (100) | DI-1-3 | (100) | 75,200 |
| 24 | PA24 | AN-2-1 | (50) |   | (100) | 76,000 |
|   |   | AN-3-2 | (50) | DI-4-1 |   |   |

The polyamic acid PA1 of Synthesis Example 1 as a polymer [A] and the polyamic acid PA9 of Synthesis Example 9 as a polymer [B] were mixed in a weight ratio of [A]/[B]=3.0/7.0, and the mixture was called PA25.

The polyamic acid solutions (PA26) to (PA43) were prepared to have a polymer solid concentration of 6 wt % according to the same method as PA25 except for changing a kind of polyamic acid as [A] and [B] components and a weight ratio of [A]/[B]. Table 3 shows a kind of polyamic acid as [A] and [B] components and a weight ratio of [A]/[B] as well as those in the PA25.

TABLE 3

| Polyamic acid No. | Polyamic acid No. of [A] component | Polyamic acid No. of [B] component | [A]/[B] mixing ratio (weight ratio) |
|---|---|---|---|
| PA25 | PA1 | PA9 | 3.0/7.0 |
| PA26 | PA2 | PA10 | 3.0/7.0 |
| PA27 | PA2 | PA11 | 3.0/7.0 |
| PA28 | PA2 | PA12 | 3.0/7.0 |
| PA29 | PA3 | PA13 | 3.0/7.0 |
| PA30 | PA3 | PA14 | 2.0/8.0 |
| PA31 | PA4 | PA15 | 2.0/8.0 |
| PA32 | PA4 | PA16 | 2.0/8.0 |
| PA33 | PA5 | PA17 | 3.0/7.0 |
| PA34 | PA5 | PA18 | 3.0/7.0 |
| PA35 | PA6 | PA19 | 3.0/7.0 |
| PA36 | PA3 | PA20 | 3.0/7.0 |
| PA37 | PA3 | PA21 | 3.0/7.0 |
| PA38 | PA4 | PA22 | 2.5/7.5 |
| PA39 | PA4 | PA23 | 2.5/7.5 |
| PA40 | PA7 | PA12 | 3.0/7.0 |
| PA41 | PA7 | PA24 | 3.0/7.0 |
| PA42 | PA8 | PA19 | 3.0/7.0 |
| PA43 | PA8 | PA24 | 3.0/7.0 |

As shown Table 4, 5 wt % of an additive (Ad1) per a weight (100 wt %) of a polymer was added to the polyamic acid solution (PA3) having a polymer solid concentration of 6 wt % according to Synthesis Example 3. The obtained polyamic acid solution was called PA44.

As shown in Table 4, polyamic acid solutions (PA45) to (PA48) were prepared by adding additives (Ad2) to (Ad4) in a ratio shown in Table 4.

TABLE 4

| Polyamic acid No. | Polyamic acid solution | Additive | Addition amount (wt %) |
|---|---|---|---|
| PA44 | PA3 | Ad1 | 5 |
| PA45 | PA30 | Ad2 | 5 |
| PA46 | PA35 | Ad3 | 4 |
| PA47 | PA37 | Ad4 | 3 |
| PA48 | PA41 | Ad4 | 0.5 |

Comparative Synthesis Example 1

2.1325 g of diamine (DI-4-1) and 74 g of dehydration NMP were put in a 100 mL brown four-necked flask equipped with a thermometer, a stirrer, an inlet for feeding a raw material, and another inlet for introducing nitrogen gas and then stirred and dissolved under a dry nitrogen stream. Subsequently, 3.8675 g of acid dianhydride (AN-2-1) and 20.0 g of BC were added thereto, and the mixture was stirred at room temperature for 24 hours, obtaining a polyamic acid solution having a polymer solid concentration of 6 wt %. This polyamic acid solution was called PA49. A weight average molecular weight of the polyamic acid included in the PA49 was 120,500.

<2. Manufacture of Liquid Crystal Display Device>

Example 1

<Method of Manufacturing Liquid Crystal Display Device>

A mixed solvent of NMP/BC=4/1 (weight ratio) was added to the polyamic acid solution (PA1) having a polymer solid content of 6 wt % prepared in Synthesis Example 1, and the polymer solid content was diluted to 4 wt % to prepare a liquid crystal alignment agent. The liquid crystal alignment agent was applied to a glass substrate with column spacers and a glass substrate with an ITO electrode using a spinner (manufactured by Mikasa Co., Ltd., spin coater (1H-DX2)). A rotation speed of the spinner was controlled depending on viscosity of the liquid crystal alignment agent and an alignment film having the following film thickness was formed, which are the same in the following examples and comparative examples. The formed polyamic acid solution film was heat-dried on a hot plate (manufactured by AS ONE Corporation, EC hot plate (EC-1200N)) at 70° C. for 80 seconds. Subsequently, ultraviolet (UV) linearly polarized light was irradiated through a polarizer using Multi Light ML-501C/B manufactured by Ushio, Inc. in a perpendicular direction with respect to the substrate. Herein, a dose of exposure energy was measured using an ultraviolet (UV) integral actinometer UIT-150 (light receiver UVD-5365) manufactured by Ushio, Inc., and an exposure time was controlled so that the dose might be 2.0±0.1 J/cm$^2$ at a wavelength of 365 nm. Then, the resultant was heat-treated at 230° C. for 15 minutes in a clean oven (manufactured by Espec Corp., clean oven (PVHC-231)) to manufacture an alignment film having a film thickness of 100±10 nm.

The two substrates on which each alignment film was formed were bonded to each other so that the alignment films might be opposed to each other and polarization directions of ultraviolet (UV) light irradiated to each alignment film were parallel to each other, and a gap for injecting a liquid crystal composition between the opposed alignment films might be formed, to assemble a vacant FFS cell having a cell thickness of 4 μm. A injection hole for injecting liquid crystals into the vacant FFS cell was formed at the position where a flow direction of the liquid crystals during injection was approximately parallel to the polarization direction of the ultraviolet (UV) light irradiated to the alignment film. The negative liquid crystal composition A was vacuum-injected into the vacant FFS cell to manufacture a liquid crystal display device.

A pretilt angle of the manufactured FFS liquid crystal display device was measured according to the above method, and was 0.0°. In addition, flow alignment was not shown, and alignment properties were good.

A brightness change rate ΔB (%) of the manufactured FFS liquid crystal display device was measured according to the above method, and was 5.2%.

Liquid crystal alignment axis stability Δφ (deg.) of the manufactured FFS liquid crystal display device was measured according to the above method, and the initial value was 0.024 deg., while the value after 5 minutes was 0.017 deg.

Examples 2 to 21

A mixed solvent of NMP/BC=4/1 (weight ratio) was added to the polyamic acid solutions PA2, PA25-PA39, and PA44-PA47 having each polymer solid content of 6 wt %, and the polymer solid content was diluted to 4 wt % to prepare each liquid crystal alignment agent. Each FFS liquid crystal display device was manufactured using each liquid crystal alignment agent according to the same method as in Example 1, and the negative liquid crystal composition was injected. Pretilt angles, brightness change rates ΔB (%), and liquid crystal alignment axis stability Δφ (deg.) of the obtained FFS liquid crystal display devices were measured. The results are shown in Table 5 with the results of Example 1.

Comparative Examples 1 and 2

A mixed solvent of NMP/BC=4/1 (weight ratio) was added to the polyamic acid solutions PA1 or PA25 having each polymer solid content of 6 wt %, and the polymer solid content was diluted to 4 wt % to prepare each liquid crystal alignment agent. Each FFS liquid crystal display device was manufactured using each liquid crystal alignment agent according to the same method as in Example 1, and the positive liquid crystal composition was injected. Pretilt angles, brightness change rates ΔB (%), and liquid crystal alignment axis stability Δφ (deg.) of the obtained FFS liquid crystal display devices were measured. The results are shown in Table 5 with the results of Examples 1 to 21.

Comparative Examples 3 and 4

A mixed solvent of NMP/BC=4/1 (weight ratio) was added to the polyamic acid solution PA49 having a polymer solid content of 6 wt %, and the polymer solid content was diluted to 4 wt % to prepare a liquid crystal alignment agent. The liquid crystal alignment agent was applied on a substrate to form a film, and was heat-dried at 70° C. for 80 seconds. Subsequently, the resultant was heat-treated at 230° C. for 15 minutes to form an alignment film having a film thickness of 100±10 nm. Then, ultraviolet (UV) linearly polarized light was irradiated through a polarizer using Multi Light ML-501C/B manufactured by Ushio, Inc. in a perpendicular direction with respect to the substrate. Herein, a dose of exposure energy was measured using an ultraviolet (UV) integral actinometer UIT-150 (a light receiver UVD- S365) manufactured by Ushio, Inc., and an exposure time was controlled so that the dose might be 2.0±0.1 J/cm² at a wavelength of 365 nm. FFS liquid crystal display devices were manufactured using the liquid crystal alignment agent according to the same method as in Example 1, and each of the positive liquid crystal composition and the negative liquid crystal composition A were injected.

Pretilt angles, brightness change rates ΔB (%), and liquid crystal alignment axis stability Δφ (deg.) of the obtained FFS liquid crystal display devices were measured. The results are shown in Table 5 with the results of Examples 1 to 21 and Comparative Examples 1 and 2.

Example 22

A mixed solvent of NMP/BC=4/1 (weight ratio) was added to the polyamic acid solution (PA27) having a polymer solid content of 6 wt %, and the polymer solid content was diluted to 4 wt % to prepare a liquid crystal alignment agent. The liquid crystal alignment agent was applied to a glass substrate using a spinner (manufactured by Mikasa Co., Ltd., spin coater (1H-DX2)). The formed polyamic acid solution film was heat-dried on a hot plate (manufactured by AS ONE Corporation, EC hot plate (EC-1200N)) at 70° C. for 80 seconds, and ultraviolet (UV) linearly polarized light was irradiated through a polarizer using Multi Light ML-501C/B manufactured by Ushio, Inc. in a perpendicular direction with respect to the substrate. Herein, a dose of exposure energy was measured using an ultraviolet (UV) integral actinometer UIT-150 (a light receiver UVD-S365) manufactured by Ushio, Inc., and an exposure time was controlled so that the dose might be 0.7±0.1 J/cm² at a wavelength of 365 nm. During ultraviolet (UV) light exposure, the substrate was heated at a temperature of 50° C. The irradiation of the ultraviolet (UV) light was performed while covering the whole device with an ultraviolet (UV) blocking film at room temperature under air. Then, the resultant was heat-treated at 230° C. for 15 minutes in a clean oven (manufactured by Espec Corp., clean oven (PVHC-231)) to manufacture an alignment film having a film thickness of 100±10 nm.

The two substrates on which each alignment film was formed were bonded to each other so that the alignment films might be opposed to each other and polarization directions of ultraviolet (UV) light irradiated to each alignment film were parallel to each other, and a gap for injecting a liquid crystal composition between the opposed alignment films might be formed, to assemble a vacant FFS cell having a cell thickness of 4 μm. A injection hole for injecting liquid crystals into the vacant FFS cell was formed at the position where a flow direction of the liquid crystals during injection was approximately parallel to the polarization direction of the ultraviolet (UV) light irradiated to the alignment film. The negative liquid crystal composition B was vacuum-injected into the vacant FFS cell to manufacture a liquid crystal display device.

A pretilt angle of the manufactured FFS liquid crystal display device was measured according to the above method, and was 0.0°. In addition, flow alignment was not shown, and alignment properties were good.

A brightness change rate ΔB (%) of the manufactured FFS liquid crystal display device was measured according to the above method, and was 2.1%.

Liquid crystal alignment axis stability Δφ (deg.) of the manufactured FFS liquid crystal display device was measured according to the above method, and the initial value was 0.019 deg., while the value after 5 minutes was 0.010 deg.

Examples 23 to 25

A mixed solvent of NMP/BC=4/1 (weight ratio) was added to the polyamic acid solutions (PA40, PA42, and PA48) having each polymer solid content of 6 wt %, and the polymer solid content was diluted to 4 wt % to prepare each liquid crystal alignment agent. Liquid crystal display devices were manufactured using the obtained liquid crystal alignment agents according to the same method as in Example 22. The result of pretilt angles, brightness change rates ΔB (%), and liquid crystal alignment axis stability Δφ (deg.) of the obtained FFS liquid crystal display devices were shown in Table 5 with the results of Example 22.

Example 26

A mixed solvent of NMP/BC=4/1 (weight ratio) was added to the polyamic acid solution (PA34) having a polymer solid content of 6 wt %, and the polymer solid content was diluted to 4 wt % to prepare a liquid crystal alignment agent. The liquid crystal alignment agent was applied to a glass substrate using a spinner (manufactured by Mikasa Co., Ltd., spin coater (1H-DX2)). The formed polyamic acid solution film was heat-dried on a hot plate (manufactured by AS ONE Corporation, EC hot plate (EC-1200N)) at 70° C. for 80 seconds, and ultraviolet (UV) linearly polarized light was irradiated through a polarizer using Multi Light ML-501C/B manufactured by Ushio, Inc. in a perpendicular direction with respect to the substrate. Herein, a dose of exposure energy was measured using an ultraviolet (UV) integral actinometer UIT-150 (light receiver UVD-S365) manufactured by Ushio, Inc., and an exposure time was controlled so that the dose might be 1.0±0.1 J/cm² at a wavelength of 365 nm. The irradiation of the ultraviolet (UV) light was performed while covering the whole device with an ultraviolet (UV) blocking film at room temperature under air. Then, the resultant was heat-treated at 230° C. for 15 minutes in a clean oven (manufactured by Espec Corp., clean oven (PVHC-231)) to manufacture an alignment film having a film thickness of 100±10 nm.

The two substrates on which each alignment film was formed were bonded to each other so that the alignment films might be opposed to each other and polarization directions of ultraviolet (UV) light irradiated to each alignment film were parallel to each other, and a gap for injecting a liquid crystal composition between the opposed alignment films might be formed, to assemble a vacant FFS cell having a cell thickness of 4 μm. A injection hole for injecting liquid crystals into the vacant FFS cell was formed at the position where a flow direction of the liquid crystals during injection was approximately parallel to the polarization direction of the ultraviolet (UV) light irradiated to the alignment film. The negative liquid crystal composition B was vacuum-injected into the vacant FFS cell to manufacture a liquid crystal display device.

A pretilt angle of the manufactured FFS liquid crystal display device was measured according to the above method, and was 0.0°. In addition, flow alignment was not shown, and alignment properties were good.

A brightness change rate ΔB (%) of the manufactured FFS liquid crystal display device was measured according to the above method, and was 2.3%.

Liquid crystal alignment axis stability Δφ (deg.) of the manufactured FFS liquid crystal display device was measured according to the above method, and the initial value was 0.013 deg., while the value after 5 minutes was 0.010 deg. [Examples 27 and 28]

A mixed solvent of NMP/BC=4/1 (weight ratio) was added to the polyamic acid solutions (PA41 and PA43) having a polymer solid content of 6 wt %, and the polymer solid content was diluted to 4 wt % to prepare each liquid crystal alignment agent. Each FFS liquid crystal display device was manufactured using each liquid crystal alignment agent according to the same method as in Example 26. The results are shown in Table 5 with the results of Example 26.

Example 29

A mixed solvent of NMP/BC=4/1 (weight ratio) was added to the polyamic acid solution (PA33) having a polymer solid content of 6 wt %, and the polymer solid content was diluted to 4 wt % to prepare a liquid crystal alignment agent. The liquid crystal alignment agent was applied to a glass substrate with column spacers and a glass substrate with an ITO electrode using a spinner (manufactured by Mikasa Co., Ltd., spin coater (1H-DX2)). A rotation speed of the spinner was controlled depending on viscosity of the liquid crystal alignment agent and an alignment film having the following film thickness was formed, which are the same in the following examples and comparative examples. The formed polyamic acid solution film was heat-dried on a hot plate (manufactured by AS ONE Corporation, EC hot plate (EC-1200N)) at 70° C. for 80 seconds. Subsequently, ultraviolet (UV) linearly polarized light was irradiated through a polarizer using Multi Light ML-501C/B manufactured by Ushio, Inc. in a perpendicular direction with respect to the substrate. Herein, a dose of exposure energy was measured using an ultraviolet (UV) integral actinometer UIT-150 (light receiver UVD-5365) manufactured by Ushio, Inc., and an exposure time was controlled so that the dose might be 2.0±0.1 $J/cm^2$ at a wavelength of 365 nm. Then, the resultant was heat-treated at 230° C. for 15 minutes in a clean oven (manufactured by Espec Corp., clean oven (PVHC-231)) to manufacture an alignment film having a film thickness of 100±10 nm.

The two substrates on which each alignment film was formed were bonded to each other so that the alignment films might be opposed to each other and polarization directions of ultraviolet (UV) light irradiated to each alignment film were parallel to each other, and a gap for injecting a liquid crystal composition between the opposed alignment films might be formed, to assemble a vacant FFS cell having a cell thickness of 4 μm. A injection hole for injecting liquid crystals into the vacant FFS cell was formed at the position where a flow direction of the liquid crystals during injection was approximately parallel to the polarization direction of the ultraviolet (UV) light irradiated to the alignment film. The negative liquid crystal composition C was vacuum-injected into the vacant FFS cell to manufacture a liquid crystal display device.

A pretilt angle of the manufactured FFS liquid crystal display device was measured according to the above method, and was 0.0°. In addition, flow alignment was not shown, and alignment properties were good.

A brightness change rate ΔB (%) of the manufactured FFS liquid crystal display device was measured according to the above method, and was 5.2%.

Liquid crystal alignment axis stability Δφ (deg.) of the manufactured FFS liquid crystal display device was measured according to the above method, and the initial value was 0.024 deg., while the value after 5 minutes was 0.017 deg.

Examples 30 to 34

A mixed solvent of NMP/BC=4/1 (weight ratio) was added to the polyamic acid solutions PA41, PA44, PA41, PA33, and PA43 having each polymer solid content of 6 wt %, and the polymer solid content was diluted to 4 wt % to prepare each liquid crystal alignment agent. Each FFS liquid crystal display device was manufactured using each liquid crystal alignment agent according to the same method as in Example 1, and the negative liquid crystal composition was injected. Pretilt angles, brightness change rates ΔB (%), and liquid crystal alignment axis stability Δφ (deg.) of the obtained FFS liquid crystal display devices were measured. The results are shown in Table 5 with the results of Example 1.

TABLE 5

| Example Nos. | Varnish Nos. | Liquid crystal | Pretilt angle (deg) | Flow alignment (Yes•No) | AC image sticking ΔB (%) | Liquid crystal alignment axis stability Δφ (deg) Initial | After 5 min. |
|---|---|---|---|---|---|---|---|
| Ex. 1 | PA1 | Negative A | 0.0 | No | 5.2 | 0.024 | 0.017 |
| Ex. 2 | PA2 | Negative A | 0.0 | No | 4.8 | 0.024 | 0.013 |
| Ex. 3 | PA25 | Negative A | 0.0 | No | 2.8 | 0.021 | 0.010 |
| Ex. 4 | PA26 | Negative A | 0.0 | No | 1.7 | 0.019 | 0.011 |
| Ex. 5 | PA27 | Negative A | 0.0 | No | 3.5 | 0.023 | 0.013 |
| Ex. 6 | PA28 | Negative A | 0.0 | No | 1.6 | 0.013 | 0.008 |
| Ex. 7 | PA29 | Negative A | 0.0 | No | 1.6 | 0.015 | 0.009 |
| Ex. 8 | PA30 | Negative A | 0.0 | No | 2.0 | 0.022 | 0.010 |
| Ex. 9 | PA31 | Negative A | 0.0 | No | 2.4 | 0.027 | 0.015 |
| Ex. 10 | PA32 | Negative A | 0.0 | No | 2.8 | 0.024 | 0.011 |
| Ex. 11 | PA33 | Negative A | 0.0 | No | 3.1 | 0.025 | 0.013 |
| Ex. 12 | PA34 | Negative A | 0.0 | No | 2.5 | 0.011 | 0.010 |
| Ex. 13 | PA35 | Negative A | 0.0 | No | 1.8 | 0.014 | 0.009 |
| Ex. 14 | PA36 | Negative A | 0.0 | No | 2.2 | 0.016 | 0.014 |
| Ex. 15 | PA37 | Negative A | 0.0 | No | 1.5 | 0.017 | 0.010 |
| Ex. 16 | PA38 | Negative A | 0.0 | No | 1.3 | 0.019 | 0.011 |
| Ex. 17 | PA39 | Negative A | 0.0 | No | 1.5 | 0.020 | 0.011 |
| Ex. 18 | PA44 | Negative A | 0.0 | No | 5.0 | 0.023 | 0.015 |

TABLE 5-continued

| Example Nos. | Varnish Nos. | Liquid crystal | Pretilt angle (deg) | Flow alignment (Yes•No) | AC image sticking ΔB (%) | Liquid crystal alignment axis stability Δø (deg) Initial | After 5 min. |
|---|---|---|---|---|---|---|---|
| Ex. 19 | PA45 | Negative A | 0.0 | No | 2.0 | 0.021 | 0.010 |
| Ex. 20 | PA46 | Negative A | 0.0 | No | 1.5 | 0.015 | 0.009 |
| Ex. 21 | PA47 | Negative A | 0.0 | No | 1.5 | 0.016 | 0.010 |
| Ex. 22 | PA27 | Negative B | 0.0 | No | 2.1 | 0.019 | 0.010 |
| Ex. 23 | PA40 | Negative B | 0.0 | No | 1.2 | 0.015 | 0.009 |
| Ex. 24 | PA42 | Negative B | 0.0 | No | 1.1 | 0.015 | 0.008 |
| Ex. 25 | PA48 | Negative B | 0.0 | No | 1.5 | 0.018 | 0.011 |
| Ex. 26 | PA34 | Negative B | 0.0 | No | 2.3 | 0.013 | 0.010 |
| Ex. 27 | PA41 | Negative B | 0.0 | No | 1.4 | 0.020 | 0.011 |
| Ex. 28 | PA43 | Negative B | 0.0 | No | 1.0 | 0.014 | 0.009 |
| Ex. 29 | PA33 | Negative C | 0.0 | No | 2.5 | 0.021 | 0.013 |
| Ex. 30 | PA41 | Negative C | 0.0 | No | 2.0 | 0.026 | 0.013 |
| Ex. 31 | PA44 | Negative D | 0.0 | No | 3.1 | 0.019 | 0.01 |
| Ex. 32 | PA41 | Negative D | 0.0 | No | 1.6 | 0.019 | 0.009 |
| Ex. 33 | PA33 | Negative E | 0.0 | No | 2.3 | 0.021 | 0.014 |
| Ex. 34 | PA43 | Negative E | 0.0 | No | 1.1 | 0.015 | 0.008 |
| Comp. Ex. 1 | PA1 | Positive | 0.0 | No | 8.0 | 0.039 | 0.022 |
| Comp. Ex. 2 | PA25 | Positive | 0.0 | No | 5.2 | 0.035 | 0.020 |
| Comp. Ex. 3 | PA49 | Positive | 0.0 | No | 12.3 | 0.090 | 0.041 |
| Comp. Ex. 4 | PA49 | Negative A | 0.0 | No | 9.1 | 0.063 | 0.046 |

Comparing Examples 1 to 34 with Comparative Examples 1 to 4, the liquid crystal display device of the present invention reduced an AC image sticking and thus showed high liquid crystal alignment axis stability.

INDUSTRIAL APPLICABILITY

The present invention may provide a liquid crystal display having improved image sticking characteristics and excellent alignment stability by using an alignment film including polyamic acid or a derivative thereof having a photoisomerization structure in the main chain and a liquid crystal molecule having negative dielectric anisotropy.

The invention claimed is:

1. A liquid crystal display device, comprising
a pair of substrates arranged opposite to each other,
an electrode group disposed on one side or both sides of the pair of substrates facing each other,
a plurality of active devices connected to the electrode group,
a liquid crystal alignment film disposed on each facing side of the pair of substrates, and
a liquid crystal layer between the pair of substrates,
wherein the liquid crystal alignment film is manufactured by irradiating linearly polarized light to a film obtained from polyamic acid or a derivative thereof having a photoisomerization structure in the main chain, and
the liquid crystal layer comprises a liquid crystal composition having negative dielectric anisotropy and including at least one of liquid crystal compounds represented by Formula 1 as a first component:

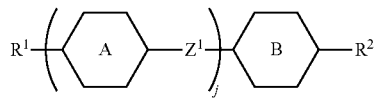

(1)

wherein $R^1$ and $R^2$ are independently alkyl having 1 to 12 carbons, alkoxy having 1 to 12 carbons, alkenyl having 2 to 12 carbons, or alkenyl having 2 to 12 carbons, where arbitrary hydrogen is replaced by fluorine;
ring A and ring B are independently 1,4-cyclohexylene, tetrahydropyran-2,5-diyl, 1,3-dioxane-2,5-diyl, 1,4-phenylene, 2-fluoro-1,4-phenylene, 2,5-difluoro-1,4-phenylene, 2,3-difluoro-1,4-phenylene, 2-fluoro-3-chloro-1,4-phenylene, 2,3-difluoro-6-methyl-1,4-phenylene, 2,6-naphthalenediyl, or 7,8-difluorochroman-2,6-diyl, and at least one of ring A and ring B is 2,3-difluoro-1,4-phenylene, 2-fluoro-3-chloro-1,4-phenylene, 2,3-difluoro-6-methyl-1,4-phenylene, or 7,8-difluorochroman-2,6-diyl;
$Z^1$ is independently a single bond, $-(CH_2)_2-$, $-CH_2O-$, $-COO-$, or $-CF_2O-$;
j is 1, 2, or 3; and
the polyamic acid or the derivative thereof having a photoisomerization structure is polyamic acid or a derivative thereof obtained by reacting tetracarboxylic dianhydride represented by AN-4-17 and at least one of a tetracarboxylic dianhydride or a diamine having a photoisomerization structure selected from Formulae (I) to (VII):

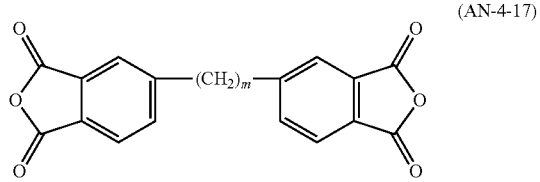

(AN-4-17)

wherein, in Formula (AN-4-17), m is an integer of 4 to 12,

(I)

(II)

 (III)

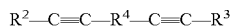 (IV)

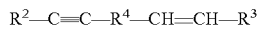 (V)

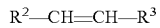 (VI)

 (VII)

wherein, in Formulae (I) to (VII), $R^2$ and $R^3$ are independently a monovalent organic group having —$NH_2$ or —CO—O—CO—, and $R^4$ is a divalent organic group including an aromatic ring.

2. The liquid crystal display device of claim 1, wherein an electric field applied to a liquid crystal layer is parallel to the surface of the substrate.

3. The liquid crystal display device of claim 1, wherein the tetracarboxylic dianhydride having the photoisomerization structure is at least one selected from Formula (PAN-1) and Formula (PAN-2):

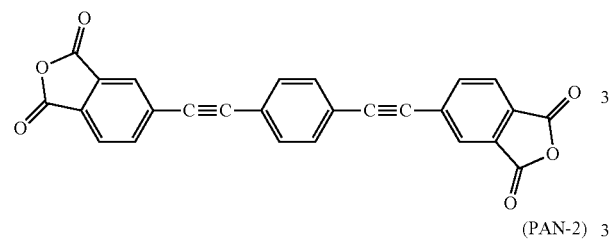

(PAN-1)

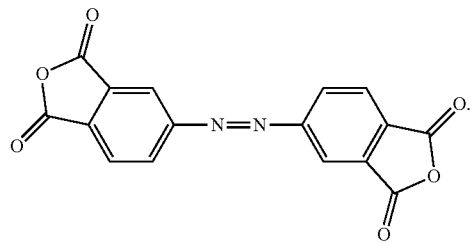

(PAN-2)

4. The liquid crystal display device of claim 1, wherein the diamine having the photoisomerization structure is at least one selected from Formula (PDI-1) to Formula (PDI-8):

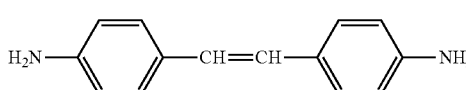

(PDI-1)

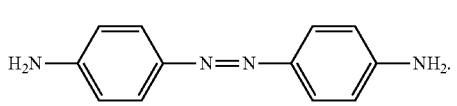

(PDI-2)

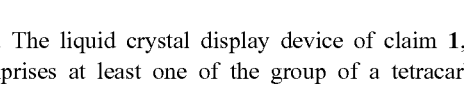

(PDI-3)

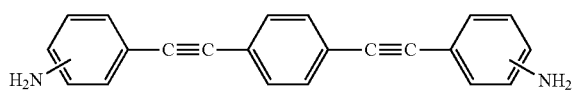

(PDI-4)

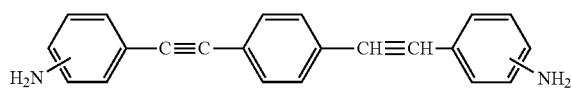

(PDI-5)

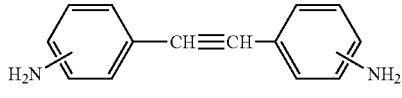

(PDI-6)

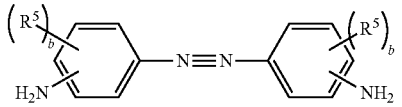

(PDI-7)

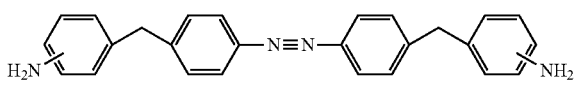

(PDI-8)

wherein, in Formula (PDI-1) to Formula (PDI-8), as for a group of which a bonding position is not fixed to any one of carbon atoms constituting a ring, the bonding position is arbitrary, in Formula (PDI-7), $R^5$ is independently —$CH_3$, —$OCH_3$, —$CF_3$, or —$COOCH_3$, and b is an integer of 0 to 2.

5. The liquid crystal display device of claim 4, wherein the diamine having the photoisomerization structure is at least one selected from Formula (PDI-6-1) and Formula (PDI-7-1):

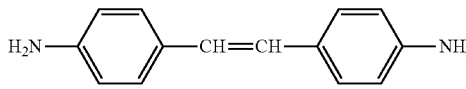

(PDI-6-1)

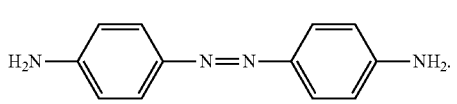

(PDI-7-1)

6. The liquid crystal display device of claim 1, which comprises at least one of the group of a tetracarboxylic dianhydride represented by Formula (AN-I) to Formula (AN-VII), as a tetracarboxylic dianhydride in addition to the tetracarboxylic dianhydride having the photoisomerization structure:

(AN-I)
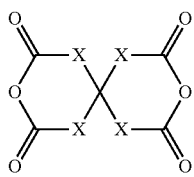

(AN-II)
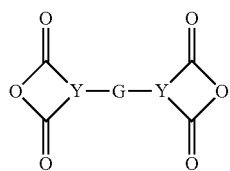

(AN-III)
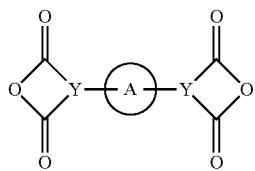

(AN-IV)
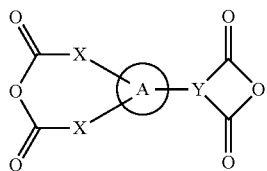

(AN-V)
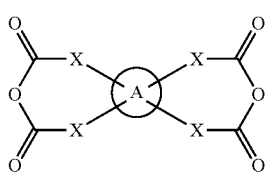

(AN-VI)
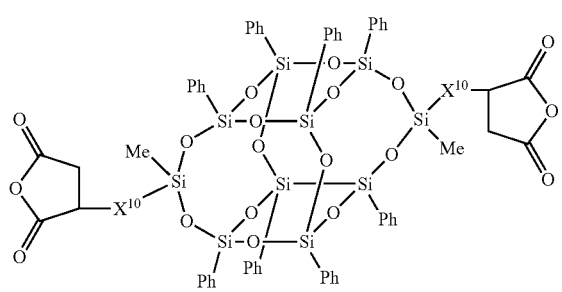

(AN-VII)
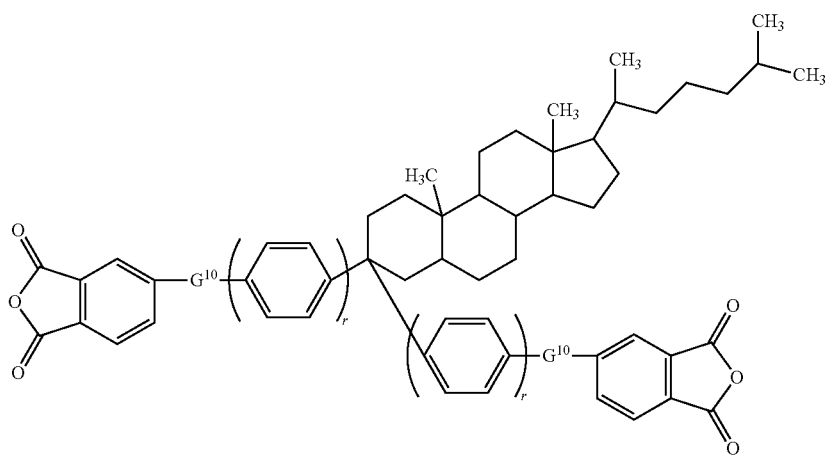

wherein, in Formula (AN-I), Formula (AN-IV), and Formula (AN-V), X is independently a single bond or —CH$_2$—;

in Formula (AN-II), G is a single bond, alkylene having 1 to 20 carbons, —CO—, —O—, —S—, —SO$_2$—, —C(CH$_3$)$_2$—, or —C(CF$_3$)$_2$—; and in Formula (AN-II) to Formula (AN-IV), Y is independently one of the following trivalent groups:

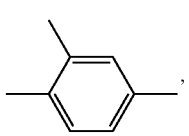

-continued

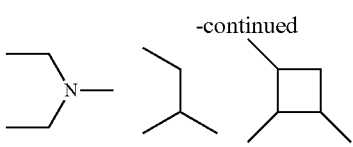

wherein arbitrary hydrogen of the groups is optionally replaced by methyl, ethyl, or phenyl;

in Formula (AN-II), when Y is

G is not alkylene having 1 to 20 carbons, in Formula (AN-III) to Formula (AN-V), ring A is a monocyclic hydrocarbon group having 3 to 10 carbons or a condensed polycyclic hydrocarbon group having 6 to 10 carbons, wherein arbitrary hydrogen of the groups is optionally replaced by methyl, ethyl, or phenyl, a bond bound to the ring is bound to arbitrary carbon constituting the ring, or two bonds is optionally bound to the same carbon;

in Formula (AN-VI), $X^{10}$ is alkylene having 2 to 6 carbons;

Me is methyl;

Ph is phenyl;

in Formula (AN-VII), $G^{10}$ is independently —O—, —COO—, or —OCO—; and r is independently 0 or 1.

7. The liquid crystal display device of claim 6, wherein the tetracarboxylic dianhydride in addition to the tetracarboxylic dianhydride having the photoisomerization structure comprises at least one of Formula (AN-1-1), Formula (AN-1-13), Formula (AN-2-1), Formula (AN-3-1), Formula (AN-3-2), Formula (AN-4-5), Formula (AN-4-21), Formula (AN-4-28), Formula (AN-4-29), Formula (AN-7-2), Formula (AN-10), and Formula (AN-11-3):

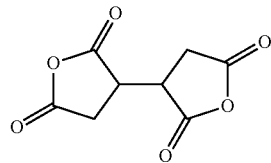

(AN-1-1)

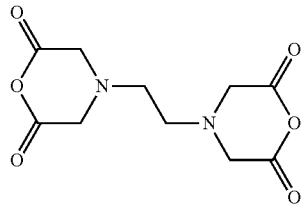

(AN-1-13)

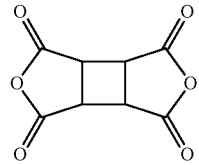

(AN-2-1)

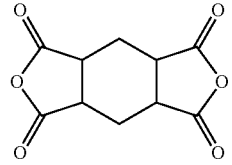

(AN-3-1)

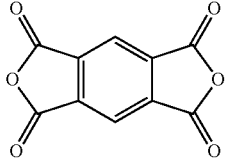

(AN-4-5)

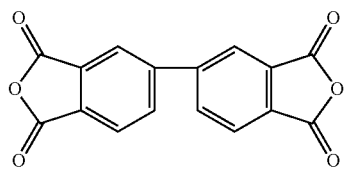

(AN-3-2)

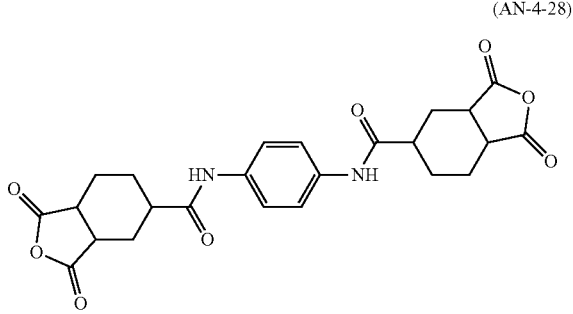

(AN-4-28)

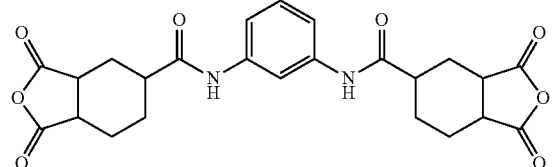

(AN-4-29)

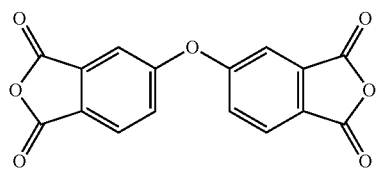

(AN-4-21)

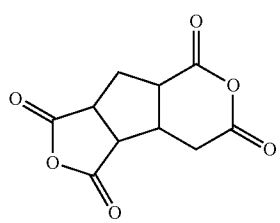

(AN-7-2)

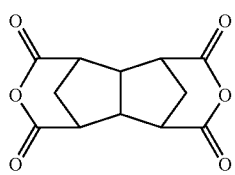

(AN-10)

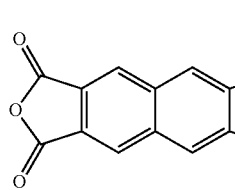

(AN-11-3)

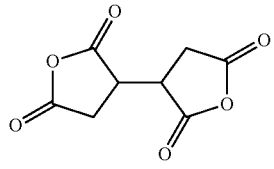

(AN-1-1)

-continued (AN-1-13)
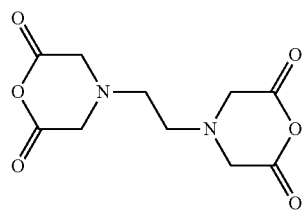

(AN-2-1)
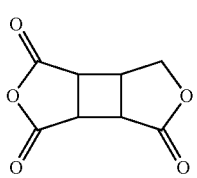

(AN-3-1)
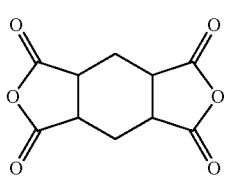

(AN-3-2)
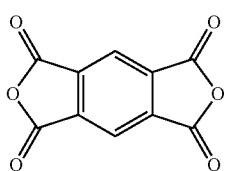

(AN-4-5)
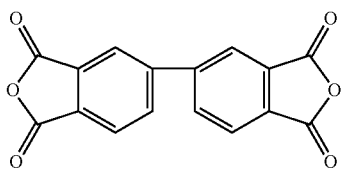

(AN-4-29)
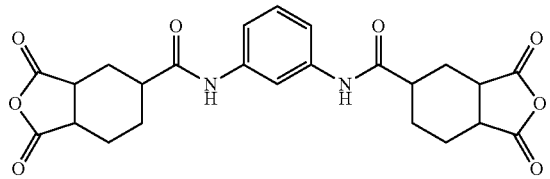

(AN-4-21)
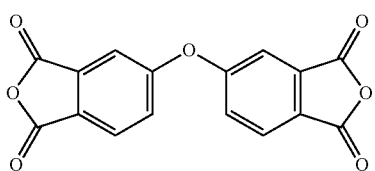

(AN-7-2)
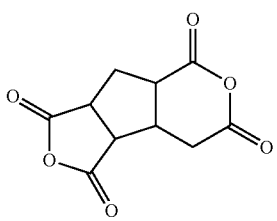

-continued (AN-10)
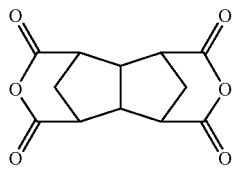

(AN-11-3)
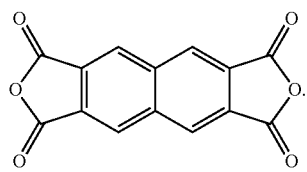

8. The liquid crystal display device of claim 1, which the liquid crystal alignment film comprises at least one of Formula (DI-1) to Formula (DI-15), as a diamine in addition to the diamine having the photoisomerization structure selected from Formula (I) to Formula (VII):

(DI-1)
$$H_2N-(CH_2)_{\overline{m}}-NH_2$$

(DI-2)

(DI-3)

(DI-4)

(DI-5)
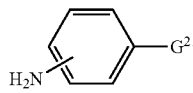

(DI-6)
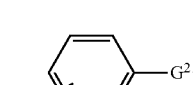

(DI-7)
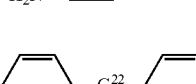

wherein, in Formula (DI-1), m is an integer of 1 to 12;
in Formula (DI-3) and Formula (DI-5) to Formula (DI-7), $G^{21}$ is independently a single bond, —NH—, —O—, —S—, —S—S—, —SO$_2$—, —CO—, —CONH—, —CONCH$_3$—, —NHCO—, —C(CH$_3$)$_2$—, —C(CF$_3$)$_2$—, —(CH$_2$)$_{m'}$—, —O—(CH$_2$)$_{m'}$—O—, —N(CH$_3$)—(CH$_2$)$_k$—N(CH$_3$)—, or —S—(CH$_2$)$_{m'}$—S—, m' is independently an integer of 1 to 12, and k is an integer of 1 to 5;
in Formula (DI-6) and Formula (DI-7), $G^{22}$ is independently a single bond, —O—, —S—, —CO—, —C(CH$_3$)$_2$—, —C(CF$_3$)$_2$—, or alkylene having 1 to 10 carbons;
arbitrary —H of a cyclohexane ring and a benzene ring of Formula (DI-2) to Formula (DI-7) is optionally replaced by —F, —CH₃, —OH, —CF₃, —CO₂H, —CONH₂, or benzyl, or that in Formula (DI-4) is optionally replaced by Formula (DI-4-a) to Formula (DI-4-c):

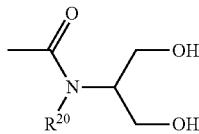
(DI-4-a)

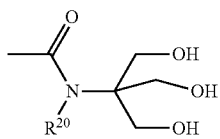
(DI-4-b)

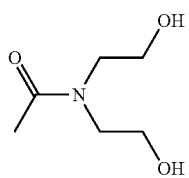
(DI-4-c)

wherein, in Formula (DI-4-a) and Formula (DI-4-b), $R^{20}$ is independently —H or —CH₃;

in Formula (DI-2)-Formula (DI-7), as for a group of which a bonding position is not fixed to any one of carbon atoms constituting a ring, the bonding position is arbitrary; and a bonding position of NH₂ bound to the cyclohexane ring or benzene ring is arbitrary except a bonding position of $G^{21}$ or $G^{22}$,

[Formula 13]

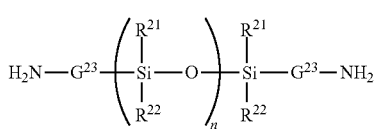
(DI-8)

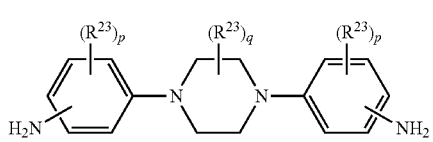
(DI-9)

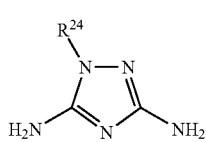
(DI-10)

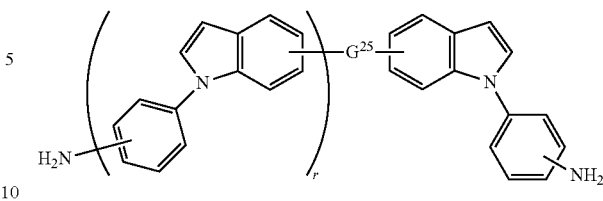
(DI-11)

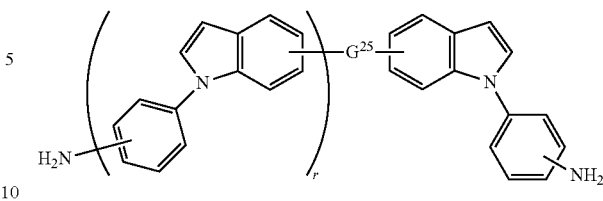
(DI-12)

wherein, in Formula (DI-8), $R^{21}$ and $R^{22}$ are independently alkyl having 1 to 3 carbons or phenyl;

$G^{23}$ is independently C1-C6 alkylene, phenylene, or alkyl-substituted phenylene;

n is an integer of 1-10;

in Formula (DI-9), $R^{23}$ is independently alkyl having 1 to 5 carbons, alkoxy having 1 to 5 carbons, or —Cl;

p is independently an integer of 1 to 3;

q is an integer of 0 to 4;

in Formula (DI-10), $R^{24}$ is —H, alkyl having 1 to 4 carbons, phenyl, or benzyl;

in Formula (DI-11), $G^{24}$ is —CH₂— or —NH—;

in Formula (DI-12), $G^{25}$ is a single bond, alkylene having 2 to 6 carbons, or 1,4-phenylene;

r is 0 or 1;

in Formula (DI-12), as for a group of which a bonding position is not fixed to any one of carbon atoms constituting a ring, the bonding position is arbitrary; and in Formula (DI-9), Formula (DI-11), and Formula (DI-12), a bonding position of NH₂ bound to the benzene ring is arbitrary,

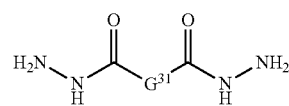
(DI-13)

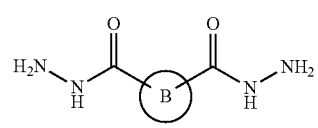
(DI-14)

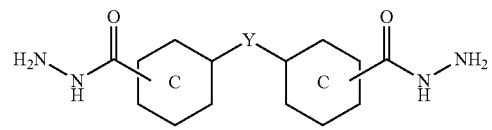
(DI-15)

wherein, in Formula (DI-13), $G^{31}$ is a single bond, alkylene having 1 to 20 carbons, —CO—, —O—, —S—, —SO₂—, —C(CH₃)₂—, or —C(CF₃)₂—;

in Formula (DI-14), ring B is optionally a cyclohexane ring, a benzene ring, or a naphthalene ring, where arbitrary hydrogen of the rings is optionally replaced by methyl, ethyl, or phenyl;

in Formula (DI-15), rings C are each independently a cyclohexane ring or a benzene ring, where arbitrary hydrogen of the rings is optionally replaced by methyl, ethyl, or phenyl; and Y is a single bond, alkylene having 1 to 20 carbons, —CO—, —O—, —S—, —SO₂—, —C(CH₃)₂—, or —C(CF₃)₂—.

9. The liquid crystal display device of claim 8, wherein the diamine in addition to the diamine having the photoisomerization structure selected from Formula (I) to Formula (VII) comprises at least one of the following Formula (DI-1-3), Formula (DI-1-4), Formula (DI-4-1), Formula (DI-5-1), Formula (DI-5-5), Formula (DI-5-9), Formula (DI-5-12), Formula (DI-5-21), Formula (DI-5-28), Formula (DI-5-30), Formula (DI-5-31), Formula (DI-7-3), Formula (DI-9-1), Formula (DI-13-1), Formula (DI-13-2), Formula (DI-14-1), or Formula (DI-14-2):

wherein in Formula (DI-5-1), Formula (DI-5-12), Formula (DI-7-3), and Formula (DI-13-2), m is an integer of 1 to 12;

in Formula (DI-5-30), k is an integer of 1 to 5; and in Formula (DI-7-3), n is 1 or 2.

10. The liquid crystal display device of claim 1, wherein the liquid crystal alignment film is formed by a liquid crystal alignment agent including the polyamic acid or the derivative thereof having a photoisomerization structure in the main chain, and other polymers.

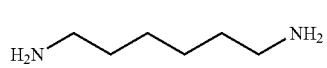
(DI-1-3)

(DI-1-4)

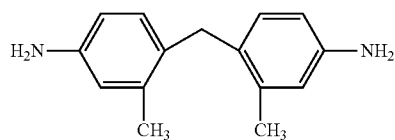
(DI-4-1)

(DI-5-1)
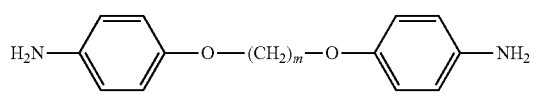

(DI-5-5)
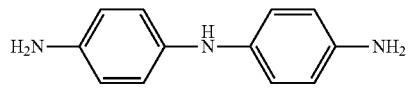

(DI-5-9)
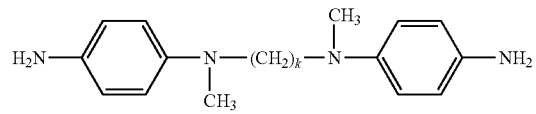

(DI-5-12)
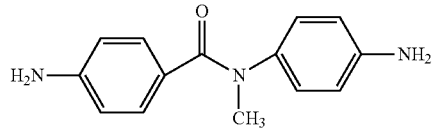

(DI-5-21)

(DI-5-28)

(DI-5-30)

(DI-5-31)

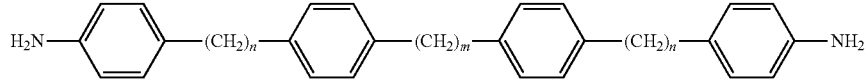
(DI-7-3)

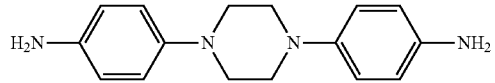
(DI-9-1)

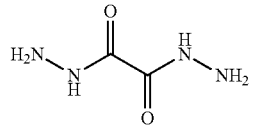
(DI-13-1)

(DI-13-2)

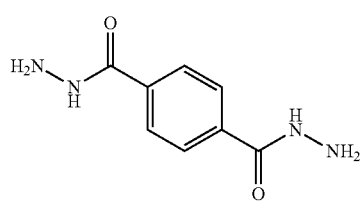
(DI-14-1)

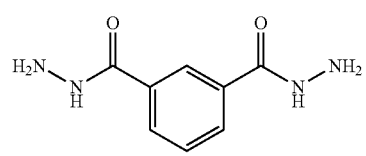
(DI-14-2)

11. The liquid crystal display device of claim 1, wherein the liquid crystal alignment film is formed of a liquid crystal alignment agent further comprising at least one of compounds of an alkenyl-substituted nadimide compound, a compound having a radical-polymerizable unsaturated double bond, an oxazine compound, an oxazoline compound, and an epoxy compound.

12. The liquid crystal display device of claim 1, which is manufactured by applying a liquid crystal alignment agent on a substrate, heat-drying the substrate applied with the liquid crystal alignment agent, and irradiating linearly polarized light to provide alignment capability.

13. The liquid crystal display device of claim 1, which is manufactured by applying a liquid crystal alignment agent on a substrate, heat-drying the substrate applied with the liquid crystal alignment agent, irradiating linearly polarized light to provide alignment capability, and then heat-baking the resultant film.

14. The liquid crystal display device of claim 1, which is manufactured by applying a liquid crystal alignment agent on a substrate, heat-drying the substrate applied with the liquid crystal alignment agent, heat-baking the dried film, and irradiating linearly polarized light to provide alignment capability.

15. The liquid crystal display device of claim 1, wherein the liquid crystal composition having negative dielectric anisotropy comprises at least one of liquid crystal compounds of Formula (1-1) to Formula (1-32) as a first component:

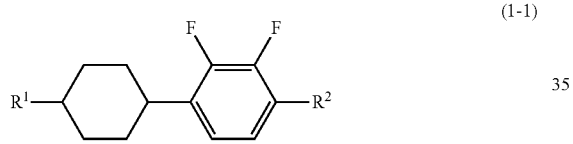
(1-1)

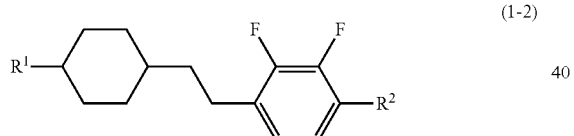
(1-2)

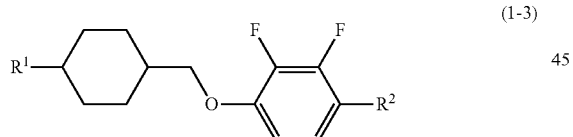
(1-3)

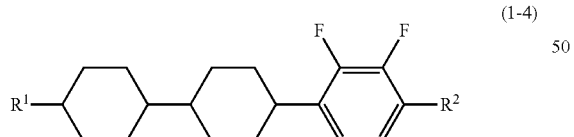
(1-4)

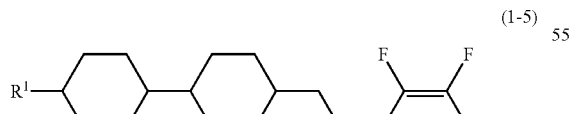
(1-5)

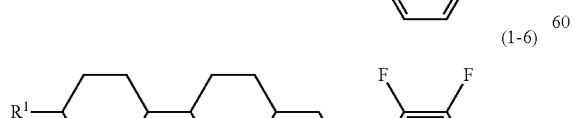
(1-6)

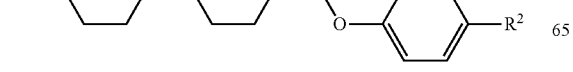

-continued

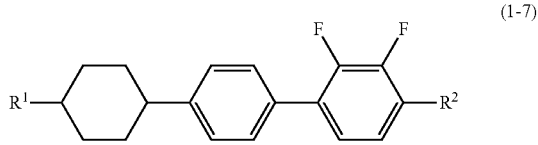
(1-7)

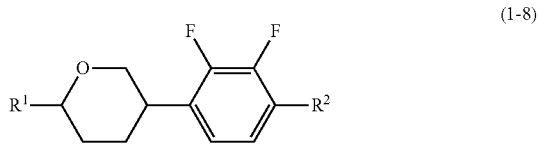
(1-8)

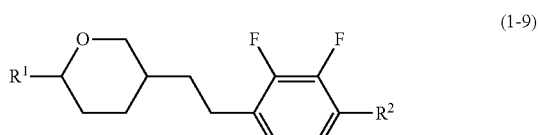
(1-9)

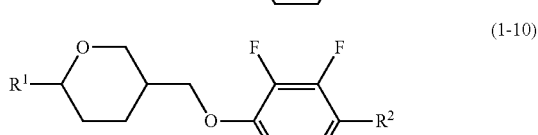
(1-10)

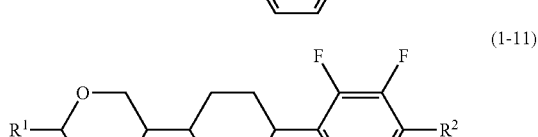
(1-11)

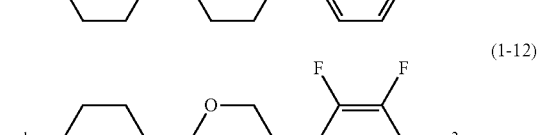
(1-12)

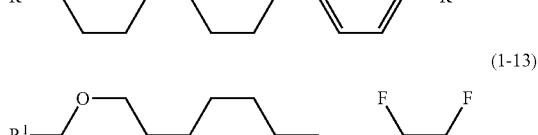
(1-13)

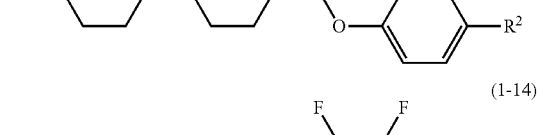
(1-14)

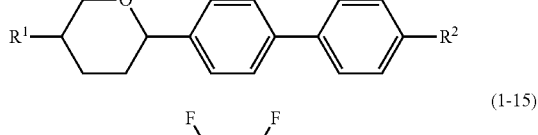
(1-15)

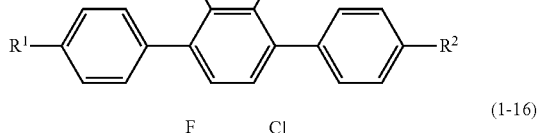
(1-16)

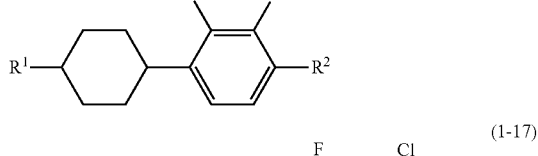
(1-17)

-continued

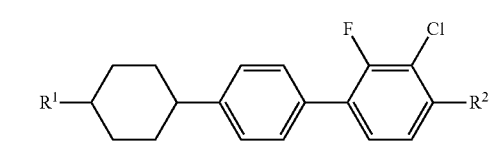
(1-18)

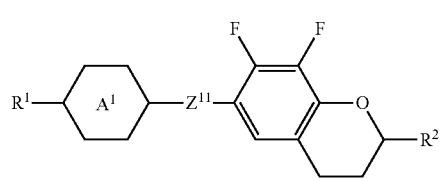
(1-19)

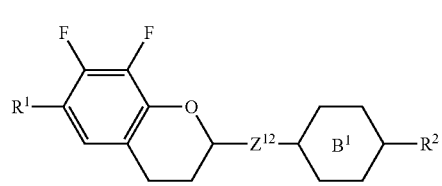
(1-20)

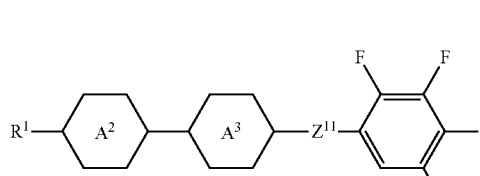
(1-21)

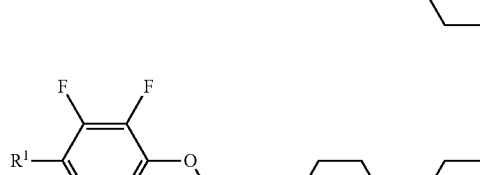
(1-22)

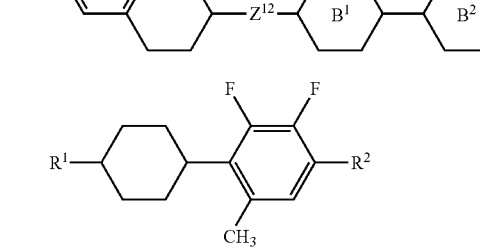
(1-23)

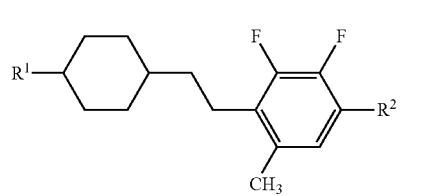
(1-24)

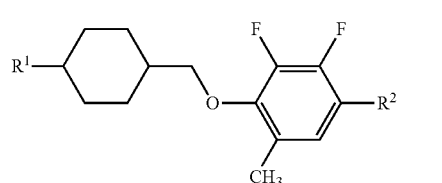
(1-25)

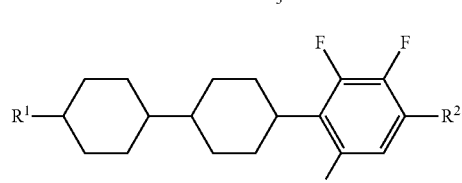
(1-26)

-continued

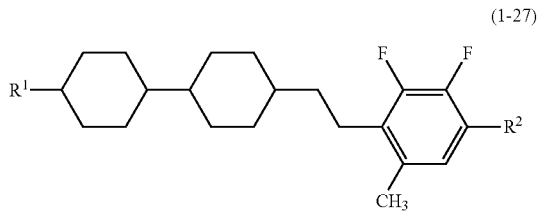
(1-27)

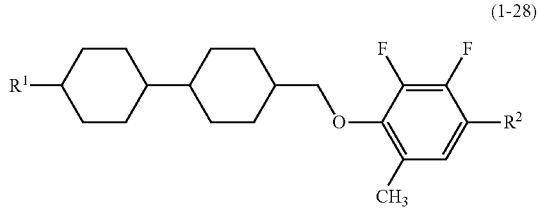
(1-28)

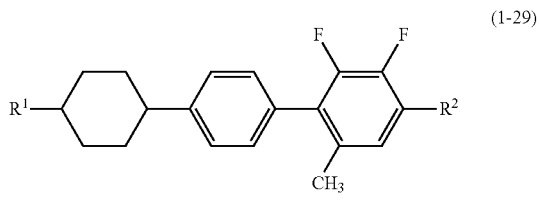
(1-29)

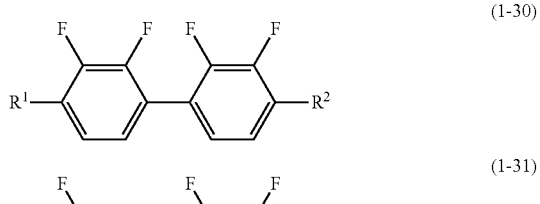
(1-30)

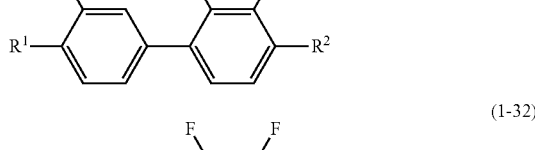
(1-31)

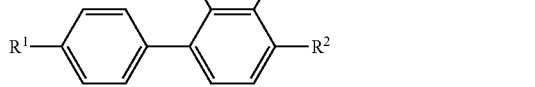
(1-32)

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is optionally replaced by fluorine; ring $A^1$, ring $A^2$, ring $A^3$, ring $B^1$, and ring $B^2$ are independently 1,4-cyclohexylene or 1,4-phenylene; and $Z^{11}$ and $Z^{12}$ are independently a single bond, —(CH$_2$)$_2$—, —CH$_2$O—, or —COO—.

16. The liquid crystal display device of claim 15, wherein the liquid crystal composition having negative dielectric anisotropy comprises at least one of liquid crystal compounds of Formula (1-1), Formula (1-4), Formula (1-7), and Formula (1-32) as a first component:

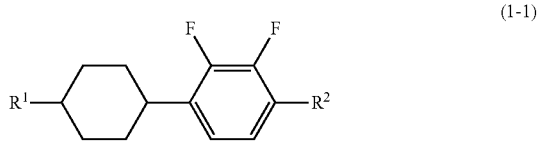
(1-1)

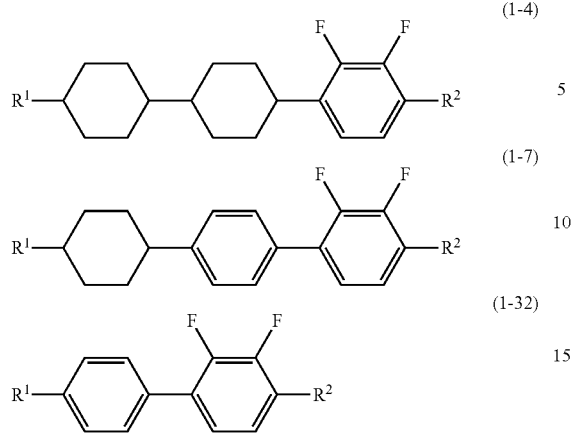
wherein $R^1$ and $R^2$ are independently alkyl having 1 to 12 carbons, alkoxy having 1 to 12 carbons, alkenyl having 2 to 12 carbons, or alkenyl having 2 to 12 carbons where arbitrary hydrogen is replaced by fluorine.
* * * * *